United States Patent [19]
Sato et al.

[11] Patent Number: 5,781,777
[45] Date of Patent: Jul. 14, 1998

[54] OPTIMIZATION METHOD FOR COMPUTATION PARTITIONING ORIENTED TO A DISTRIBUTED MEMORY

[75] Inventors: Makoto Sato, Sagamihara; Kiyomi Umehara, Yokohama, both of Japan

[73] Assignee: Hitachi, Ltd., Tokyo, Japan

[21] Appl. No.: 642,676

[22] Filed: May 3, 1996

[30] Foreign Application Priority Data

May 9, 1995 [JP] Japan .................................. 7-110473

[51] Int. Cl.[6] .................................................. G06F 9/45
[52] U.S. Cl. .......................... 395/709; 395/705; 395/706; 364/280.4; 364/280.5; 364/973
[58] Field of Search ................................ 395/705, 706, 395/707, 708, 709, 922, 800.28, 800.29, 800.3; 364/280.4, 280, 280.5, 262, 973

[56] References Cited

PUBLICATIONS

Saltz, et al. "Run–time Parallelization & Scheduling of Loops", IEEE Trans. on Computers, vol. 40, No. 5, pp. 603–612, May 1991.

Primary Examiner—Emanuel Todd Voeltz
Assistant Examiner—Cuong H. Nguyen
Attorney, Agent, or Firm—Antonelli, Terry, Stout & Kraus, LLP

[57] ABSTRACT

When a loop contains a plurality of statements, a compiled program is generated without performing loop distribution, the resultant loop having no runtime resolution statement. A parallelizing compiler comprises a syntax analysis section, a data distribution analysis section, a computation partitioning section, a communication generating section, and a computation partitioning optimizing section composed of a non-intersecting interval sequence generating section for generating a non-intersecting interval sequence from a loop execution range, the sequence being a collection of intervals in each of which statements are either executed or not executed, a loop duplicating section for duplicating loops from an original loop, the non-intersecting interval sequence being used as a loop execution range, and a code transforming section for deleting the runtime resolution statement from the loop.

11 Claims, 28 Drawing Sheets

```
      parameter (n=512)                              — 200
      REAL A(0:n+1),B(0:n+1),C(0:n+1)                — 201
!HPF$ PROCESSORS MP(4)                               — 202
!HPF$ TEMPLATE T(1:n)                                — 203
!HPF$ ALIGN   A(J) WITH T(J)                         — 204
!HPF$ ALIGN   B(J) WITH T(J)
!HPF$ ALIGN   C(J) WITH T(J)
!HPF$ DISTRIBUTE T(BLOCK) ONTO MP                    — 205
      DO 10 J = 1,n                                  — 206
        A(J) = C(J)*AA                               — 207
        B(J+1) = C(J)*BB                             — 208
   10 CONTINUE
      STOP
      END
```

```
INTEGER*4 UPPLIM3, LOWLIM3, UPPLIM2, LOWLIM2, UPPLIM1
INTEGER*4 LOWLIM1, J
REAL*4 BB, AA, C(0:129), A(0:129), B(0:129)          — 300
INTEGER*4 MP                                         — 301

CALL WHOAMI (MP)                                     — 302
COMMUNICATION CODE                                   — 303
VALUE SETTING CODE FOR
LOWLIM1, UPPLIM1, LOWLIM2, UPPLIM2, LOWLIM3, UPPLIM3 — 304

DO J=LOWLIM1, UPPLIM1                                — 305
  IF(J.GE.LOWLIM2.AND.J.LE.UPPLIM2) THEN             — 306
    A(J)=C(J)*AA                                     — 307
  ENDIF
  IF(J.GE.LOWLIM3.AND.J.LE.UPPLIM3) THEN             — 308
    B(J+1)=C(J)*BB                                   — 309
  ENDIF
ENDDO
STOP
END
```

FIG. 4

```
                                                            304
IF (MP.EQ.0) THEN ─────────── 400
    LOWLIM1=1 ─────────────── 401
    UPPLIM1=128 ───────────── 402
ENDIF
IF (MP.GE.1.AND.MP.LE.2) THEN ── 403
    LOWLIM1=0 ─────────────── 404
    UPPLIM1=128 ───────────── 405
ENDIF
IF (MP.EQ.3) THEN ─────────── 406
    LOWLIM1=0 ─────────────── 407
    UPPLIM1=128 ───────────── 408
ENDIF
IF (MP.EQ.0) THEN ─────────── 409
    LOWLIM2=1 ─────────────── 410
    UPPLIM2=128 ───────────── 411
ENDIF
IF (MP.GE.1.AND.MP.LE.2) THEN ── 412
    LOWLIM2=1 ─────────────── 413
    UPPLIM2=128 ───────────── 414
ENDIF
IF (MP.EQ.3) THEN ─────────── 415
    LOWLIM2=1 ─────────────── 416
    UPPLIM2=128 ───────────── 417
ENDIF
IF (MP.EQ.0) THEN ─────────── 418
    LOWLIM3=1 ─────────────── 419
    UPPLIM3=127 ───────────── 420
ENDIF
IF (MP.GE.1.AND.MP.LE.2) THEN ── 421
    LOWLIM3=0 ─────────────── 422
    UPPLIM3=127 ───────────── 423
ENDIF
IF (MP.EQ.3) THEN ─────────── 424
    LOWLIM3=0 ─────────────── 425
    UPPLIM3=128 ───────────── 426
ENDIF
```

FIG. 5
```
      parameter(n=512)
      REAL A(0:n+1),B(0:n+1),C(0:n+1)
!HPF$ PROCESSORS MP(4)
!HPF$ TEMPLATE  T(1:n)
!HPF$ ALIGN    A(J) WITH T(J)
!HPF$ ALIGN    B(J) WITH T(J)
!HPF$ ALIGN    C(J) WITH T(J)
!HPF$ DISTRIBUTE T(BLOCK) ONTO MP DO 10 J = 1,n                    ──── 500
        A(J) = C(J)*AA
  10  CONTINUE
      DO 20 J = 1,n                    ──── 501
        B(J+1) = C(J)*BB
  20  CONTINUE

STOP
      END
```

FIG. 6
```
INTEGER*4 UPPLIM2,LOWLIM2,UPPLIM1,LOWLIM1,J
REAL*4 BB,AA,C(0:129),A(0:129),B(0:129)
INTEGER*4 MP

CALL WHOAMI(MP)
VALUE SETTING CODE FOR LOWLIM1,UPPLIM1 ──── 600
DO J=LOWLIM1,UPPLIM1                   ──── 601
  A(J)=C(J)*AA                         ──── 602
ENDDO

COMMUNICATION CODE
VALUE SETTING CODE FOR LOWLIM2,UPPLIM2 ──── 603
DO J=LOWLIM2,UPPLIM2                   ──── 604
  B(J+1)=C(J)*BB                       ──── 605
ENDDO

STOP
END
```

FIG. 7

```
                                                    600
     IF(MP.EQ.0) THEN
         LOWLIM1=1
         UPPLIM1=128
     ENDIF
     IF(MP.GE.1.AND.MP.LE.2) THEN
         LOWLIM1=1
         UPPLIM1=128
     ENDIF
     IF(MP.EQ.3) THEN
         LOWLIM1=1
         UPPLIM1=128
     ENDIF
```

FIG. 8

```
                                                    603
     IF(MP.EQ.0) THEN
         LOWLIM2=1
         UPPLIM2=127
     ENDIF
     IF(MP.GE.1.AND.MP.LE.2) THEN
         LOWLIM2=0
         UPPLIM2=127
     ENDIF
     IF(MP.EQ.3) THEN
         LOWLIM2=0
         UPPLIM2=128
     ENDIF
```

FIG. 26

```
      REAL*4  BB,AA,C(0:129),A(0:129),B(0:129)
      INTEGER*4 MP,J

CALL WHOAMI(MP)                           ~2600
      COMMUNICATION CODE
      IF(MP.EQ.0) THEN                          ~2601
         DO J=1,127                             ~2602
            A(J)=C(J)*AA                        ~2603
            B(J+1)=C(J)*BB                      ~2604
         ENDDO
         DO J=128,128                           ~2605
            A(J)=C(J)*AA                        ~2606
         ENDDO
      ENDIF

IF(MP.GE.1.AND.MP.LE.2) THEN              ~2607
         DO J=0,0                               ~2608
            B(J+1)=C(J)*BB                      ~2609
         ENDDO
         DO J=1,127                             ~2610
            A(J)=C(J)*AA                        ~2611
            B(J+1)=C(J)*BB                      ~2612
         ENDDO
         DO J=128,128                           ~2613
            A(J)=C(J)*AA                        ~2614
         ENDDO
      ENDIF

IF(MP.EQ.3) THEN                          ~2615
         DO J=0,0                               ~2616
            B(J+1)=C(J)*BB                      ~2617
         ENDDO
         DO J=1,128                             ~2618
            A(J)=C(J)*AA                        ~2619
            B(J+1)=C(J)*BB                      ~2620
         ENDDO
      ENDIF
      STOP
      END
```

FIG. 35

```
INTEGER*4 UPPLIM3, J, MP
INTEGER*4 LOWLIM3, UPPLIM2, LOWLIM2, UPPLIM1, LOWLIM1
REAL*4 BB, AA, C(0:129), A(0:129), B(0:129)

CALL WHOAMI (MP)

COMMUNICATION CODE
VALUE SETTING CODE OF LOWLIM1, UPPLIM1 —— 3500

DO J=LOWLIM1, UPPLIM1 —— 3501
    B(J+1)=C(J)*BB —— 3502
ENDDO

VALUE SETTING CODE OF LOWLIM2, UPPLIM2 —— 3503

DO J=LOWLIM2, UPPLIM2 —— 3504
    A(J)=C(J)*AA —— 3505
    B(J+1)=C(J)*BB —— 3506
ENDDO

VALUE SETTING CODE OF LOWLIM3, UPPLIM3 —— 3507

DO J=LOWLIM3, UPPLIM3 —— 3508
    A(J)=C(J)*AA —— 3509
ENDDO
STOP
END
```

FIG. 36
```
IF (MP.EQ.0)  THEN                    — 3600
  LOWLIM1=1                           — 3601
  UPPLIM1=0                           — 3602
ENDIF
IF (MP.GE.1.AND.MP.LE.2)  THEN        — 3603
  LOWLIM1=0                           — 3604
  UPPLIM1=0                           — 3605
ENDIF
IF (MP.EQ.3)  THEN                    — 3606
  LOWLIM1=0                           — 3607
  UPPLIM1=0                           — 3608
ENDIF
```

FIG. 37
```
IF (MP.EQ.0)  THEN                    — 3700
  LOWLIM2=1                           — 3701
  UPPLIM2=127                         — 3702
ENDIF
IF (MP.GE.1.AND.MP.LE.2)  THEN        — 3703
  LOWLIM2=1                           — 3704
  UPPLIM2=127                         — 3705
ENDIF
IF (MP.EQ.3)  THEN                    — 3706
  LOWLIM2=1                           — 3707
  UPPLIM2=128                         — 3708
ENDIF
```

FIG. 38
```
IF (MP.EQ.0)  THEN                    — 3800
  LOWLIM3=128                         — 3801
  UPPLIM3=128                         — 3802
ENDIF
IF (MP.GE.1.AND.MP.LE.2)  THEN        — 3803
  LOWLIM3=128                         — 3804
  UPPLIM3=128                         — 3805
ENDIF
IF (MP.EQ.3)  THEN                    — 3806
  LOWLIM3=1                           — 3807
  UPPLIM3=0                           — 3808
ENDIF
```

OPTIMIZATION METHOD FOR COMPUTATION PARTITIONING ORIENTED TO A DISTRIBUTED MEMORY

BACKGROUND OF THE INVENTION

1. Field of the Invention

The present invention relates to a translator or a compiler for translating or compiling through an electronic computer a source program having a data distribution directive into a source program including parallel library call oriented to a distributed memory parallel machine or into an object program oriented thereto. More particularly, the present invention relates to a method of optimizing computation partitioning oriented to a distributed memory parallel machine.

2. Description of the Related Art

Referring to FIG. 40, there is shown a conventional parallelizing compiler 4000 that includes data distribution and computation partitioning.

The parallelizing compiler 4000 comprises a syntax analysis section 102 for entering a source program 101 having a data distribution directive and outputting a dictionary 112 and an intermediate language 113, a data distribution analysis section 103 for entering the dictionary 112 and the intermediate language 113, performing data distribution, and reflecting the result on the dictionary 112, a computation partitioning section 104 for entering the dictionary 112 and the intermediate language 113, dividing computations in the program into processors, and reflecting the result on the intermediate language 113, a communication generating section 105 for entering the dictionary 112 and the intermediate language 113, generating a communication instruction intermediate language for referencing data held in other processors, and inserting the generated communication instruction intermediate language into the intermediate language 113, and a source code generating section 110 for entering the intermediate language 113 and generating a source program 111 containing data communication.

Before describing the conventional technique, terms "data distribution directive," "program oriented to distributed memory parallel machine," "computation partitioning," and "loop distribution" used herein will be described with reference to an example of the source program 101 having a data distribution directive.

First, the data distribution direction denotes as follows.

The data distribution directive is represented in a statements 202 through 205 of FIG. 2 for example. The statements 202 through 204 instruct the compiler to distribute the data and the statement 205 instructs the compiler to assign the distributed data to different processors or processes.

To be more specific, the statement 202 is a statement in which the allocation of a logical processor group is declared. The logical processor group is given a name MP. There are four logical processors allocated in one dimension. That is, the four logical processors are referenced by names MP(1), MP(2), MP(3), and MP(4) respectively. The four logical processors are aligned with respective physical processors by the operating system (OS) in general. Because the OS implements the logical processors by processes, a plurality of logical processors may be aligned with one physical processor. Hereinafter, a logical processor and a process are used in the same meaning.

The statement 203 is a declaration of a logical array consisting of n elements T(1), . . . , T(n). This declaration is used to direct the data distribution for a plurality of user arrays collective. That is, if the plurality of user arrays are aligned with a logical array T(J) in the statement 204 and subsequent two lines and the data distribution for the logical array is directed in the statement 205 to be described, the same effect as directing the data distribution for the plurality of user arrays is obtained. The logical array herein means an array for which no memory area is actually allocated, facilitating the user only to describe the data distribution.

The statement 204 shows a relationship between a user array A(J) and the logical array T(J) that A(1) and T(1), A(2) and T(2), . . . , A(n) and T(n) are in a same logical processor. The following two lines show relationships between a user array B(J) and the logical array T(J) and a user array C(J) and the logical array T(J) respectively that B(1) and T(1), B(2) and T(2), . . . , B(n) and T(n) are in a same logical processor, and C(1) and T(1), C(2) and T(2), . . . , C(n) and T(n) are in a same logical processor.

J is a parameter of an array subscript indicating that the above-mentioned relationship for each array element is established over all array subscripts 1 to n in the declaration statement 203 of T.

The statement 205 is a statement that instructs a method of distributing data of the logical array T(J) and a method of assigning distributed data to logical processors. In the statement 205, "T(BLOCK)" denotes that the logical array T(J) is partitioned to subarrays in which array subscripts J are continuous. "ONTO MP" denotes that resultant subarrays are assigned to the logical processor MP.

That is, since n=512 in the statement 200 and the number of logical processors MP=4 in the statement 202, this data distribution directive indicates that T(1) through T(128) be assigned to MP(1), T(129) through T(256) be assigned to MP(2), T(257) through T(384) be assigned to MP(3), and T(385) through T(512) be assigned to MP(4) respectively.

At this time, since the range (0:1+1) instructed in the statement 201 of the declaration of arrays A, B, and C is greater than the declaration (1:n) of the logical array T, the assignment of A(0) and A(513) for example is made to MP(1) and MP(4) respectively although not specified especially, for "BLOCK" indicates the partitioning to the subarrays with the array subscripts being continuous.

The following describes the meaning of the program oriented to distributed memory parallel machine.

The program oriented to distributed memory parallel machine herein denotes a program of a single program multiple data (SPMD) type. The SPMD-type program is a program of a kind for used in operating multiple processors or processes (a processor and a process are together referred to simply a process hereinafter). That is, the SPMD-type program is a program in which there is only one program that executes multiple processes (Single Program) but each process has different data (Multiple Data). It should be noted that each process executes a same program but this does not necessarily denote that the processes execute a same portion of the program. Namely, each process has a unique number; therefore, there are a statement for getting the process number and a statement for changing processing according to the gotten process number in the program, different processing can be described for each process.

Referring to FIG. 3, there is shown a source program containing data communication 111 that is generated by translating the source program having data distribution directive by using the syntax analysis section 102 through the communication generating section 105 and the source code generating section 110 of the parallelizing compiler 4000 of FIG. 40. This source program containing data communication 111 is one example of the SPMD-type program. Namely, four processes specified in the statement 202 execute this one program, each of the processes performing computation by using a different portion of the arrays A, B and C. For example, the declaration of the array A in the statement 300 is 0 through 129, but this does not mean that the data are the same throughout the processes. Rather, the relationship between the subscript of the array A of the original program and the subscript of the array A assigned to the processes is different for each process. In the program of FIG. 3, the processes numbers are 0 through 3, in which processes 0, 1, 2 and 3 correspond to the above-mentioned MP(1), MP(2), MP(3) and MP(4) respectively. For example, array elements A(1) in the processes 0, 1, 2 and 3 correspond to array elements A(1), A(129), A(257) and A(385) respectively.

The program of FIG. 3 also indicates that a manner in which the program is executed is different for each process. The statement 302 is for getting a process number. When this statement is executed, a process number unique to each process is stored in a variable MP.

FIG. 4 shows "value setting code of LOWLIM1, UPPLIM1, LOWLIM2, UPPLIM2, LOWLIM3, UPPLIM3" 304 of FIG. 3. Here, as shown in statements 400, 403, and 406, the different processing is performed according to the values of process numbers MP.

The following describes "computation partitioning."

Computation partitioning denotes obtaining a computational portion to be shared by each process when translating the source program having data distribution directive to the source program containing data communication. For example, the statement 305 of FIG. 3 indicates that the execution range of the DO loop is from LOWLIM1 to UPPLIM1, these values being different from process to process. In the statement 304, namely, the statements 401 and 402, the statements 404 and 405, and the statements 407 and 408 of FIG. 4 set the values of LOWLIM1 and UPPLIM1 for the process 0, the processes 1 to 2, and the process 3 respectively.

For the computation partitioning, "owner compute rule" is applied. This rule specifies which of the processes executes an assignment statement. In this rule, the assignment statement is executed by a process having the array element in the left side member of the assignment statement. According to this rule, since A(1) and A(129) of FIG. 2 are assigned to the process 0 and the process 1 respectively, the statement 207 in the loop 206 when the values of J are 1 and 129 are executed by the process 0 and the process 1 respectively.

The following describes "loop distribution."

Loop distribution denotes division of one loop into a plurality of loops.

FIG. 5 shows an example of dividing one loop into a plurality of loops. In this example, statements 500 and 501 indicate two divided loops respectively obtained by the DO loop 206 of FIG. 2.

The following describes two types of conventional techniques associated with a translator or a compiler in which a source program having data distribution directive is entered to be translated or compiled to a program oriented to distributed memory parallel machine.

The first conventional technique is used in the following situation. Namely, when a loop contains a plurality of assignment statements and, in the process of the above-mentioned program translation by translator or compiler, if the execution ranges of two assignment states in that loop are different, namely, if, when a certain process is fixed, ranges in which loop induction variables move when the process executes one assignment statement and another assignment statement are different, the computation of the loop is partitioned for each process. As a result of the computation partitioning, the execution range of the above-mentioned loop is regarded as a union of the execution ranges of the statements in the loop. The first conventional technique generates a code in which each statement in the loop is executed under a guard only in the own execution range. This conventional technique is described in the COMMUNICATIONS OF THE ACM, August 1992/Vol. 35, No. 8, pp. 66–80, for example.

FIGS. 3 and 4 show results of the translation of a program by the above-mentioned first conventional technique.

The statement 300 is an array declaration obtained by performing data distribution on arrays A, B, and C. Addition of array subscripts 0 to 129 indicates that the array declaration has been extended to provide a temporary region for communication (a communication buffer region for storing communication data coming from neighborhood.

The statement 301 is a statement for declaration of a variable for storing a process number. The statement 302 is a procedure call statement for storing the process number in the MP. The statement 303 is a code for indicating data communication, of which description is omitted from the present specification.

As shown in the statement 200 of FIG. 2, the value of n is 512. As shown in the statements 202 through 205, the original arrays A and B are assigned to each process as follows: A(0) through A(128) and B(0) through B(128) to the process 0, A(129) through A(256) and B(129) through B(256) to the process 1, A(257) through A(384) and B(257) through B(384) to the process 2, and A(385) through A(513) and B(385) through B(513) to the process 3, respectively.

According to the above-mentioned assignment and the owner compute rule, the J values for executing the statement 7 are 1 through 128, 129 through 256, 257 through 384, and 385 through 512 for the processes 0, 1, 2 and 3 respectively. When these are array-declared like the statement 300 of FIG. 3, all assignments become 1 through 128 for each process. These are shown in statements 409 through 417 of FIG. 4. The details these array declarations are described in the above-mentioned document.

Likewise, values of (J+1) for executing the statement 208 are 2 through 128, 129 through 256, 257 through 384, and 385 through 512 for the processes 0, 1, 2 and 3, respectively. Therefore, the J values for executing the statement 208 are 1 through 127, 128 through 255, 256 through 383, and 384 through 512 for the processes 0, 1, 2 and 3, respectively. When these are array-declared as shown in the statement 300, the values become 1 through 127, 0 through 127, 0 through 127, and 0 through 128 for the processes 0, 1, 2 and 3, respectively. These are shown in statements 418 through 426 of FIG. 4.

As described above, the execution ranges of the two statements in the loop are different, so that the above-mentioned first conventional technique requires larger loop execution ranges to execute these execution statements. Namely, a union of these two execution ranges is taken for each process region. By taking the union, the execution ranges for the statements 207 and 208 are 1 through 128 and 1 through 127, 1 through 128 through 0 through 127, 1 through 128 and 0 through 127, and 1 through 128 and 0 through 128 for the processes 0, 1, 2 and 3, respectively, so that the results of the taking of union become 1 through 128, 0 through 128, 0 through 128, and 0 through 128.

Consequently, each statement needs to be executed by determining only the necessary execution range of the execution ranges expressed in the union, thereby preventing each statement from performing excess computation.

In what follows, a second conventional technique will be described.

If a loop contains a plurality of assignment statements and the loop is distributable and, as a result, the execution ranges of the assignment statements of the distributed statements are all similar, then the second conventional technique generates a code in which the execution range of each of the distributed loops is the same as the execution range of each assignment statement in the loop as a result of computation partitioning and each statement in the loop is not attached with a guard. This second conventional technique is described in the "Supercompilers for Parallel And Vector Computers," Hans Zima & Barbara Chapman, 1991, Addison-Wesley Publishing Company.

An example based on the second conventional technique will be described below.

FIG. 5 shows a result obtained by distributing one loop of FIG. 2 to a plurality of loops. Namely, the DO loop 206 represented in the statements 206 through 208 of FIG. 2 is distributed to two DO loops 500 and 501 of FIG. 5.

FIG. 6 shows a result of the translation of FIG. 5 by the second conventional technique. Statement 600 is "value setting code of LOWLIM1, UPPLIM1," contents of which are shown in FIG. 7. DO loop 601 is a result of the computation partitioning of the DO loop 500 of FIG. 5. Statement 603 is "value setting code of LOWLIM2, UPPLIM2," contents of which are shown in FIG. 8. DO loop 604 is a result of the computation partitioning of the DO loop 501. As seen from the DO loops 601 and 604 obtained by the computation partitioning, each of the statements in the loops has no guard. It should be noted that a method of obtaining the values of LOWLIM1, UPPLIM1, LOWLIM2 and UPPLIM2 of FIG. 8 is the same as that of obtaining the values of LOWLIM2, UPPLIM2, LOWLIM3 and UPPLIM3 of FIG. 4.

The following describes problems involved in the above-mentioned two conventional techniques.

The first conventional technique does not consider the processing speed of the translation program; namely, the DO loops contain a guard, preventing the translation processing from being increased in processing speed. For example, as shown in FIG. 3, when the assignment statements 307 and 309 in the DO loop 305 after translation are executed, the guards 306 and 308 must also be executed every time the assignment statements are executed, thereby taking excess time.

Also, the second conventional technique does not consider the processing speed of the translation program; namely, as the number of loops increases, it takes too much for performing the final decision, preventing the processing time from being enhanced. For example, when the DO loop 206 of FIG. 2 has been loop-distributed and parallelized to provide the DO loops 601 and 604 of FIG. 6, the number of times the loop end is determined increases by the increased number of loops. In addition, as the number of statements in one loop decreases by the loop distribution from the two statements 207 and 208 of FIG. 2 to one statement 602 and another statement 605 of FIG. 6 respectively, effects of instruction scheduling and Superscalar drop and an excess LOAD/STORE instruction is required if data transfer is necessary between distributed loops.

The second conventional technique is applicable only to the cases in which programs are loop-distributable and there is no consideration for the translation of programs for which loop distribution cannot be performed. This limitation makes the applicable scope of the technique narrow.

SUMMARY OF THE INVENTION

It is therefore an object of the present invention to provide a method of optimizing computation partitioning for generating a translated program having no guard in a loop without performing loop distribution.

It is another object of the present invention to provide a method of optimizing computation partitioning for decreasing the number of newly generated loops when generating a translated program of the above-mentioned type.

It is still another object of the present invention to provide a method of optimizing computation partitioning for generating, without performing loop distribution, a guard for each statement for a loop having a relatively small number of execution times and, for a loop having a relatively large number of execution times, generating a translated program having no guard in the loop.

It is yet another object of the present invention to provide a method of optimizing computation partitioning for deleting a code that is not executed when generating a translated program having any of the above-mentioned types.

In carrying out the invention and according to one aspect thereof, there is provided a method of optimizing computation partitioning for compiling by use of an electronic computer a program having data distribution directive into a parallel program that runs on a plurality of processes, comprising the steps of: analyzing the program having data distribution directive to determine a relationship between array elements and processes to which the array elements are assigned; based on a rule for relating an array and a statement and a relationship between an array subscript and a loop induction variable, determining for each of the processes a statement execution range which is a range of values of the loop induction variable for executing the statement in a loop in own process for each statement; performing for each of the processes non-intersecting interval sequence generation for generating a non-intersecting interval sequence composed of a plurality of intervals not overlapping each other, a union of the plurality of intervals including a union of statement execution ranges; performing loop duplicating processing by setting each of the plurality of intervals of the non-intersecting interval sequence to a loop execution range and generating statements in the loop by duplicating an original loop; and performing code transforming processing for transforming a code for each statement in the loop by use of the loop execution range and the statement execution range.

The step for performing the above-mentioned non-intersecting interval sequence generation generates a non-intersecting interval sequence in which it is determined whether each statement is executed in each of the plurality of intervals not overlapping each other.

The step for performing the above-mentioned non-intersecting interval sequence generation further generates, for a given non-intersecting interval sequence, as a new non-intersecting interval sequence, a union of a first non-intersecting interval sequence which is a collection of intervals selected by a specified interval selecting method from the non-intersecting interval sequence and a second non-intersecting interval sequence which is a collection of intervals obtained by uniting adjacent intervals of intervals not selected by the specified interval selecting method. It should be noted that, in the interval selecting method, the nonintersecting intervals are sorted by length to be selected starting from the longest interval until a specified number of intervals is reached; alternately, the plurality of non-intersecting intervals are sorted by length, a sum of the lengths is obtained starting from the length of the longest interval, and the intervals are kept selected until the sum reaches a specified value.

The step for performing the above-mentioned loop duplicating processing generates a guard for determining whether each of the processes is a process concerned and, when a condition of the guard is established, duplicates a loop by use of the non-intersecting interval sequence of the process concerned.

The step for performing the above-mentioned loop duplicating processing further comprising the steps of: creating an order representation for determining a selecting ordering for selecting the non-intersecting intervals over all processes; performing non-intersecting interval selecting processing for determining selecting processes from the all processes and a non-intersecting interval based on the order representation; performing loop duplicating processing on the process that selected the non-intersecting interval for generating a single loop common to the processes with the selected non-intersecting interval providing the loop execution range; generating a code that prevents the execution of the loop for the process which did not select the non-intersecting interval; and repeating the above-mentioned steps included in the step for performing the loop duplicating processing until there is no more non-intersecting interval that is not selected by any process.

The step for generating the above-mentioned order representation comprising the steps of: for a given number and a given interval, generating the order representation of number to interval in which 1 when the given number is smaller than a lower bound value of the interval, 2 when the given number is included in the interval, and 3 when the given number is larger than an upper bound value of the interval are related to the given number; for the given number and a plurality of ordered intervals, generating an order representation of numbers to interval, order representation being composed of a number series obtained by sorting the order representation of number to interval by a given ordering; for the given number series and the given ordered interval, generating an order representation of number series to ordered interval, the order representation being composed of a number series obtained by sorting the order representation of number to ordered interval in the ascending order of values of the number series; for each of the processes and for an execution range for each statement in a given loop and a given non-intersecting interval series, generating a number series composed of lower bound values of the non-intersecting interval series; and obtaining an order representation for the ordered interval of the generated number series by giving a specified ordering to the execution range.

The step for performing the above-mentioned non-intersecting interval sequence selection selects, for each of the processes, minimum values in a number series contained in the obtained order representation and not yet selected and selects a non-intersecting interval corresponding to a minimum value of the selected minimum values over all processes and a process corresponding to the selected non-intersecting interval.

The step for performing the above-mentioned code transformation performs at least one of runtime resolution elimination processing, when the execution range of statements in the loop includes the loop execution range, for performing code transformation such that the statement concerned in the loop concerned is executed without runtime resolution, and statement delete processing, when the execution range of statements in the loop does not overlap the loop execution range, for deleting the statement concerned in the loop concerned and, in other cases, performs code transformation such that the statement concerned in the loop concerned is executed only when the loop induction variable is included in the execution range of the statement concerned. Further, the above-mentioned code transforming processing, when all statements in the loop are deleted by the statement delete processing, performs, for each of the processes, transformation such that each statement in the duplicated loop is not executed.

According to the present invention, the novel constitution generates a non-intersecting interval sequence composed of a plurality of intervals not overlapping each other, a union of the plurality of intervals including a union of statement execution ranges and performs loop duplicating processing by setting each of the plurality of intervals of the non-intersecting interval sequence to a loop execution range and generating statements in the loop by duplicating an original loop. Consequently, each statement in each loop is either executed always or not executed at all, so that a program having no guard in the loop can be generated.

Thus, in code transformation, if the execution range of the statement in the loop includes the loop execution range, code transformation is performed such that the statement in the loop is executed without runtime resolution and, if both execution ranges are mutually disjoint, the statement in the loop may only be deleted.

In one method of generating as an SPMD-type program a loop having the above-mentioned non-intersecting interval different for each process as a loop execution range, a guard for determining whether each process is the process concerned in the loop generating processing; the loop may be generated such that, when the condition of the guard is satisfied, the loop using the non-intersecting interval sequence of that process is executed.

Thus, the compiled program having no guard in the loop can be generated without performing loop distribution.

In the loop generating processing, if the order representation is the same between the non-intersecting intervals of the processes when the non-intersecting intervals are took as the loop execution range, the collections of the statements that are always executed in the loop match each other, so that each process can use the common loop although the loop execution range differs from loop to loop.

This is implemented by performing, based on the order representation, the non-intersecting interval selection processing for determining selecting processes selected from all processes and determining non-intersecting intervals, performing the loop generating processing for generating, for the processes that selected the above-mentioned non-intersecting intervals, a single loop common to the processes for which the selected non-intersecting intervals provide the loop execution range, generating a code such that the loop is not executed for the processes that did not select the above-mentioned non-intersecting intervals, and repeating these steps until there is no more non-intersecting interval that is not selected by any process.

Thus, a program having relatively small number of loops can be generated, the program having no guard in the loop generated without loop distribution.

Of given non-intersecting interval sequences, a collection of intervals selected in a specified interval selecting method is regarded as a first non-intersecting interval sequence, a collection of unselected adjacent intervals is regarded as a second non-intersecting interval sequence, and a union of the first and second non-intersecting interval sequences is regarded as a new non-intersecting interval sequence. The intervals are selected in the order of the longer intervals until the specified number of intervals is selected or the intervals are selected in the order of the longer intervals until a sum of the lengths reaches a specified value. For a loop having relatively small number of execution times, a guard is generated for each statement. A loop having a relatively large number of execution times is given to the first non-intersecting interval sequence. A loop having a relatively small number of execution times is given to the second non-intersecting interval sequence.

In the above-mentioned processing, each execution statement in each loop for the first non-intersecting interval sequence is either always executed or not executed at all, so that a program having no guard in the loop can be generated. However, this is not established in any loop for the second non-intersecting interval sequence, so that each execution statement in each loop need to be attached with a guard.

This is implemented by performing code transformation such that, if the execution range of the statement in the loop includes the loop execution range, the statement in the loop is executed without runtime resolution, deleting the statement in the loop if the execution range of the statement in the loop and the loop execution range are mutually disjoint, and, in other cases, performing code transformation such that the statement in the loop is executed only when the loop induction variable is included in the execution range of that statement.

Thus, this novel setup can generate, without performing loop distribution, a compiled program in which a guard is generated for each statement for a loop having relatively small number of execution times and no guard is included in the loop having a relatively large number of execution times.

In the runtime resolution elimination in the code transformation processing, if code transformation is performed such that the loop is not executed if all statements in that loop are deleted, a compiled program from which the codes not to be executed are deleted can be generated when generating a compiled program having any of the above-mentioned advantages.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 2 is an example of a source program having data distribution directive;

FIG. 3 is an example of a source program containing data communication obtained by compiling the source program having data distribution directive of FIG. 2 by using a syntax analysis section through a communication generating section and a source code generating section of the parallelizing compiler of FIG. 1;

FIG. 4 shows value setting codes of LOWLIM1, UPPLIM1, LOWLIM2, UPPLIM2, LOWLIM3 and UPPLIM3 of FIG. 3;

FIG. 5 shows a result of loop distribution performed on the program of FIG. 2;

FIG. 6 shows a source program containing data communication obtained by compiling the program of FIG. 5 by using the syntax analysis section through the communication generating section and the source code generating section of the parallelizing compiler of FIG. 1;

FIG. 7 shows value setting codes of LOWLIM1 and UPPLIM1 of FIG. 6;

FIG. 8 shows value setting codes of LOWLIM2 and UPPLIM2 of FIG. 6;

FIG. 26 shows the results of the processing of loop duplication and code transformation of FIG. 1 in a form of source program instead of the intermediate language;

FIG. 35 shows a description, in a source program, of an application result IL of the duplication of a loop to be shared between processes of FIG. 27;

FIG. 36 shows value setting codes of LOWLIM1 and UPPLIM1 of FIG. 35;

FIG. 37 shows value setting codes of LOWLIM2 and UPPLIM2 of FIG. 35;

FIG. 38 shows value setting codes of LOWLIM3 and UPPLIM3 of FIG. 35;

DESCRIPTION OF PREFERRED EMBODIMENTS

This invention will be described in further detail by way of a first preferred embodiment thereof with reference to FIGS. 1 through 4 and FIGS. 9 through 26.

Figure 1:
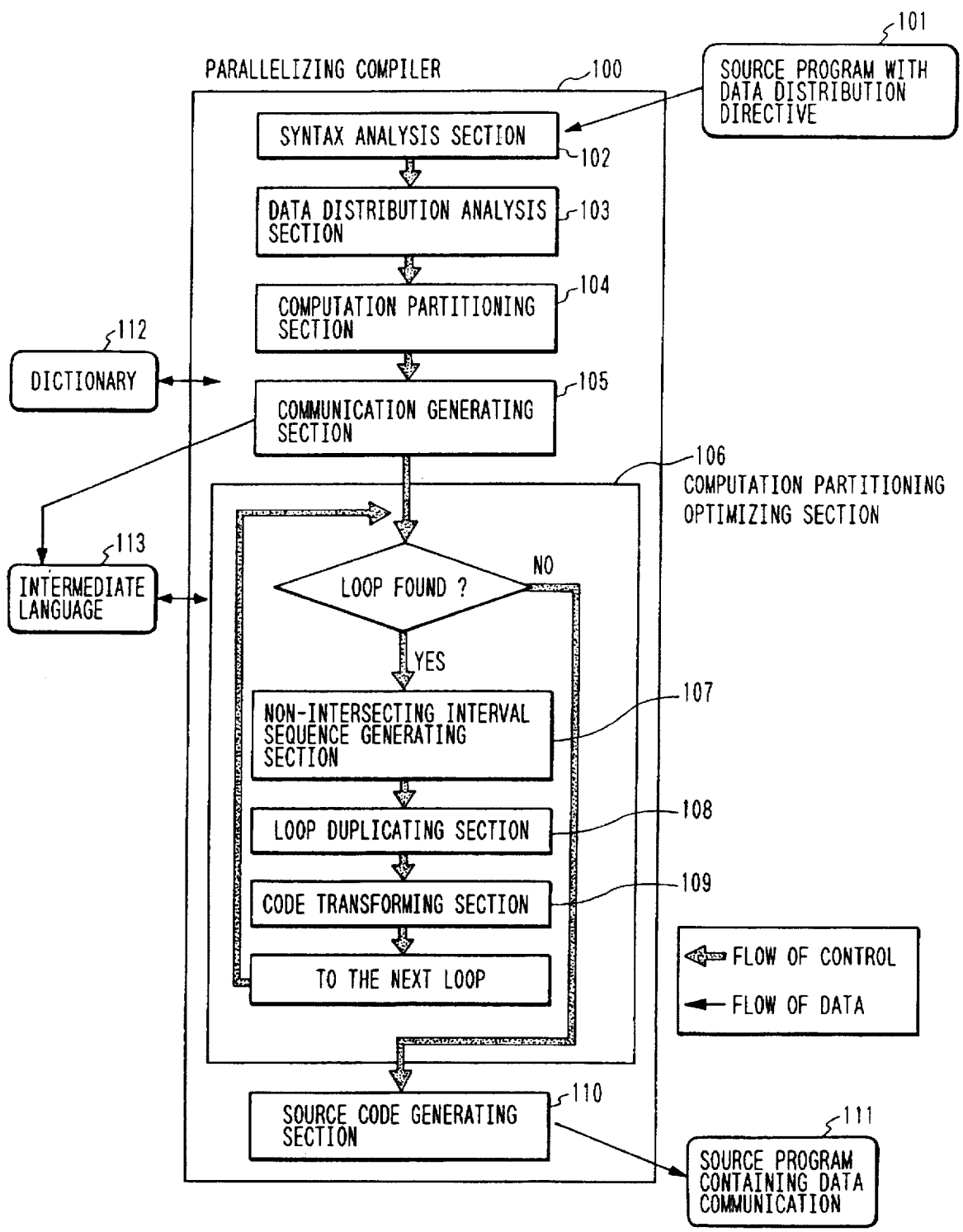
FIG. 1 is a block diagram illustrating a parallelizing compiler practiced as one preferred embodiment of the invention.

Now, referring to FIG. 1, there is shown a block diagram illustrating an overall constitution of a parallelizing compiler 100 practiced as the first preferred embodiment of the invention.

Figure 40:
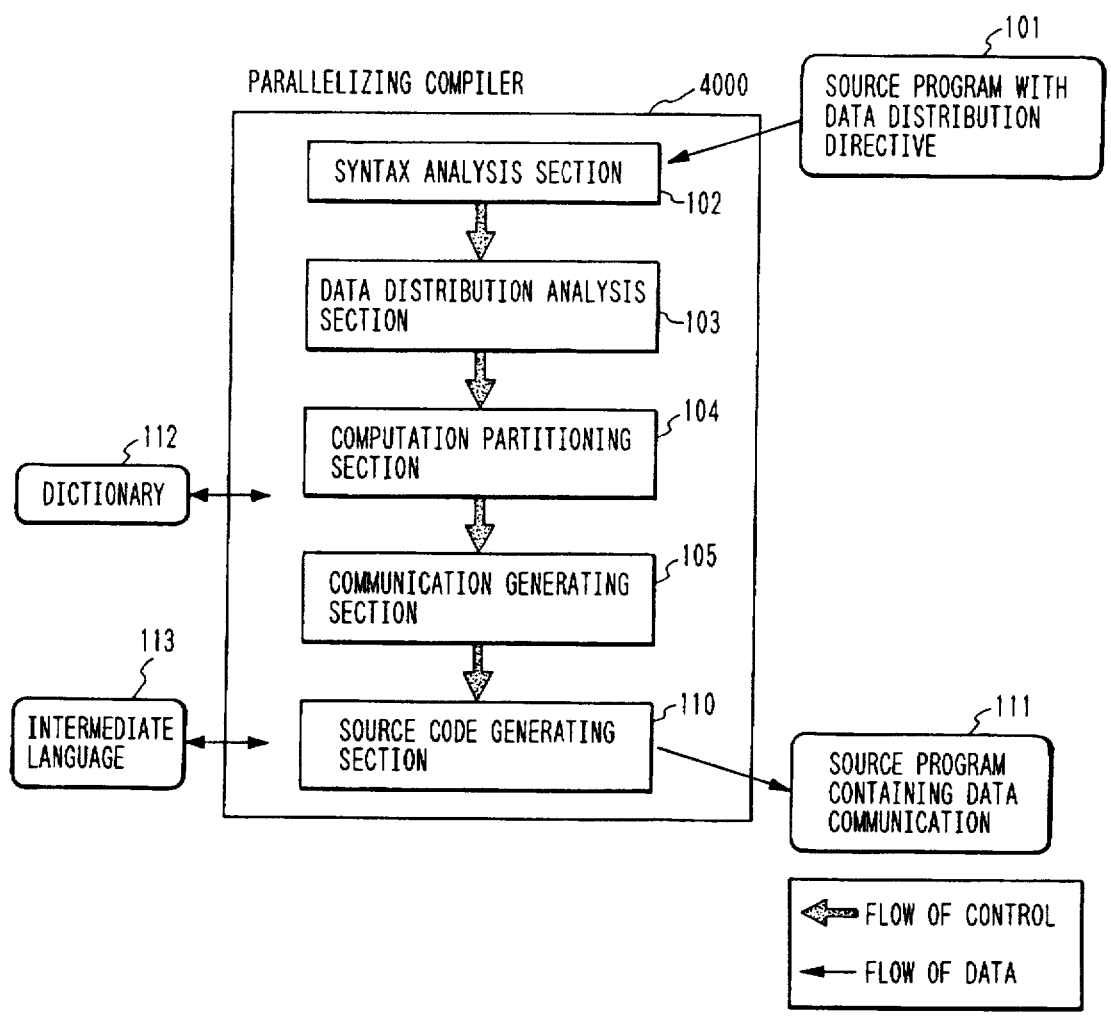
FIG. 40 is a block diagram illustrating a prior-art parallelizing compiler.

The parallelizing compiler 100 comprises: a syntax analysis section 102 which captures a source program having data distribution directive to output a dictionary 112 and an intermediate language 113; a data distribution analysis section 103 which captures the dictionary 112 and the intermediate language 113 and performs data distribution to reflect its result on the dictionary 112; a computation partitioning section 104 which captures the dictionary 112 and the intermediate language 113 and distributes computations in the program to processes to reflect its result on the intermediate language 113; a communication generating section 105 which captures the dictionary 112 and the intermediate language 113 and generates a communication instruction intermediate language for referencing data held in another processor to insert the generated communication instruction intermediate language into the intermediate language 113; a computation partitioning optimizing section 106 which captures the intermediate language 113 to optimize the result of computation partitioning; and a source code generating section 110 which captures the intermediate language 113 to generate a source program 111 containing data communication. It should be noted that, with reference to FIG. 1, components similar to those previously described with FIG. 40 are denoted by the same reference numerals. The parallelizing compiler 100 of FIG. 1 is a program to be executed on a computer. The dictionary 112, the intermediate language 113, and the programs 101 and 111 to be processed are stored in an external storage device.

The computation partitioning optimizing section 106, a component characteristic to the present invention, in which the intermediate language 113 generated by the communication generating section 105 is entered, comprises; a non-intersecting interval sequence 107 in which the intermediate language 113 generated in the communication generating section 105 is entered to generate a non-intersecting interval sequence for all loops in the intermediate language from the execution ranges of the statements in the loops, the sequence being a set of execution ranges not overlapping each other; a loop duplicating section 108 for duplicating loops by using the original loops for loop bodies, the non-intersecting interval sequence providing a loop execution range; and code transforming section 109 for deleting the runtime resolution of the statements in the loops.

The following describes in detail the processing by the parallelizing compiler associated with the present invention based on the block diagram of FIG. 1 and with reference to FIGS. 2 through 4 and FIGS. 9 through 26.

FIG. 2 shows an actual example of the source program 101 having data distribution directive. The description associated with FIG. 2 has already been made relative to the description of the prior art and therefore will be omitted from the following description.

FIG. 3 is an actual example of the source program 111 containing data communication obtained by compiling the source program having data distribution directive of FIG. 2 by the syntax analysis section 102 through the communication generating section 105 and the source code generating section 110 of FIG. 1.

FIG. 4 shows the value setting codes 304 of LOWLIM1, UPPLIM1, LOWLIM2, UPPLIM2, LOWLIM3 and UPPLIM3 of FIG. 3.

The descriptions associated with FIGS. 3 and 4 have already been made relative to the description of the prior art and therefore will be omitted hereinafter.

Figure 16:
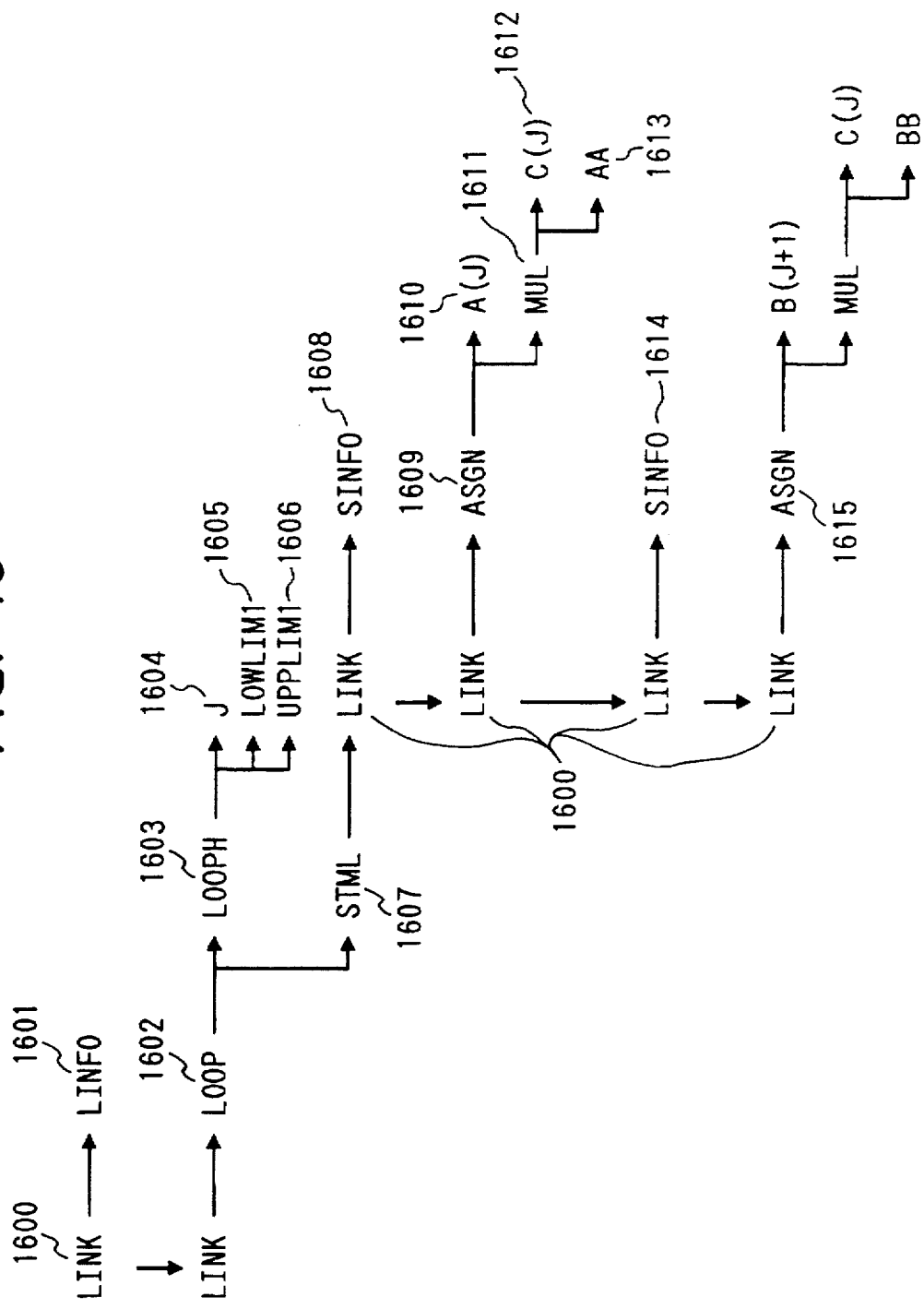
FIG. 16 is a diagram for describing an intermediate language.
Figure 18:
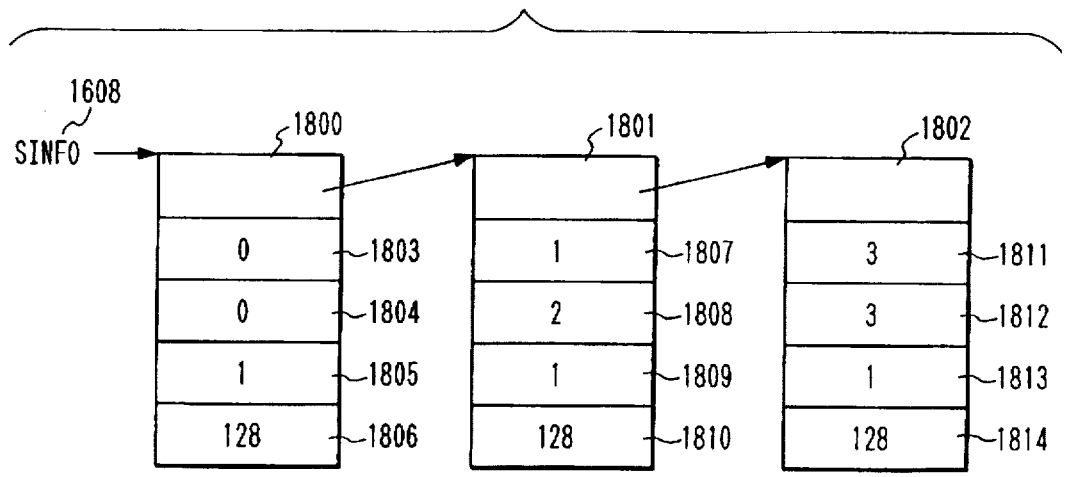
FIG. 18 shows a statement execution range table pointed at by SINFO.
Figure 19:
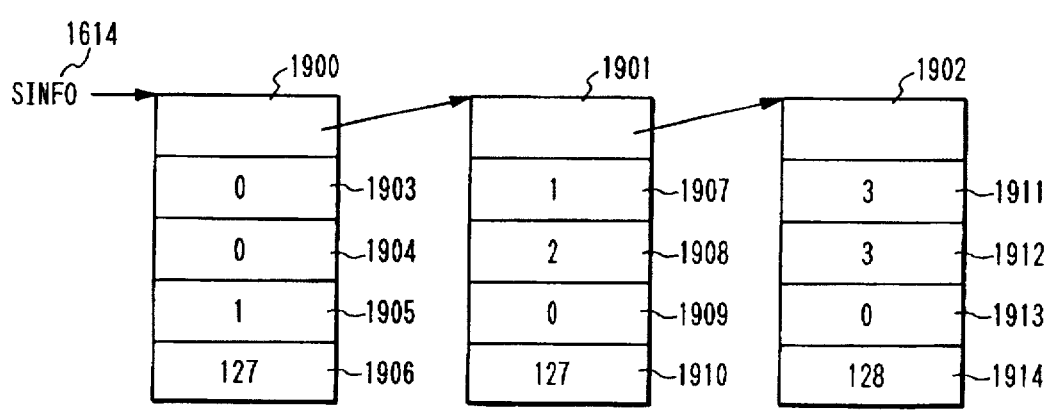
FIG. 19 shows a statement execution range table pointed at by another SINFO.
Figure 20:
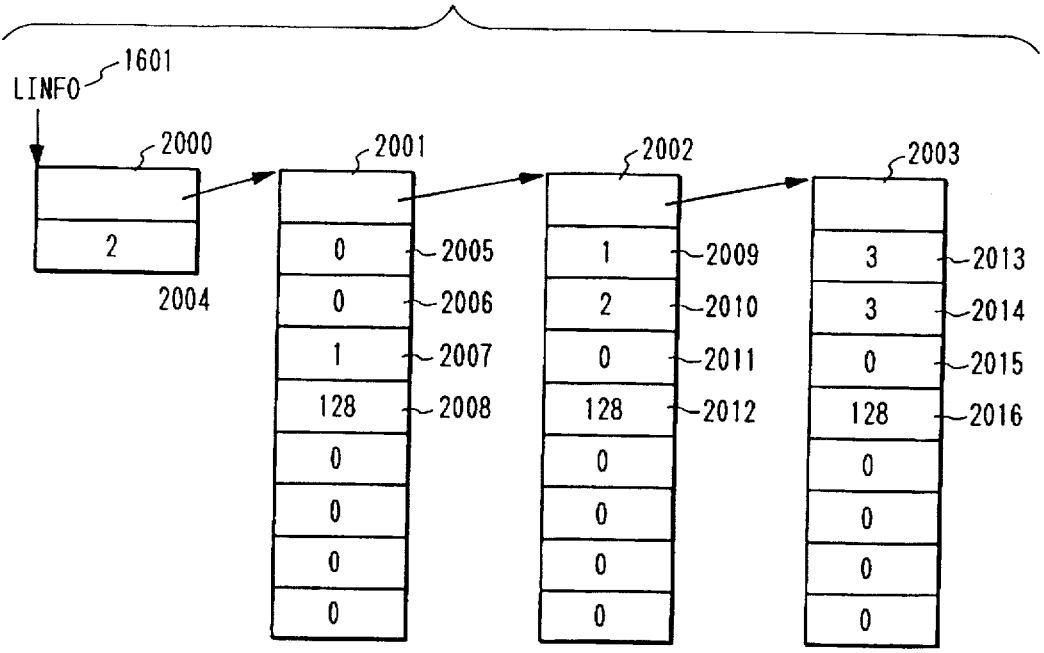
FIG. 20 shows a loop table and a loop execution range table pointed at by LINFO.

FIG. 16 shows an intermediate language obtained immediately after the processing performed on the programs of FIGS. 3 and 4 by the communication generating section 105. FIGS. 18 through 20 show a variety of tables to be pointed by this intermediate language. These language and tables are entered in the computation partitioning optimizing section 106 of the first preferred embodiment. In what follows, these language and tables will be described in detail.

The diagram of FIG. 16 consists of alphabetic characters representative of structures and arrows representative of pointers that connect intermediate languages each other. Each arrow indicates that an intermediate language structure, which is the start point of the arrow stores the address of an intermediate language, which is the end point of the arrow.

LINK 1600 of FIG. 16 is an intermediate language for use in connecting an uncertain number of intermediate languages to an intermediate language. For example, when connecting four intermediate languages SINFO 1608, ASGN 1609, SINFO 1614, and ASGN 1615 to STML 1607, LINK 1600 is inserted between them to connect the four intermediate languages to LINK 1600, the LINKs are connected to each other, and only the first LINK 1600 may only be connected to STML 1607. Thus, use of the LINKs allows an uncertain number of intermediate languages to be connected with each other.

Figure 17:
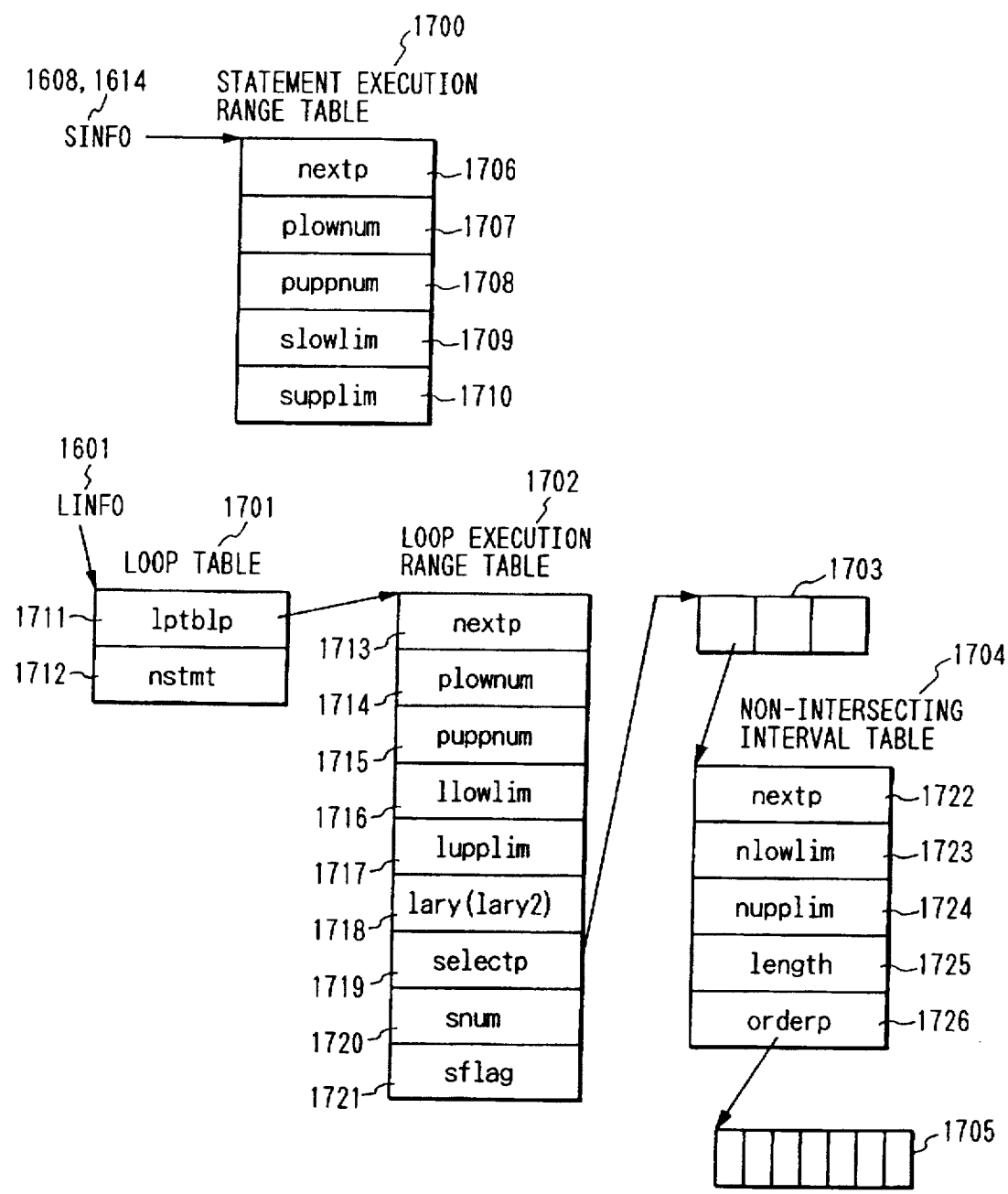
FIG. 17 is a diagram for describing a statement execution range table and a loop table pointed at by the intermediate language of FIG. 16.

LINFO 1601 is an intermediate language for pointing at a loop table 1701 of FIG. 17. This intermediate language and the loop table 1701 are generated by the computation partitioning section 104. LOOP 1602 is an intermediate language representative of a DO loop. This has two pointer storage portions storing the addresses of intermediate languages of LOOPH 1603 and STML 1607 respectively. LOOPH 1603 is an intermediate language representative of the information about the DO loop. This has three pointer storage portions storing the addresses of intermediate languages of J 1604, LOWLIM1 1605, and UPPLIM1 1606 respectively. J 1604 is an intermediate language representative of a loop induction variable. LOWLIM1 1605 is an intermediate language representative of the lower bound value of the loop. In FIG. 16, this indicates a variable. UPPLIM1 1606 is an intermediate language representative of the upper bound value of the loop. In FIG. 16, this indicates a variable. STML 1607 is an intermediate language that operates to bundle a plurality of statements. In FIG. 16, this indicates the intermediate language for bundling the statements in the DO loop.

SINFO 1608 is an intermediate language pointing at a statement execution range table 1700 of FIG. 17. This intermediate language and its statement execution range table 1700 are generated by the computation partitioning section 104. ASGN 1609 is an intermediate language representative of an equal sign in an assignment statement. This has two pointer storage portions storing the addresses of intermediate languages of the left-side member A(J) 1610 of the assignment statement and the right-side member MUL 1611 respectively. A(J) 1610 is an intermediate language representative of an array. MUL 1611 is an intermediate language representative of multiplication. C(J) 1612 is an intermediate language representative of an array. AA 1613 is an intermediate language representative of a variable. Five intermediate languages ASGN 1609 through AA 1613 are representative of "A(J)=C(J)*AA" corresponding to the statement 307 of FIG. 3. ASGN 1615 and the intermediate languages connected thereto are representative, as a whole, of "B(J+1)=C(J)*BB" corresponding to the statement 309 of FIG. 3.

Now, referring to FIG. 17, the statement execution range table 1700 and the loop table 1701 pointed by the intermediate languages SINFO and LINFO respectively will be described. The statement execution range table 1700 is representative of an execution range after the computation partitioning of an execution statement in the DO loop; namely, this table indicates a loop iteration range in which each of processes executes the statement in the DO loop when the computation of the execution statement in the DO loop has been distributed to the processes. The statement execution range table 1700 consists of nextp 1706, plownum 1707, puppnum 1708, slowlim 1709, and supplim 1710. The nextp 1706 indicates a pointer to a next statement execution range table. The plownum 1707 indicates is a lower bound value of a process number having this statement execution range table. The puppnum 1708 is an upper bound value of a process number having this statement execution range table. The slowlim 1709 is a lower bound value of a loop iteration range in which a process having a number within the range indicated by the plownum 1707 and the puppnum 1708 executes a statement. The supplim 1710 is an upper bound value of a loop iteration range in which a process having a number within the range indicated by the plownum 1707 and the puppnum 1708 executes a statement.

The loop table 1701 points the loop execution range table 1702 representative of the execution range to be obtained after computation partitioning of the DO loop and, at the same time, indicates additional information on the loop. The loop table 1701 consists of lptblp 1711 and nstmt 1712. The lptblp 1711 is representative of a pointer to the loop execution range table 1702. The nstmt 1712 indicates the number of statements in the loop.

The loop execution range table 1702 indicates an execution range after the computation partitioning of the DO loop; namely, this is a table that indicates a loop iteration range when each of processes to which the DO loop computation has been distributed executes the loop. This table consists of nextp 1713, plownum 1714, puppnum 1715, llowlim 1716, lupplim 1717, lary(lary2) 1718, selectp 1719, snum 1720, and sflag 1721. The nextp 1713 indicates a pointer to a next loop execution range table. The plownum 1714 is a lower bound value of a process number having this loop execution range table. The puppnum 1715 is an upper bound value of a process number having this loop execution range table. The llowlim 1716 is a lower bound value of a loop iteration range in which a process having a process number within the range indicated by the plownum 1714 and the puppnum 1715 executes the loop. The lupplim 1717 is an upper bound value of a loop iteration range in which a process having a process number within the range indicated by the plownum 1714 and the puppnum 1715 executes the loop. The lary (lary2) is the number of elements of a pointer array 1703. For the convenience of description, this is first referred to as a variable name of lary, which is later changed to a variable name of lary2. The selectp 1719 is a pointer to the pointer array 1703. The snum 1720 and the sflag 1721 are not used in the first preferred embodiment of the invention.

The pointer array 1703 consists of pointers to a non-intersecting interval table 1704. The number of elements of this array is stored in the lary(lary2) 1718 in the loop execution range table 1702.

The non-intersecting interval table 1704 indicates interval information obtained when the loop execution range of each process is divided into intervals not overlapping each other, which are called non-intersecting intervals. This table consists of nextp 1722, nlowlim 1723, nupplim 1724, length 1725, and orderp 1726. The nextp 1722 is a pointer to a next non-intersecting interval table. The nlowlim 1723 is a lower bound value of a non-intersecting interval. The nupplim 1724 is an upper bound value of the non-intersecting interval. The length 1725 is a length of the non-intersecting interval. The orderp 1726 is not used in the first preferred embodiment of the invention.

FIG. 18 is a schematic view of the statement execution range table 1700 pointed by the SINFO 1608. In the statement execution range table 1700, three statement execution range tables 1800, 1801, and 1802 are connected by the pointers nextp of FIG. 17 in this order corresponding to three process ranges (process numbers 0, 1 to 2, and 3).

The first statement execution range table 1800 corresponds to the statements 409 through 411 of FIG. 4. The statement 409 is a resolution statement for handling the case in which the process number is 0. The first statement execution range table 1800 indicates that, for a value indicated by reference numeral 1803, the lower bound value of the process number is 0; for a value indicated by reference numeral 1804, the upper bound value of the process number is 0. At this time, the statement 410 indicates that the lower bound value LOWLIM2 of the loop range in which the execution statement 307 is executed is 1, so that a value indicated by reference numeral 1805 is 1. Likewise, the statement 411 indicates that the upper bound value UPPLIM2 of the loop range in which the execution statement 307 is executed is 128, so that a value indicated by reference numeral 1806 is 128.

The subsequent statement execution range table 1801 corresponds to the statements 412 through 414 of FIG. 4. The statement 412 is a resolution statement for handling the case in which the process numbers are 1 to 2. This indicates that, for a value indicated by reference numeral 1807, the lower bound value of the process number is 1; for a value indicated by reference numeral 1808, the upper bound value of the process number is 2. At this time, the statement 413 indicates that the lower bound value LOWLIM2 of the loop range in which the execution statement 307 is executed is 1, so that a value indicated by reference numeral 1809 is 1. Likewise, the statement 414 indicates that the upper bound value UPPLIM2 of the loop range in which the execution statement 307 is executed is 128, so that a value indicated by reference numeral 1810 is 128.

The third statement execution range table 1802 corresponds to the statements 415 through 417 of FIG. 4. The statement 415 is a resolution statement for handling the case in which the process number is 3. This indicates that, for a value indicated by reference numeral 1811, the lower bound value of the process number is 3; for a value indicated by reference numeral 1812, the upper bound value of the process number is 3. At this time, the statement 416 indicates that the lower bound value LOWLIM2 of the loop range in which the execution statement 307 is executed is 1, so that a value indicated by reference numeral 1813 is 1. Likewise, the statement 417 indicates that the upper bound value UPPLIM2 of the loop range in which the execution statement 307 is executed is 128, so that a value indicated by reference numeral 1814 is 128.

FIG. 19 is a schematic view of the statement execution range table pointed by the SINFO 1614. In the statement execution range table, three statement execution range tables 1900, 1901, and 1902 are connected by the pointers in this order corresponding to three process ranges (process numbers 0, 1 to 2, and 3).

The first statement execution range table 1900 corresponds to the statements 418 through 420 of FIG. 4. The statement 418 is a resolution statement for handling the case in which the process number is 0. This indicates that, for a value indicated by reference numeral 1903, the lower bound value of the process number is 0; for a value indicated by reference numeral 1904, the upper bound value of the process number is 0. At this time, the statement 419 indicates that the lower bound value LOWLIM3 of the loop range in which the execution statement 309 is executed is 1, so that a value indicated by reference numeral 1905 is 1. Likewise, the statement 420 indicates that the upper bound value UPPLIM2 of the loop range in which the execution statement 309 is executed is 127, so that a value indicated by reference numeral 1906 is 127.

The subsequent statement execution range table 1901 corresponds to the statements 421 through 423 of FIG. 4. The statement 421 is a resolution statement for handling the case in which the process numbers are 1 to 2. This indicates that, for a value indicated by reference numeral 1907, the lower bound value of the process number is 1; for a value indicated by reference numeral 1908, the upper bound value of the process number is 2. At this time, the statement 422 indicates that the lower bound value LOWLIM3 of the loop range, in which the execution statement 309 is executed is 0, so that a value indicated by reference numeral 1909 is 0. Likewise, the statement 423 indicates that the upper bound value UPPLIM2 of the loop range in which the execution statement 309 is executed is 127, so that a value indicated by reference numeral 1910 is 127.

The third statement execution range table 1902 corresponds to the statements 424 through 426 of FIG. 4. The statement 424 is a resolution statement for handling the case in which the process number is 3. This indicates that, for a value indicated by reference numeral 1911, the lower bound value of the process number is 3; for a value indicated by reference numeral 1912, the upper bound value of the process number is 3. At this time, the statement 425 indicates that the lower bound value LOWLIM3 of the loop range in which the execution statement 309 is executed is 0, so that a value indicated by reference numeral 1913 is 0. Likewise, the statement 426 indicates that the upper bound value UPPLIM3 of the loop range in which the execution statement 309 is executed is 128, so that a value indicated by reference numeral 1914 is 128.

FIG. 20 shows a loop table pointed by LINFO 1601 and loop execution range tables connected thereto. The loop table 2000 connects the loop execution range tables by pointers. The loop execution range tables correspond to three process ranges (process numbers 0, 1 to 2, and 3). The three loop execution range tables 2001, 2002, and 2003 are connected by pointers 1713 of FIG. 17 in this order.

The loop table 2000 corresponds to the statement 206 of FIG. 2 and there are two execution statements in the loop, so that a value indicated by reference numeral 2004 is 2.

The first loop execution range table 2001 corresponds to the statements 400 through 402 of FIG. 4. the statement 400 is a resolution statement for handling the case in which the process number is 0. This indicates that, for a value indicated by reference numeral 2005, the lower bound value of the process number is 0; for a value indicated by reference numeral 2006, the upper bound value of the process number is 0. At this time, the statement 401 indicates that the lower bound value LOWLIM1 of the loop range of the loop 305 is 1, so that a value indicated by reference numeral 2007 is 1. Likewise, the statement 402 indicates that the upper bound value UPPLIM1 of the loop range of the loop 305 is 128, so that a value indicated by reference numeral 2008 is 128.

The subsequent loop execution range table 2002 corresponds to the statements 403 through 405 of FIG. 4. The statement 403 is a resolution statement for handling the case in which the process numbers are 1 to 2. This indicates that, for a value indicated by reference numeral 2009, the lower bound value of the process number is 1; for a value indicated by reference numeral 2010, the upper bound value of the process number is 2. At this time, the statement 404 indicates that the lower bound value LOWLIM1 of the loop range of the loop 305 is 0, so that a value indicated by reference numeral 2011 is 0. Likewise, the statement 405 indicates that the upper bound value UPPLIM1 of the loop range of the loop 305 is 128, so that a value indicated by reference numeral 2012 is 128.

The last loop execution range table 2003 corresponds to the statements 406 through 408 of FIG. 4. The statement 406 is a resolution statement for handling the case in which the process number is 3. This indicates that, for a value indicated by reference numeral 2013, the lower bound value of the process number is 3; for a value indicated by reference numeral 2014, the upper bound value of the process number is 3. At this time, the statement 407 indicates that the lower bound value LOWLIM1 of the loop range of the loop 305 is 0, so that a value indicated by reference numeral 2015 is 0. Likewise, the statement 408 indicates that the upper bound value UPPLIM1 of the loop range of the loop 305 is 128, so that a value indicated by reference numeral 2016 is 128.

The other cells of the loop execution range tables 2001, 2002, and 2003 are initialized to 0.

The following describes the processing to be performed by the computation partitioning optimizing section 106 with the data shown in FIGS. 16 through 20 entered, with reference to FIG. 1, FIGS. 9 through 15, and FIGS. 21 through 26. In the computation partitioning optimizing section 106, the processing by the non-intersecting interval sequence generating section 107, the loop duplicating section 108, and the code transforming section 109 is performed on all loops.

First, the non-intersecting interval sequence generating section 107 will be described. This section generates non-intersecting intervals for each processor by using a specified interval selecting method.

Figure 9:
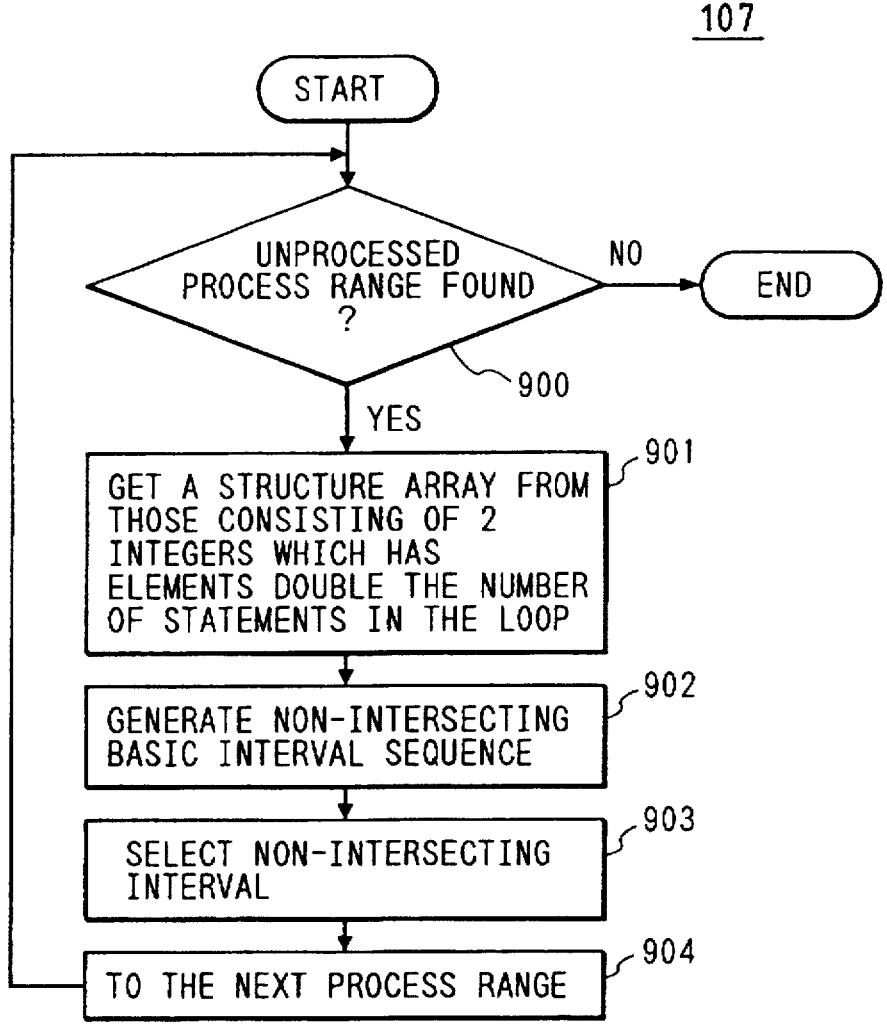
FIG. 9 is a flowchart describing the processing by a non-intersecting interval sequence generating section of FIG. 1.

FIG. 9 is a flowchart describing the processing by the non-intersecting interval sequence generating section 107. In step 900, it is determined whether there is any process range to be processed. The first preferred embodiment of the invention is designed so that the number of process ranges becomes equal to the number of loop execution range tables or statement execution range tables; therefore, as seen from the reference numerals 2005, 2006, 2009, 2010, 2013, and 2014 of FIG. 20, there are three process ranges 0, 1 to 2, and 3, the decision of step 900 being YES. In what follows, the process ranges are moved in the order of the process numbers 0, 1 to 2, and 3, the following processing being all performed within the specified process ranges.

Then, in step 901, a structure ARY is allocated which consists of two integers and has the number of elements double the number of statements in loop. In the first embodiment of the invention, the number of statements in loop is two as shown in FIG. 20 in which the value indicated by reference numeral 2004 (the number of execution statements in loop) is 2, so that the structure ARY having four elements (2×2) is allocated in step 901.

Figure 10:
FIG. 10 is a diagram illustrating a structure ARY.

FIG. 10 is a diagram illustrating the structure ARY. The structure ARY consists of two components, each being an integer. The first component LIM 1000 stores a number representative of the upper or lower bound value of an interval. The second component FLAG 1001 stores a number which indicates whether the number stored in the LIM 1000 is the upper bound value or the lower bound value.

Next, the processing of step 902, non-intersecting interval sequence generation, is performed. In step 902, a sequence of intervals not overlapping each other, namely, a non-intersecting interval sequence, is generated, for any one process, from the upper and lower bound values of the execution range of each statement in the loop.

Figure 11:
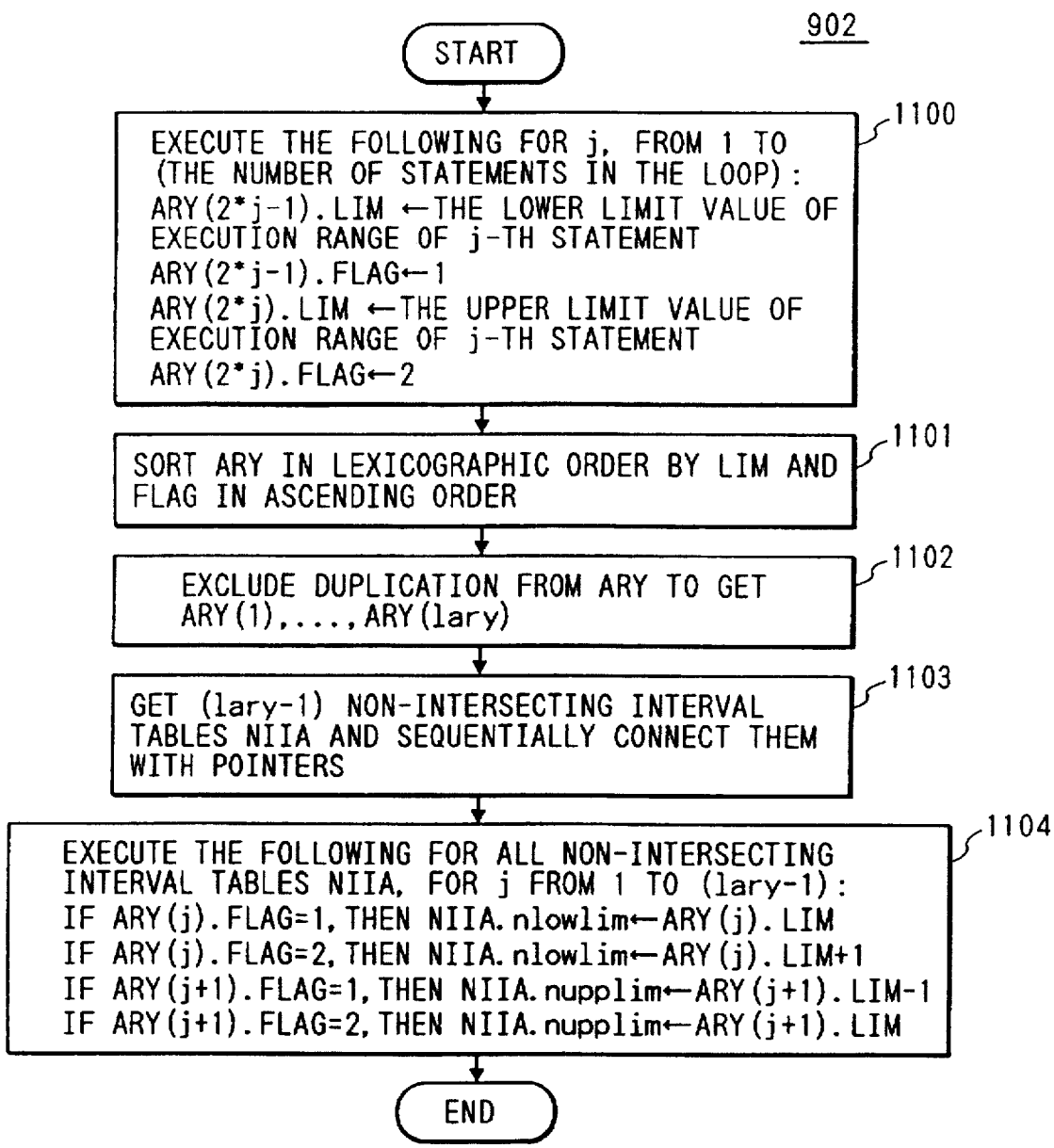
FIG. 11 is a flowchart describing the step of non-intersecting interval sequence generation.

FIG. 11 describes the details of the step 902. In the figure, in step 1100, the lower bound value of the execution range of a j-th statement is stored in ARY(2*j-1).LIM, 1 is stored in ARY(2*j-1).FLAG, the upper bound value of the execution range of the j-th statement is stored in ARY(2*j).LIM, and 2 is stored in ARY(2*j).FLAG, for j being from 1 to the number of statements in loop. Since the number of statements in loop is 2, assignment processing is performed in step 1100 is performed two times.

When j=1, then the lower bound value of the execution range of the first statement is 1 as seen from reference numeral 1805 because the case in which the process range in FIG. 18 is 0 may only be considered. When j=1, ARY(2*j-1)=ARY(1), so that 1 is stored in ARY(1).LIM. It should be noted that ARY(1).LIM indicates the first component LIM of the first array element ARY(1). Likewise, the upper bound value of the execution range of the first statement is 128 as seen from reference numeral 1806, so that 128 is stored in ARY(2).LIM.

When j=2, then the lower bound value of the execution range of the second statement is 1 as seen from reference numeral 1905 because the case in which the process range in FIG. 19 is 0 may only be considered. When j=2, ARY(2*j-1)=ARY(3), so that 1 is stored in ARY(3).LIM.

Likewise, the upper bound value of the execution range of the second statement is 127 from reference numeral 1906, so that 127 is stored in ARY(4).LIM.

Figure 21:
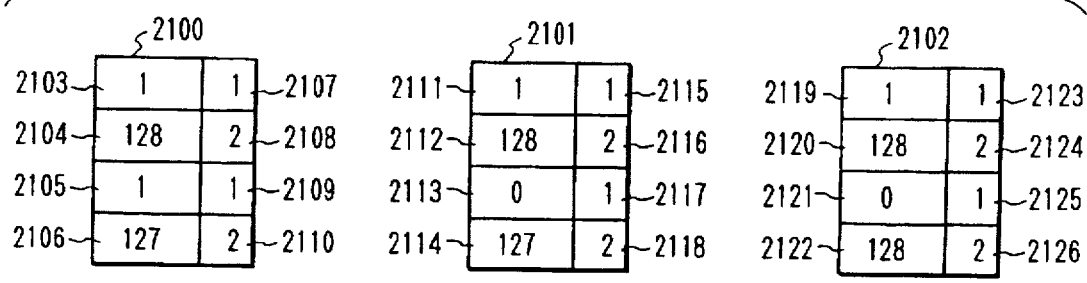
FIG. 21 is a diagram illustrating structures ARY with values stored as a result of executing source code generation.

FIG. 21 shows structure arrays storing values obtained by the processing of step 1100. The structure array 2100 is an array corresponding to the case in which the process range is 0. ARY(1).LIM, ARY(2).LIM, ARY(3).LIM, and ARY(4).LIM correspond to values indicated by reference numerals 2103, 2104, 2105, and 2106 respectively, storing the values described above. The processing results of "ARY(2*j-1).FLAG ← 1" and "ARY(2*j).FLAG ← 2" in step 1100 correspond to values indicated by reference numerals 2107, 2108, 2109, and 2110.

Next, in step 1101, the structure arrays are sorted in the ascending order by LIM and FLAG lexicographically. Namely, array elements having smaller LIM values are moved to the front. If the array elements have the same LIM value, then those having smaller FLAG values are moved to the front.

Then, in step 1102, multiplicity is removed from the sorted structure arrays to provide ARY(1), . . . , ARY(lary).

Figure 22:
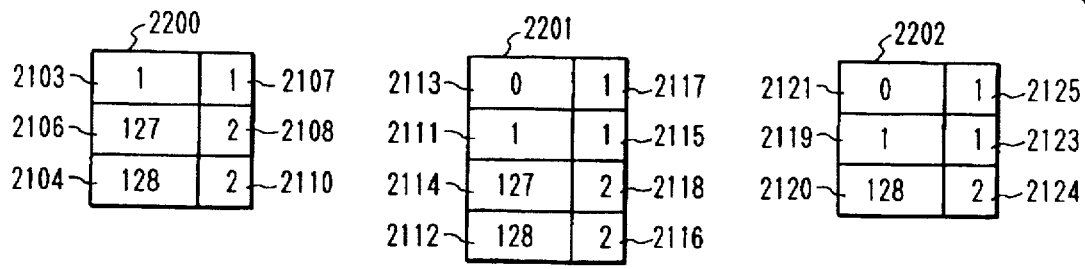
FIG. 22 is a diagram illustrating structures ARY with a processing result stored.

FIG. 22 shows structure arrays storing the above-mentioned processing results. For example, structure array 2200 is obtained by performing the processing of steps 1101 and 1102 on the structure array 2100 of FIG. 21. In the structure array 2100 of FIG. 21, 2105 and 2109 duplicate with 2103 and 2107, so that 2105 and 2109 are removed from the structure array 2200 of FIG. 22. At this moment, the number of array elements lary is 3.

The following describes the processing to be performed in steps 1103 and 1104 with reference to FIGS. 22 and 23.

Figure 23A:
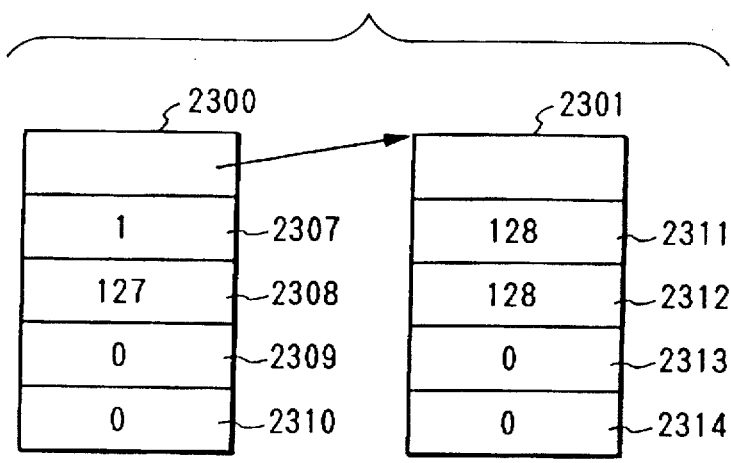
FIGS. 23A, 23B and 23C show non-intersecting interval tables NIIA resulted from execution of steps 1103 and 1104 of FIG. 11.

In step 1103, (lary−1) non-intersecting interval tables NIIA are allocated and they are connected to each other by pointers. In the case of the structure array 2200 of FIG. 22, lary is 3, so that two (=lary−1) non-intersecting interval tables NIIA are allocated to be connected with each other by a pointer. FIG. 23 shows the non-intersecting interval tables NIIA representative of the results of the processing of steps 1103 and 1104. The two non-intersecting interval tables NIIA allocated in step 1103 correspond to non-intersecting interval tables 2300 and 2301 of FIG. 23A. These tables are connected to each other by a pointer indicated by an arrow.

In step 1104, for all non-intersecting interval tables NIIA, from J=1 to (lary−1), ARY(j).LIM is stored in NIIA.nlowlim if ARY(j).FLAG=1, ARY(j).LIM+1 is stored in NIIA.nlowlim if ARY(j).FLAG=2, ARY(j+1).LIM−1 is stored in NIIA.nupplim if ARY(j+1).FLAG=1, and ARY(j+1).LIM is stored in NIIA.nupplim if ARY(j+1).FLAG=2.

The following describes the processing to be performed in step 1104 with reference to the structure array 2200 of FIG. 22 and the two non-intersecting interval tables 2300 and 2301 of FIG. 23A. In this case, lary is 3, so that j moves in a range from 1 to 2 (=j−1).

When j=1, the non-intersecting interval table 2300 is used to store results.

From reference numeral 2107 of the structure array 220 of FIG. 22, ARY(1).FLAG=1, so that ARY(1).LIM=1 corresponding to the value indicated by reference numeral 2103 is stored in NIIA.nlowlim 2307. From reference numeral 2110, ARY(2).FLAG=2, ARY(2).LIM =127 corresponding to the value indicated by reference numeral 2106 is stored in NIIA.nupplim 2308. It should be noted that values indicated by reference numerals 2309 and 2310 are initialized to 0.

When j=2, the non-intersecting interval table 2301 is used to store results.

From reference numeral 2110 of the structure array 2200 of FIG. 22, ARY(2).FLAG=2, so that 128 obtained by adding 1 to ARY(2).LIM=127 corresponding to the value indicated by reference numeral 2106 is stored in NIIA.nlowlim 2311. From reference numeral 2108, ARY(3).FLAG=2, ARY(3).LIM=128 corresponding to the value indicated by reference numeral 2104 is stored in NIIA.nupplim 2312. It should be noted that values indicated by reference numerals 2313 and 2314 are initialized to 0.

Figure 12:
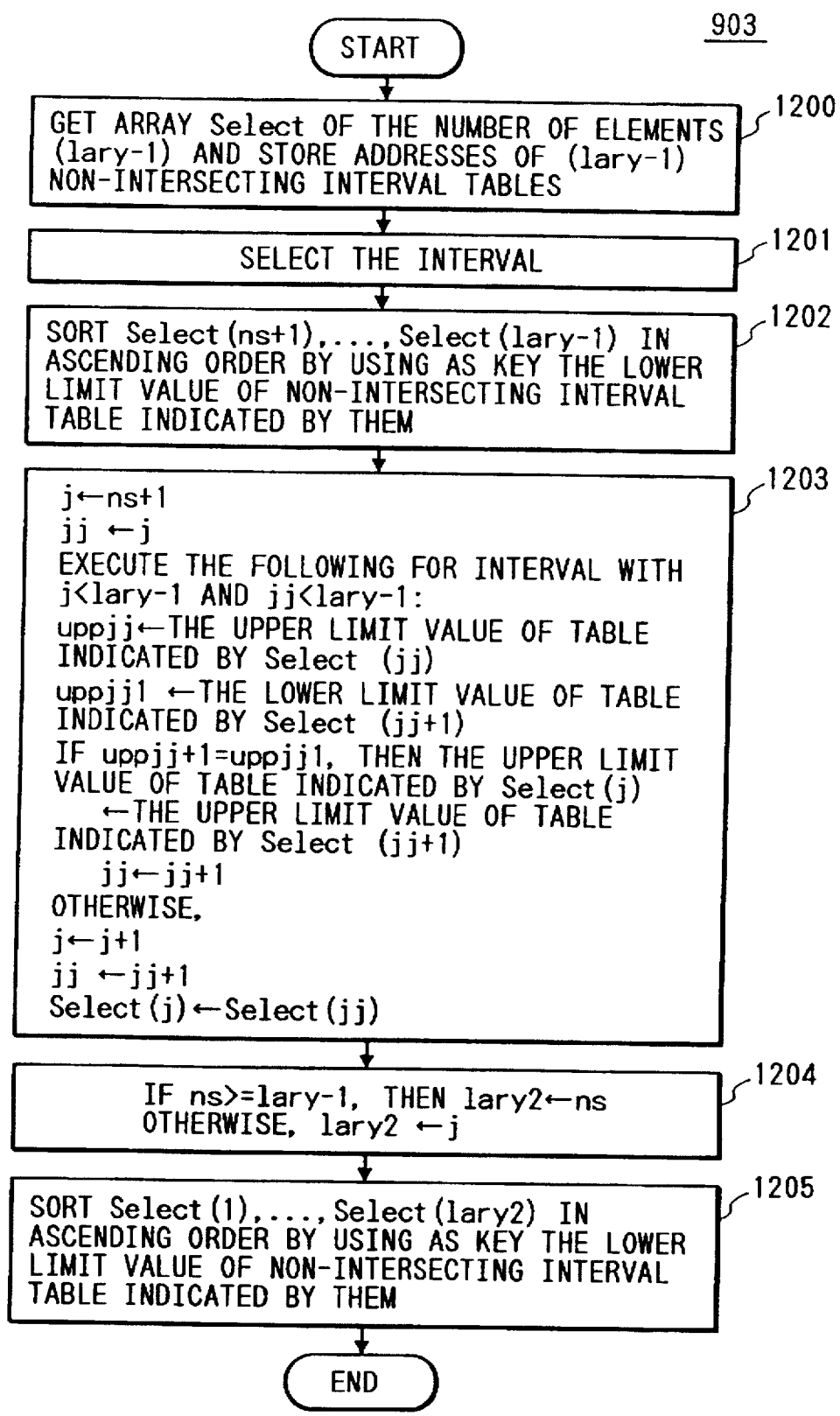
FIG. 12 is a flowchart describing the step of non-intersecting interval sequence selection.
Figure 13:
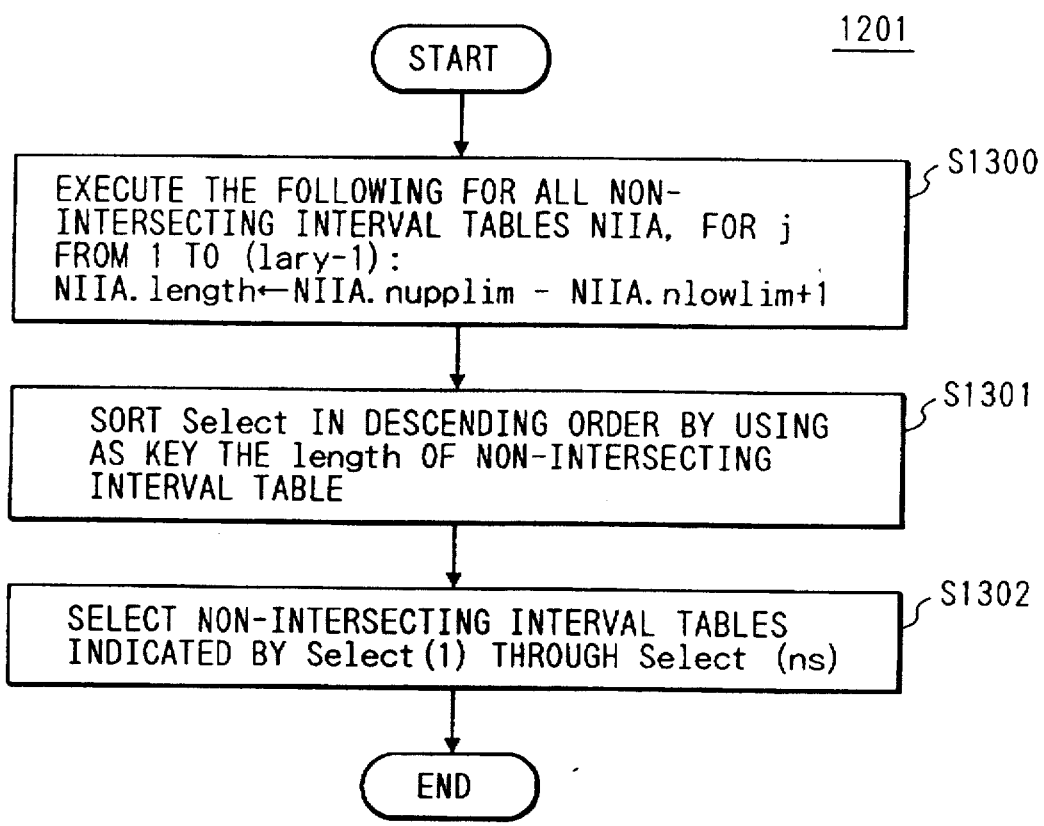
FIG. 13 is a flowchart describing the step of interval selection.

The following describes the processing to be performed in step 903 of FIG. 9, namely the selection of a nonintersecting interval, with reference to FIGS. 12, 13, 24A through 24C, and 25A through 25C. In step 903, of the non-intersecting basic intervals generated by the processing of FIG. 11, those intervals which are not selected by the interval selecting method to be described with reference to FIG. 13 are united if the intervals are adjacent to each other.

Figure 24A:
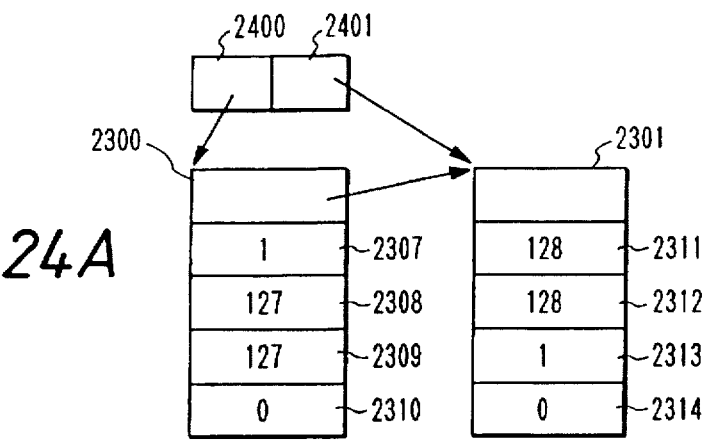
FIGS. 24A, 24B and 24C show arrays "Select" and non-intersecting interval tables obtained after the processing of interval selection of FIG. 12.

FIG. 12 shows the detailed description of the processing of step 903. In step 1200, an array Select of the number of elements (lary−1) is allocated to store the addresses of (lary−1) non-intersecting interval tables. In the present example, lary is 3, so that an array Select having two elements (=lary−1) is allocated to store the addresses of two non-intersecting interval tables. Reference numerals 2400 and 2401 of FIG. 24A represent the array Select having two elements. Arrows directing to the two non-intersecting interval tables represent pointers.

Then, the processing of step 1201, interval selection, is performed. In step 1201, of the non-intersecting basic intervals generated by the processing of FIG. 11, those intervals which are specified in a given manner are selected.

In the first embodiment of the invention, an interval selecting method will be described in which longer intervals are sequentially selected by the specified number. In another interval selecting method, longer intervals are selected until the sum of their lengths reaches a specified value. This latter method can be created by adding to the method of the first embodiment the processing for obtaining interval length and the processing for determining whether the sum of obtained lengths has reached a specified value or not.

FIG. 13 shows a detail flowchart describing the processing of step 1201, the interval selection. In step 1300, for all non-intersecting interval tables NIIA, from j=1 to (lary−1), the processing is performed for changing NIIA.length to NIIA.nupplim NIIA. nlowlim+1.

In the present example, since lary is 3, the processing is performed on two (=lary−1) non-intersecting interval tables 2300 and 2301, for j being from 1 to 2. NIIA.nupplim in the non-intersecting table 2300 is 127 as seen from reference numeral 2308 and NIIA.nlowlim is 1 as seen from reference numeral 2307. Therefore, 127 is stored in NIIA.length 2309.

Figure 24B:
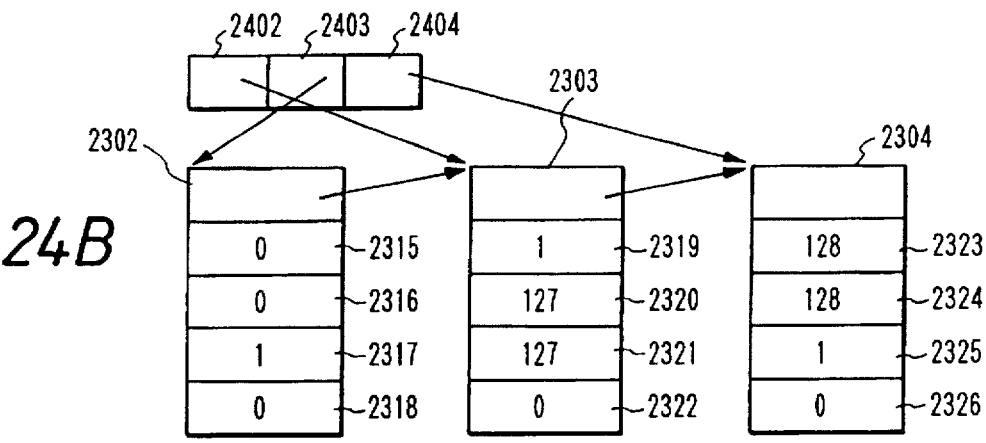
Figure 24C:
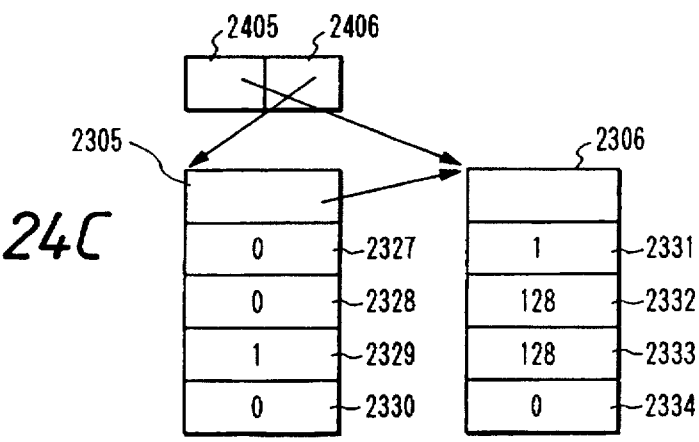

NIIA.nupplim in the non-intersecting interval table 2301 is 128 as seen from reference numeral 2312 and NIIA.nlowlim is 128 as seen from reference numeral 2311. Therefore, 1 is stored in NIIA.length 2313. These results are shown in FIG. 24A. FIGS. 24A through 24C show the array Select and non-intersecting interval tables obtained after the processing shown in step 1201.

In step 1301 of FIG. 13, arrays Select are sorted in the descending order by using the length obtained in step 1300 as key. The length in table 2300, namely NIIA.length, is 127 and the length in table 2301, namely NIIA.length, is 1, so that the sort results of the arrays Select 2400 and 2401 remain unchanged.

In step 1302, non-intersecting interval tables pointed by Select(1) through Select(ns) are selected. In the present example, only non-intersecting interval tables pointed by Select(1) is selected with ns=1. Here, ns denotes the number of selected non-intersecting intervals, hereinafter being ns=1. Thus, the processing of step 1201 has come to an end. In the subsequent processing, no marking for the selection is needed and a value may only be stored in ns.

In step 1202, Select(ns+1), . . . , Select(lary−1) are sorted in the ascending order by using as key the lower bound value of the non-intersecting interval table pointed by these arrays. In the present example, ns is 1 and lary is 3, so that (ns+1)=(lary−1)=2. Therefore, non-intersecting interval tables pointed by one array element Select(2) 2401 are sorted in the ascending order by using the lower bound value as key. Since the number of array elements is only one, the sort results remain unchanged.

In step 1203, ns+1 is entered in j, j is entered in jj; the upper bound value of the table pointed by Select(jj) is stored in uppjj while j<(lary−1) and jj<(lary−1); the lower bound value of the table pointed by Select(jj+1) is stored in uppjjl; if uppJJ+1=uppjjl, the upper bound value of the table pointed by Select(j) is stored in the upper bound value of the table pointed by Select(jj+1); and jj+1 is entered in jj. Otherwise, j+1 is entered in j, jj+1 is entered in jj, and Select(jj) is entered in Select(j).

In the present example, since ns is 1 and lary is 3, the initial value of j is 2 and the loop processing of step 1203 is performed when j is below 2. Therefore, in the present example, j is not below 2, so that no loop processing is performed in step 1203.

In step 1204, if ns≧lary−1, ns is entered in lary2; otherwise, j is entered in lary2. In the present example, since ns is 1 and lary is 3, ns>lary −1 is not established. Therefore, j, namely the initial value 2 in step 1203, is substituted into lary2.

Figure 25A:
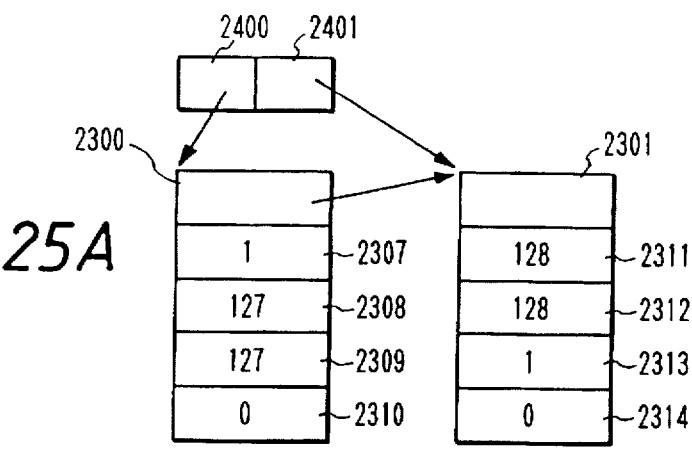
FIGS. 25A, 25B and 25C show non-intersecting interval tables obtained after the processing of non-intersecting interval sequence generation of FIG. 1.
Figure 25B:
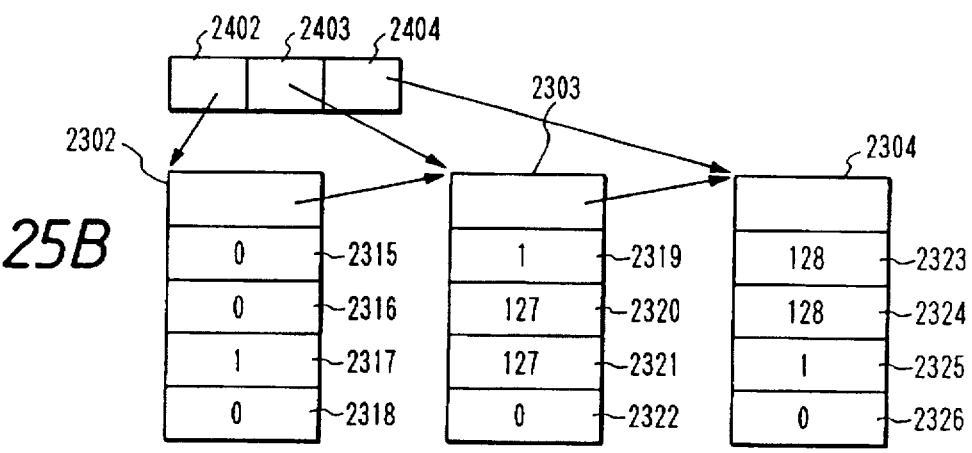
Figure 25C:
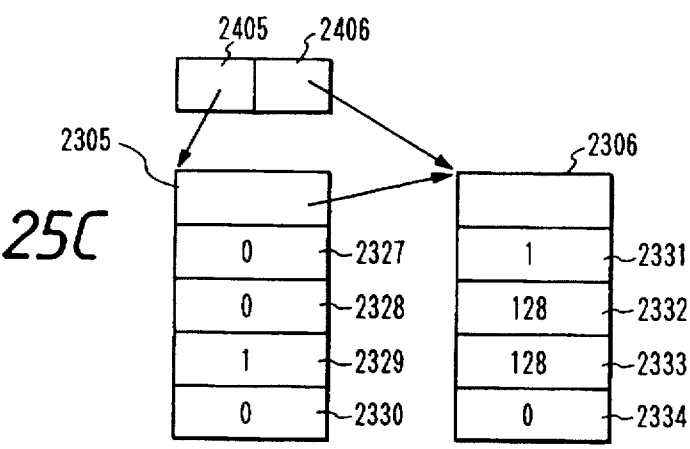

In step 1205, Select(1), . . . , Select(lary2) are sorted in the ascending order by using as key the lower bound value of the non-intersecting interval table pointed by these arrays. In the present example, lary2 is 2, so that Select(1) 2400 and Select(2) 2401 are sorted in the ascending order by using as key the lower bound value of the non-intersecting interval table pointed by these arrays. The lower bound value 2307 of the non-intersecting interval table 2300 pointed by the Select(1) 2400 is 1 and the lower bound value 2307 of the non-intersecting interval table 2301 pointed by the Select(2) 2401 is 128, so that the sort results remain unchanged. FIGS. 25A through 25C show non-intersecting interval tables obtained after the processing by the non-intersecting interval sequence generating section 107.

Thus, as shown in the flowchart of FIG. 9, the processing with the process range being 0 by the non-intersecting interval sequence generating section 107 has come to an end. Therefore, FIG. 25A shows the state of the non-intersecting interval table obtained after the processing by the nonintersecting interval sequence generating section 107 with the process range being 0.

As seen from the description up to step 1205, the values indicated by reference numerals 2400, 2401, 2300, and 2301 in FIG. 25A remain unchanged. Thus, the processing by the non-intersecting interval sequence generating section 107 with the process range being 0 has been completed.

Next, the processing is performed on the next process range in step 904. In the present example, the process range 1 to 2 still exists, so that the decision in step 900 is YES. In what follows, the processing which is generally the same as that for the processing range 0 will be described briefly.

The number of statements in loop is 2 as seen from the reference numeral 2004 that indicates the number of execution statements as shown in FIG. 20, so that a structure ARY having four array elements is allocated in step 901.

Then, the processing shown in step 902, generation of a non-intersecting interval sequence, is performed. In step 902, the number of statements in loop in step 1100 of FIG. 11 is 2, so that the substitution processing of step 1100 is performed twice.

When j=1, the lower bound value of the execution range of the first statement is 1 as seen from reference numeral 1809 because the case in which the process range is 1 to 2 in FIG. 18, namely the table 1802, may only be taken into consideration. Likewise, the upper bound value of the execution range of the first statement is 128 as seen from the reference numeral 1810.

When j=2, the lower bound value of the execution range of the second statement is 0 as seen from reference numeral 1909 because the case in which the process range is 0 in FIG. 19, namely the table 1901, may only be taken into consideration. Likewise, the upper bound value of the execution range of the second statement is 127 as seen from the reference numeral 1910.

Thus, values indicated by reference numerals 2111, 2112, 2113, and 2114 in the structure array 2101 of FIG. 21 are 1, 128, 0, and 127 respectively. From the result of processing the assignment statement into FLAG in step 1100, values indicated by reference numerals 2115, 2116, 2117, and 2118 become 1, 2, 1, and 2 respectively.

Then, in step 1101, the structure array ARY is sorted in the ascending order in the lexicographical order by LIM and FLAG. The sorting results in the structure array 2201 of FIG. 22. Because the result of the sorting in step 1101 has no multiplicity, the results of the processing in steps 1101 and 1102 are as shown in the structure array 2201 of FIG. 22. At this moment, the number of array elements lary is 4.

In step 1103, three (=lary−1) non-intersecting interval tables NIIA are allocated because lary is 4. The allocated tables are connected to each other by pointers. The three allocated tables NIIA correspond to the tables 2302, 2303, and 2304 of FIG. 23B.

Then, in step 1104, j moves in the range from 1 to 3(lary−1) because lary is 4. This will be described below with reference to the structure array 2201 of FIG. 22 and the non-intersecting interval tables NIIA 2302, 2303, and 2304 of FIG. 23B.

When j=1, ARY(1).FLAG=1 as seen from reference numeral 2117, so that ARY(1).LIM=0 corresponding to the value indicated by reference numeral 2113 is entered in NIIA.nlowlim 2315. ARY(2).FLAG=1 as seen from reference numeral 2115, so that 0 obtained by subtracting 1 from ARY(2).LIM=1 corresponding to the value indicated by reference numeral 2111 is entered in NIIA.nupplim 2316.

When j=2, ARY(2).FLAG=1 as seen from reference numeral 2115, so that ARY(2).LIM=1 corresponding to the value indicated by reference numeral 2111 is entered in NIIA.nlowlim 2319. ARY(3).FLAG=2 as seen from reference numeral 2118, so that ARY(3).LIM=127 corresponding to the value indicated by reference numeral 2114 is entered in NIIA.nupplim 2320.

When j=3, ARY(2).FLAG=2 as seen from reference numeral 2118, so that 128 obtained by adding 1 to ARY(2).LIM=127 corresponding to the value indicated by reference numeral 2114 is entered in NIIA.nlowlim 2323. ARY(3).FLAG=2 as seen from reference numeral 2116, so that ARY(3).LIM=128 corresponding to the value indicated by reference numeral 2112 is entered in NIIA.nupplim 2324.

Figure 23B:
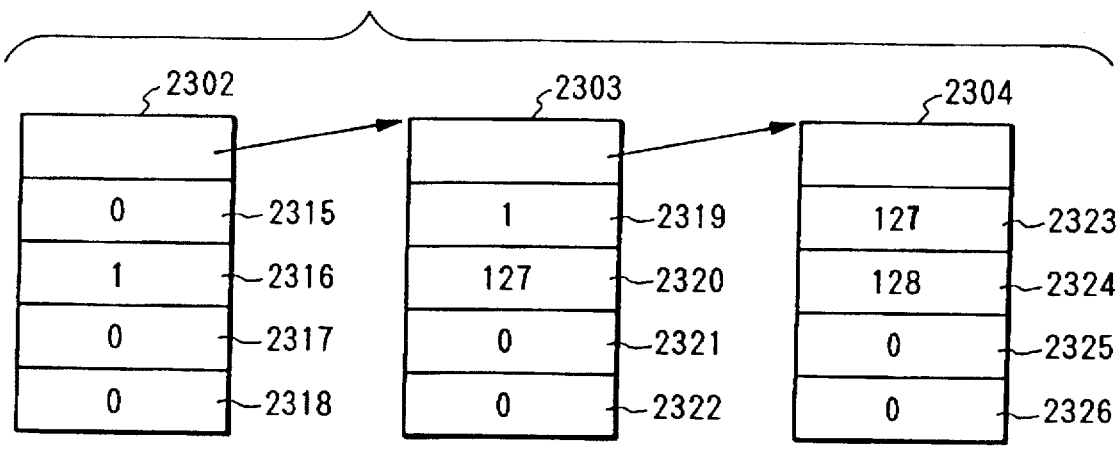
Figure 23C:
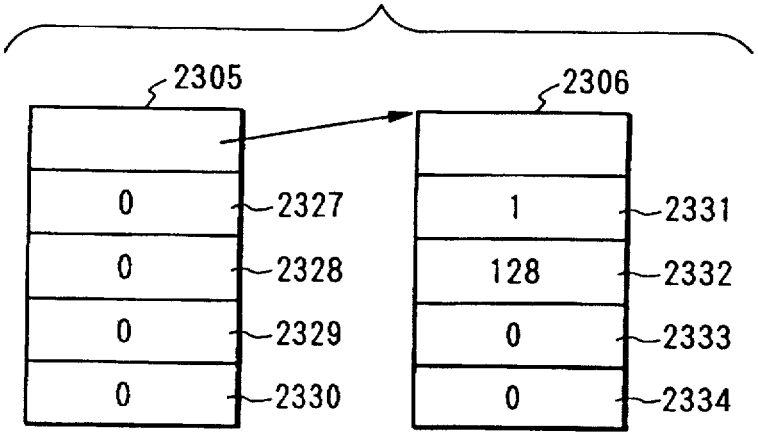

Thus, the processing shown in step 902 for the process 1 to 2 comes to an end. The result of this processing is shown in FIG. 23B.

Next, in step 1200 of FIG. 12 which shows details of the processing shown in step 903, lary is 4, so that arrays Select 2402, 2403, and 2404 having three elements (=lary−1) are allocated in which the addresses of the above-mentioned three non-intersecting interval tables are stored sequentially.

Then, the interval selecting step 1201 is performed. In step 1300 of FIG. 13 which shows details of the processing shown in step 1201, lary is 4, so that the processing is performed on three (=lary−1) non-intersecting interval tables 2302, 2303, and 2304 for j being from 1 to 3. As a result, a value indicated by reference numeral 2317 becomes 1, a value indicated by reference numeral 2321 becomes 127, and a value indicated by reference numeral 2325 becomes 1 as shown in FIG. 24B.

In step 1301, arrays Select are sorted in the descending order by using as key the length obtained in step 1300, resulting in the tables 2303, 2302, and 2304 in this order, values indicated by reference numerals 2402, 2403, and 2404 pointing the tables 2303, 2302, and 2304 respectively as shown in FIG. 24.

In step 1302, only the non-intersecting interval table 2303 pointed by Select(1) is selected with ns=1.

In the next step 1202, ns is 1 and lary is 4, so that the arrays are sorted in the ascending order by using as key the lower bound value of the non-intersecting interval table pointed by the Select(2) 2402 and the Select(3) 2404. The sort result remains unchanged.

In step 1203, ns is 1 and lary 4, so that the initial values of j and jj are 2 and, when j and jj are below 3 in the loop in step 1203, the processing is performed.

First, values of uppjj and uppjjl are the upper bound value 0 of the table 2302 pointed by Select(2) and the lower bound value 128 of the table 2304 pointed by Select(3) respectively, so that uppjj+uppjjl is not established. Therefore, j and jj are both 3 and assignment is made from the Select(3) to the Select(3), which means that nothing has been done as a result. At this moment, the values of j and jj do not satisfy the loop decision condition, so that the loop processing comes to an end.

In step 2404, ns is 1 and lary is 4, so that ns ≧lary−1 is not established and j, namely 3 obtained in step 1203, is substituted into lary2.

In step 1205, lary2 is 3, so that Select(1) 2403, Select(2) 2402, and Select(3) 2404 are sorted in the ascending order by using as key the lower bound values of the non-intersecting interval tables pointed by these arrays. Since these lower bound values are always 1, 0, and 128, the sort results are the values indicated by reference numerals 2402, 2403, and 2404 of FIG. 25B. Thus, the processing on the process range 1 to 2 comes to an end.

Next, in step 904, the processing is performed on a next process range. Since the process range 3 still remains, the decision in step 900 is YES. Since the number of statements in the loop is 2 as seen from the reference numeral 2004 of FIG. 20, a structure ARY having four (2×2) array elements is allocated in step 901.

Then, the processing of step 902, namely the generation of a non-intersecting interval sequence, is performed. Since the number of statements in the loop in step 1100 is 2, the assignment processing written in step 1100 is performed twice.

When j=1, the lower bound value of the execution range of the first statement is 1 as seen from reference numeral 1813 because the case in which the process range is 3 in FIG. 18, namely the table 1802, may only be taken into consideration. Likewise, the upper bound value of the execution range of the first statement is 128 as seen from the reference numeral 1814.

When j=2, the lower bound value of the execution range of the second statement is 0 as seen from reference numeral 1913 because the case in which the process range is 3 in FIG. 19, namely the table 1902, may only be taken into consideration. Likewise, the upper bound value of the execution range of the second statement is 128 from the reference numeral 1914. Thus, the values indicated by reference numerals 2119, 2120, 2121, and 2122 in the table 2102 become 1, 128, 0, and 128 respectively. As a result of the statement substitution into FLAG in step 1100, the values indicated by reference numerals 2123, 2124, 2125, and 2126 become 1, 2, 1 and 2 respectively. Because the sorted result in step 1101 has multiplicity, the processing in steps 1101 and 1102 results in the table 2202. At this moment, the number of array elements lary is 3.

In step 1103, lary is 3, so that two (=lary−1) non-intersecting interval tables NIIA are allocated, which are connected to each other by pointer. The two non-intersecting interval tables NIIA thus allocated correspond to tables 2305 and 2306 of FIG. 23C.

In step 1104, lary is 3, so that j moves in the range from 1 to 2. This will be described below with reference to the table 2202 of FIG. 22 and the tables 2305 and 2306 of FIG. 23.

When j=1, ARY(1).FLAG=1 as seen from reference numeral 2125, so that ARY(1).LIM=0 corresponding to the value indicated by reference numeral 2121 is entered in NIIA.nlowlim 2327. ARY(2).FLAG=1 as seen from reference numeral 2123, so that 0 obtained by subtracting 1 from ARY(2).LIM=1 corresponding to the value indicated by reference numeral 2119 is entered in NIIA.nupplim 2328.

When j=2, ARY(2).FLAG=1 as seen from reference numeral 2123, so that ARY(2).LIM=1 corresponding to the value indicated by reference numeral 2119 is entered in NIIA.nlowlim 2331. ARY(3).FLAG=2 as seen from reference numeral 2124, so that ARY(3).LIM=128 corresponding to the value indicated by reference numeral 2120 is entered in NIIA.nupplim 2332.

In step 1200, lary is 3, so that arrays Select 2405 and 2406 having two (=lary−1) array elements are allocated to store the addresses of the two nonintersecting interval tables sequentially.

Then, the processing of step 1201, namely the selection of an interval, is performed.

In step 1300 showing the details of the processing of step 1201, lary is 3, so that the processing is performed on two (=lary−1) non-intersecting interval tables 2305 and 2306 with j being from 1 to 2. As a result, a value indicated by reference numeral 2329 becomes 1 and a value indicated by reference numeral 2333 becomes 128 as shown in FIG. 24C.

In step 1301, arrays Select are sorted in the descending order by using as key the length obtained in step 1300, resulting in the tables 2306 and 2305 in this order and values indicated by reference numerals 2405 and 2406 pointing the tables 2306 and 2305 respectively as shown in FIG. 24 by arrows.

In step 1302, only the non-intersecting interval table 2306 pointed by the Select(1) is selected with ns=1.

In the next step 1202, ns is 1 and lary is 3, so that the arrays are sorted in the ascending order by using as key the lower bound value of the non-intersecting interval table pointed by the Select(2) 2406 having one array element. Because there is only one array element, the sort results remains unchanged.

In step 1203, ns is 1 and lary is 3, so that the initial value of j is 2 (=ns+1) and, when j in the loop of step 1203 is below 2, the loop processing is performed. Therefore, since j is not below 2 in the present example, no loop processing is performed in the step 1203.

In step 1204, ns is 1 and lary is 3, so that ns ≧ lary−1 is not established and therefore j, namely the initial value 2 in step 1203, is substituted into lary2.

In step 1205, lary is 2, so that the Select(1) 2405 and the Select(2) 2406 are sorted in the ascending order by using as key the lower bound values of the non-intersecting interval tables pointed by these arrays. These lower bound values are 1 and 0 in this order, resulting in the values indicated by reference numerals 2405 and 2406 of FIG. 25C.

Thus the processing on the process range 3 has come to an end.

Then, in step 904, the next process range is processed; but there is no more process range, the decision in step 900 is NO, upon which the processing by the non-intersecting interval sequence generating section all comes to an end.

In what follows, the processing by the loop duplicating section 108 will be described with reference to FIGS. 14, 25A through 25C, and FIG. 26. The loop duplicating section 108 generates a guard for determining the numbers of the processes that execute a program and generates, by duplicating the original loop, the same number of loops as that of intervals having the upper and lower bound values which are the upper and lower bound values of each interval of the non-intersecting interval sequence for each process.

Figure 14:
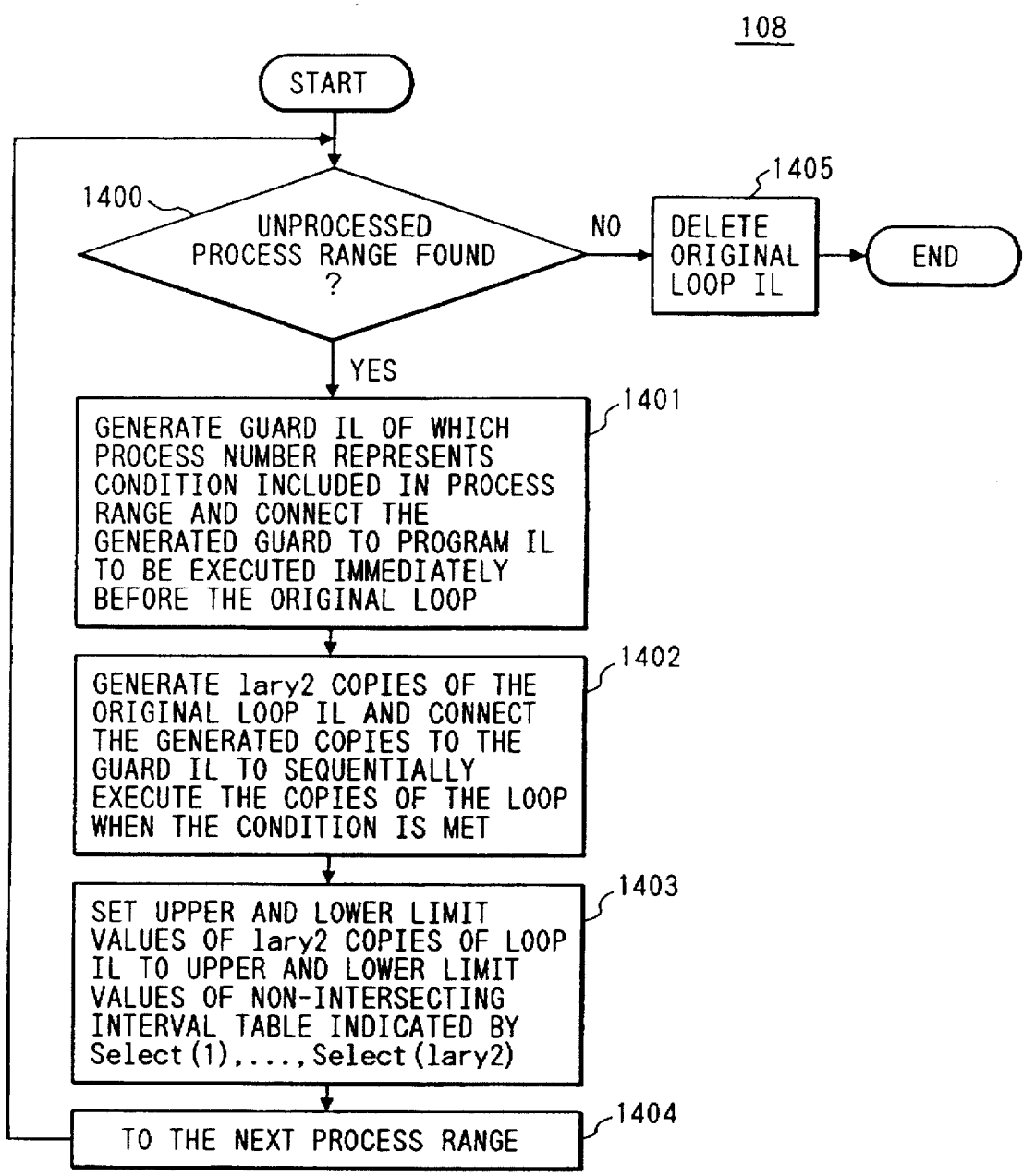
FIG. 14 is a flowchart describing the processing by a loop duplicating section.

FIG. 14 shows a flowchart describing the processing of the loop duplicating section 108. FIG. 26 shows the results of the processing by the loop duplicating section 108 and the code transforming section 109 in the form of a source program rather than an intermediate language.

First, in step 1400 of FIG. 14, it is determined whether there is a process range to be processed. In the present example, the loop execution range table of FIG. 20 has three process numbers 0, 1 to 2, and 3, the decision is YES. Subsequently, the processing is performed on the processes ranges 0, 1 to 2, and 3 in this order.

In step 1401, a guard IL (Intermediate Language) representative of a condition in which the process numbers are included in the process ranges is generated to be connected to a program IL such that the guard is executed immediately before the original loop. It should be noted that a variable representative of a process number is created appropriately. In this example, MP is used for the variable. The generation program calls a system inquiry subroutine at run time to store the actual process number in the MP. This is specified by WHOAMI in a statement 2600 of FIG. 26.

Because the case in which the process range is 0 for example is under consideration at this point of time, the condition in which the process number is included in the process range in step 1401 is "IF(MP.EQ.0". An IF statement of FIG. 26 indicates this guard in the form of a source program, the guard being connected to the program IL such that the guard is executed immediately before the original loop. It should be noted that the block of the IF statement 2601 should be immediately followed by the original loop; but the original loop is not written in FIG. 26 because it will be deleted by in step 1405.

In step 1402, lary2 copies of the original loop IL are created to be connected to the above-mentioned guard IL such that the loops are executed sequentially when the above-mentioned condition is satisfied. The lary2 when the process range is process number 0 is equal to the number of array elements of the arrays Select 2400 and 2401 of FIG. 25, so that the lary2 is 2. Therefore, in step 1402, two copies are made of the original loop IL to be connected to the guard IL such that they are executed at the establishment of the guard 2601.

In step 1403, the upper and lower values of the above-mentioned lary2 loops IL are set to the upper and lower bound values of non-intersecting interval tables pointed by Select(1), . . . , Select(lary2).

In the present example, the upper and lower bound values of the non-intersecting interval table pointed by the Select(1) 2400 of FIG. 25A are 1 and 127 respectively as seen from reference numerals 2307 and 2308, so that the upper and lower bound values of the first DO loop are 1 and 127 respectively. This is expressed in a statement 2602 of FIG. 26. This DO loop is executed only when the guard 2601 is established.

In the present example, the upper and lower bound values of the non-intersecting interval table pointed by the Select(1) 2401 of FIG. 25A are 128 and 128 respectively as seen from reference numerals 2311 and 2312, so that the upper and lower bound values of the second DO loop are 128 and 128 respectively. This is expressed in a statement 2605 of FIG. 26. This DO loop is executed only when the guard 2601 is established. Thus, the processing on the case in which the process range is program number 0 comes to an end.

In the next step 1404, the processing is performed on the next process range.

Because the current process range is process number 1 to 2, the decision in step 1400 is YES. Since the process range is process number 1 to 2 this time, the condition in step 1401 in which the process number is included in the process range is "IF(MP.GE.1.AND.MP.LE.2)". A statement 2607 of FIG. 26 indicates this guard in the form of a source program, the guard being connected to the program IL such that the guard is executed immediately before the original loop.

The lary2 in the case in which the process range is the process number 1 to 2 is equal to the number of array elements of arrays Select 2402, 2403, and 2404 of FIG. 25B. Therefore, in step 1402, three copies of the original loop IL are made to be connected to the program IL such that they are executed when the guard 2607 is established.

Then, in step 1403, the upper and lower bound values of the non-intersecting interval pointed by the Select(1) 2402 of FIG. 25B are 0 and 0 respectively as seen from reference numerals 2315 and 2316, so that the upper and lower bound values of the first DO loop are 0 and 0. This is indicated by a statement 2608. This DO loop is executed only when the guard 2607 is established.

The upper and lower bound values of the non-intersecting interval pointed by the Select(2) 2403 of FIG. 25B are 1 and 127 respectively as seen from reference numerals 2319 and 2320, so that the upper and lower bound values of the second DO loop are 1 and 127 respectively. This is indicated by a statement 2610. This DO loop is executed only when the guard 2607 is established.

The upper and lower bound values of the non-intersecting interval table pointed by the Select(3) 2404 of FIG. 25B are 128 and 128 as seen from reference numerals 2323 and 2324, so that the upper and lower bound values of the third DO loop are 128 and 128. This is indicated by a statement 2613. This DO loop is executed only when the guard 2607 is established. Thus the processing on the process range 1 to 2 comes to an end.

Then, in step 1404, the processing on the next process range is performed.

First, since the current process range is 3, the decision in step 1400 is YES.

Since the process range is process number 3 this time, the condition in step 1401 in which the process number is included in the process range is "IF(MP.EQ.3)". A guard 2615 of FIG. 26 indicates this guard in the form of a source program, the guard being connected to the program IL such that the guard is executed immediately before the original loop.

The lary2 in the case in which the process range is the process number 3 is equal to the number of array elements of arrays Select 2405 and 2406 of FIG. 25C. Therefore, in step 1402, two copies of the original loop IL are made to be connected to the program IL such that they are executed when the guard 2615 is established.

Then, in step 1403, the upper and lower bound values of the non-intersecting interval pointed by the Select(1) 2405 of FIG. 25C are 0 and 0 respectively as seen from reference numerals 2327 and 2328, so that the upper and lower bound values of the first DO loop are 0 and 0. This is indicated by a DO loop 2616. This DO loop is executed only when the guard 2615 is established.

The upper and lower bound values of the non-intersecting interval pointed by the Select(2) 2406 of FIG. 25C are 1 and 128 respectively as seen from reference numerals 2331 and 2332. Therefore the upper and lower bound values of the second DO loop are 1 and 128 respectively. This is indicated by a DO loop 2618. This DO loop is executed only when the guard 2615 is established. Thus the processing on the process range 1 to 2 comes to an end.

Then, in step 1404, the processing is performed on the next process range. In step 1400, there is no more process range to be processed, so that the decision is NO and the processing goes to step 1405. In step 1405, the original loop IL is deleted. Thus, the processing by the loop duplicating section 108 has all been completed.

In what follows, the processing by the code transforming section 109 will be described with reference to FIGS. 15 and 26. The code transforming section 109 leaves unchanged or deletes each of the statements in each loop generated as shown in FIG. 14, adds a guard to the statement, or deletes the loop itself.

Figure 15:
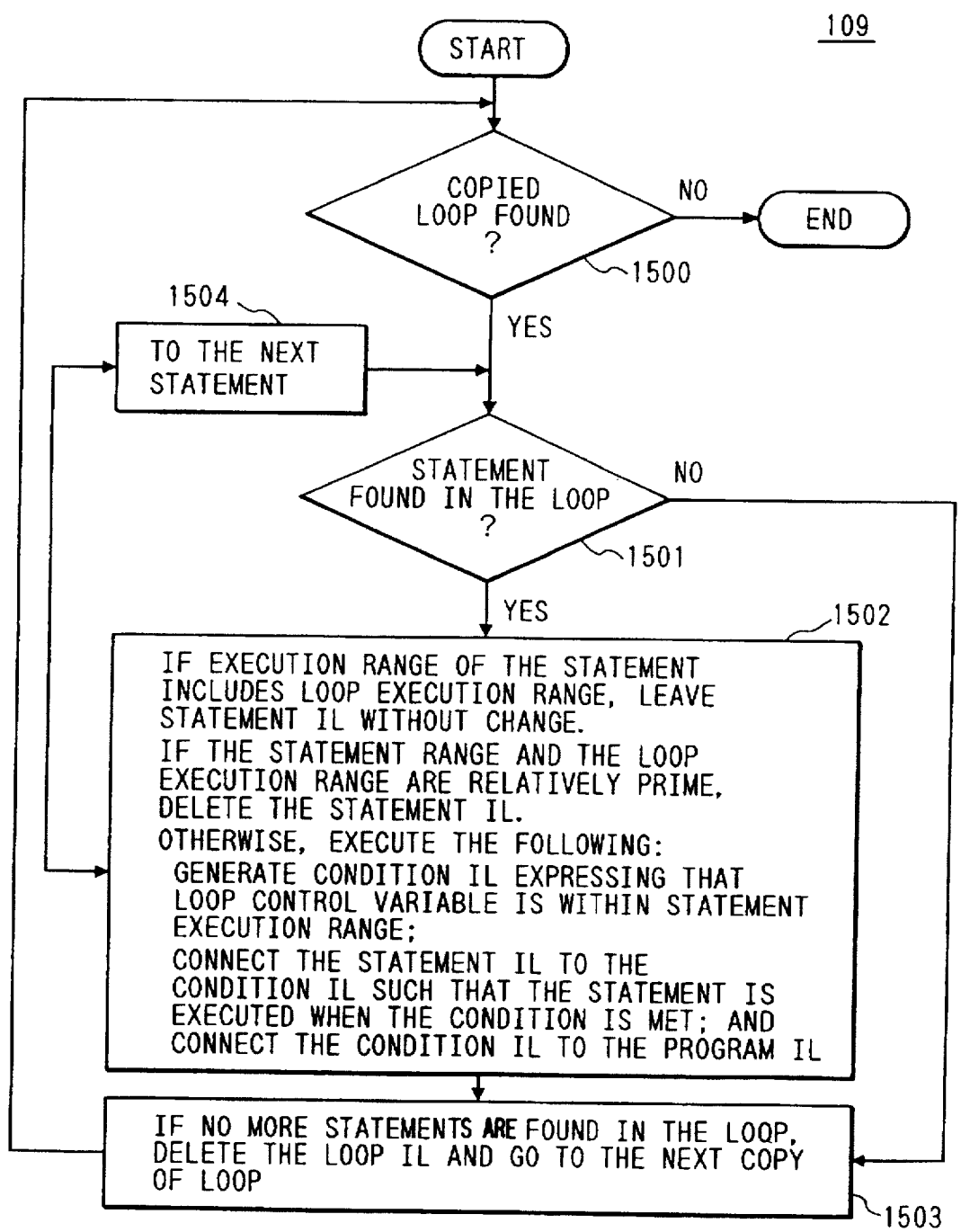
FIG. 15 is a flowchart describing the processing by a code transforming section.

FIG. 15 shows a flowchart describing the processing to be performed by the code transforming section 109. In step 1500, it is determined whether or not there is a duplicate loop. In the present example, there are loops duplicated by the loop duplicating section 108 for the statements 1602, 2605, 2608, 2610, 2613, 2616, and 2618, so that the decision is YES. Subsequently, the processing is performed on the above-mentioned loops in this order.

In step 1501, it is determined whether the loops have a statement or not. In this example, each of the loops has a statement starting with ASGN 1609 and a statement starting with ASGN 1615, so that the decision is YES. Subsequently, the processing is performed on these statements in this order. Further, the processing on the first statement is performed by referring to a statement execution range table pointed by the ASGN 1609 and an immediately preceding SINFO 1608. Likewise, the processing on the second statement is performed by referring to a statement execution range table pointed by the ASGN 1615 and the immediately preceding SINFO 1614.

It should be noted that the loop 2602 is a loop when the process range is process number 0, so that the statement execution range table is referenced for the case in which the process range is process number 0.

In step 1502, if the statement execution range includes the loop execution range, then the statement IL is left unchanged; if the statement execution range and the loop execution range are mutually disjointed, is they do not overlap each other, the statement IL is deleted. Otherwise, a condition IL is generated to indicate the loop induction variable is within the statement execution range. The statement IL is connected to the condition IL such that the statement is executed upon establishment of the above-mentioned condition. The condition IL is then connected to the program IL.

In the present example, the loop execution range of the DO loop 2602 is 1 to 127 as indicated by the statement 2602 and the execution range of the first statement is 1 to 128 as shown in the values indicated by reference numerals 1805 and 1806 of the statement execution range table of FIG. 18, so that the statement execution ranges include the loop execution range. Therefore, in step 1502, nothing is performed on the statement IL. This is indicated by the statement 2603 of FIG. 26.

In step 1504, the processing on a next statement starts. In step 1501, the decision is YES because there is a second statement. The execution range of the second statement is 1 to 127 as shown in the values indicated by reference numerals 1905 and 1906 in the statement execution range table of FIG. 19, so that the statement execution range and the loop execution range are equal. In other words, the statement execution range includes the loop execution range. Therefore, in step 1502, nothing is performed on the statement IL. This is indicated by the statement 2604 of FIG. 26.

In step 1504 again, the processing on another statement starts. In step 1501, no more statements exist because the two statements have been processed for the loop 2602. Therefore, the decision in step 1501 is NO this time and the processing goes to step 1503. In step 1503, there are two statements without change in the loop, so that nothing is performed and the processing goes to the next duplicating loop.

The decision in step 1500 is YES because there is the duplicate loop 2605. In step 1501, the loop contains two statements indicated by ASGN 1609 and ASGN 1615, so that the decision is also YES. Subsequently, these statements are processed in the above-mentioned order. Because the loop 2605 is a loop in the case in which the process range is process number 0, the statement execution range table is referenced for the case in which the process range is process number 0.

The loop execution range of the loop 2605 is 128 to 128 as indicated by the statement 2605 and the execution range of the first statement is 1 to 128 as shown by reference numerals 1805 and 1806 of the statement execution table of FIG. 18, so that the statement execution range includes the loop execution range. Therefore, in step 1502, nothing is performed on the statement IL. This is indicated by the statement 1606 of FIG. 26.

In step 1504, the processing on a still another statement starts. The decision in step 1501 is YES because there is a second statement. The execution range of the second statement is 1 to 127 as shown in the values indicated by reference numerals 1905 and 1906 in the statement execution range table of FIG. 19, so that the statement execution range and the loop execution range are mutually disjointed, that is they do not overlap each other. Therefore, the second statement is deleted in step 1502. Thus, the second statement does not appear in the loop of the statement 2605.

In step 1504, the processing on yet another statement starts. In step 1501, there are no more statements because the two statements have been processed for the loop 2605. Consequently, the decision is NO and the processing goes to step 1503. In step 1503, the loop contains one statement, so that nothing is performed and the processing goes to the next duplicating loop.

The decision in step 1500 is YES because there is the duplicate loop 2608. The decision in step 1501 YES because the loop contains two statements pointed by ASGN 1609 and ASGN 1615. Subsequently, these statements are processed in the above-mentioned order. The loop 2608 is a loop in the case in which the process range is process number 1 to 2, the statement range table is referenced for the case in which the process range is process number 1 to 2.

The loop execution range of the loop 2608 is 0 to 0 as shown in the statement 2608 and the execution range of the first statement is 1 to 128 as shown in the values indicated by reference numerals 1809 and 1810 of the statement execution range table of FIG. 18, so that the statement execution range and the loop execution range are mutually disjointed, that is they do not overlap each other. Therefore, the first statement is deleted in step 1502. Thus, the first statement does not appear in loop of the statement 2608.

In step 1504, the processing on another statement starts. The decision in step 1501 is YES because there is a second statement. The execution range of the second statement is 0 to 127 as shown in the values indicated by reference numerals 1909 and 1910 of the statement execution range table of FIG. 19, so that the statement execution range includes the loop execution range. Therefore, nothing is performed on the statement IL in step 1502. This is indicated by a statement 2609 of FIG. 26.

In step 1504, the processing on still another statement starts. The decision in step 1501 is NO because the two statements have been processed for the loop 2608 and therefore there are no more statements. The processing goes to step 1503. In step 1503, the loop has one statement, so that nothing is performed and the processing goes to the next duplicating loop.

The decision in step 1500 is YES because there is a duplicate loop 2610. The decision in step 1501 is YES because the loop contains two statements pointed by ASGN 1609 and ASGN 1615.

Subsequently, the processing is performed on these statements in the above-mentioned order. The loop 2610 is a loop for the case in which the process range is process number 1 to 2, so that the statement execution range table is referenced for the case in which the process range is process number 1 to 2.

The loop execution range of the loop 2610 is 1 to 127 as shown in the statement 2610 and the execution statement range of the first statement is 1 to 128 as shown in the values indicated by reference numerals 1809 and 1810 of the statement execution range table of FIG. 18, so that the statement execution range includes the loop execution range. Therefore, in step 1502, nothing is performed on the statement IL. This is shown in a statement 2611 of FIG. 26.

Then, in step 1504, the processing on yet another statement starts. The decision in step 1501 is YES because there is a second statement. The execution range of the second statement is 0 to 127 as shown in the values indicated by reference numerals 1909 and 1910 of the statement execution range table of FIG. 19, so that the statement execution range includes the loop execution range. Therefore, in step 1502, nothing is performed on the statement IL. This is shown in statement 2612 of FIG. 26.

In step 1504, the processing on another statement starts. The decision in step 1501 is NO because the two statements have been processed for the loop 2610 and therefore there are no more statements to be processed. The processing goes to step 1503. In step 1503, the loop contains two statements without change, so that nothing is performed and the processing goes to the next duplicating loop.

The decision in step 1500 is YES because there is a duplicate loop 2613. The decision in step 1501 is YES because the loop contains two statements pointed by ASGN 1609 and ASGN 1615.

Subsequently, the processing is performed on these statements in the above-mentioned order. The loop 2613 is a loop for the case in which the process range is process number 1 to 2, so that the statement execution range table is referenced for the case in which the process range is process number 1 to 2.

The loop execution range of the loop 2613 is 128 to 128 as shown in the statement 2613 and the execution range of the first statement is 1 to 128 as shown in the values indicated by reference numerals 1809 and 1810 of the statement execution range table of FIG. 18, so that the statement execution range includes the loop execution range. Therefore, nothing is performed on the statement IL in step 1502. This is shown in statement 2614 of FIG. 26.

In step 1504, the processing on a next statement starts. The decision in step 1501 is YES because there is a second statement. The execution range of the second statement is 0 to 127 as shown in the values indicated by reference numerals 1909 and 1910 in the statement execution table of FIG. 19, so that the statement execution range and the loop execution range are mutually disjointed, that is they do not overlap each other. Therefore, the second statement is deleted in step 1502. Thus, the second statement does not appear in the loop of the statement 2613 of FIG. 26.

In step 1504, the processing on still another statement starts. The decision in step 1501 is NO because the two statements have been processed for the loop 2613 and there are no more statements to be processed. The processing goes to step 1503.

In step 1503, the loop has one statement, so that nothing is performed and the processing goes to the next duplicating loop.

The decision in step 1500 is YES because there is the duplicate loop 2616. The decision in step 1501 is YES because there are two statements pointed by ASGN 1609 and ASGN 1615 in the loop.

Subsequently, the processing is performed on these statements in the above-mentioned order. The loop 2616 is a loop for the case in which the process range is process number 3, so that the statement execution range table is referenced for the case in which the process range is process number 3.

The loop execution range of the loop 2616 is 0 to 0 and the execution range of the first statement is 1 to 128 as shown in the values indicated by reference numerals 1813 and 1814 of the statement execution table of FIG. 18, so that the statement execution range and the loop execution range are mutually disjointed, that is they do not overlap each other. Therefore, the first statement is deleted in step 1502. Thus, the first statement does not appear in the loop of the statement 2616 of FIG. 26.

In step 1504, the processing on yet another statement starts. The decision in step 1501 is YES because there is a second statement. The execution range of the second statement is 0 to 128 as shown in the values indicated by reference numerals 1913 and 1914 of the statement execution range table of FIG. 19, so that the statement execution range includes the loop execution range. Therefore, in step 1502, nothing is performed on the statement IL. This is shown in a statement 2617 of FIG. 26.

In step 1504, the processing on another statement starts. The decision in step 1501 is NO because the two statements have been processed for the loop 2616 and therefore there are no more statements to be processed. The processing goes to step 1503. In step 1503, the loop contains one statement, so that nothing is performed and the processing goes to the next duplicating loop.

The decision in step 1500 is YES because there is a duplicate loop 2618. The decision in step 1501 is YES because the loop contains two statements pointed by ASGN 1609 and ASGN 1615.

Subsequently, the processing is performed on these statements in the above-mentioned order. The loop 2618 is a loop for the case in which the process range is process number 3, so that the statement execution range table is referenced for the case in which the process range is process number 3.

The loop execution range of the loop 2618 is 1 to 128 as shown in the statement 2613 and the execution range of the first statement is 1 to 128 as shown in the values indicated by reference numerals 1813 and 1814 of the statement execution range table of FIG. 18, so that the statement execution range includes the loop execution range. Therefore, nothing is performed on the statement IL in step 1502. This is shown in a statement 2619 of FIG. 26.

In step 1504, the processing on still another statement starts. The decision in step 1501 is YES because there is a second statement. The execution range of the second statement is 0 to 128 as shown in the values indicated by reference numerals 1913 and 1914 of the statement execution range table of FIG. 19, so that the statement execution range includes the loop execution range. Therefore, nothing is performed on the statement IL in step 1502. This is shown in the statement 2620 of FIG. 26.

In step 1504, the processing on another statement starts. In step 1501, the two statements have been processed for the loop 2618, so that there are no more statements to be processed. Thus, the decision is NO and the processing goes to step 1503. In step 1503, the loop contains two statements without change, so that nothing is performed and the processing goes to the next duplicate loop.

The decision in step 1500 is NO because there are no more duplicate loops to be processed this time. Thus, the processing of the code transforming section 109 for deleting the unnecessary statements has come to an end. The source program containing data communication outputted via the source code generating section 110 after the above-mentioned processing is as shown in FIG. 26.

The following describes a second preferred embodiment of the present invention with reference to FIG. 16, FIG. 17, FIGS. 18 through 20, FIG. 25, and FIGS. 27 through 38.

The difference between the first and second embodiments lies only in the loop duplicating section 108 of FIG. 1. Therefore, only the processing to be performed after the loop duplicating section 108 will be described below, omitting the processing to be performed up to the non-intersecting interval sequence generating section 107 inclusive.

Inputs in the loop duplicating section 108 include the intermediate languages shown in FIG. 16, the tables shown in FIGS. 18 through 20, and the non-intersecting interval tables shown in FIG. 25. However, in FIG. 20, a portion corresponding to lary 1718 stores the number of array elements of array Select and a portion corresponding to selectp 1719 stores the address of the start array element of array Select. Reference numeral 1705 of FIG. 17 indicates an array "order" for storing order representation and orderp 1726 stores the start address of the array "order" 1705.

Figure 27:
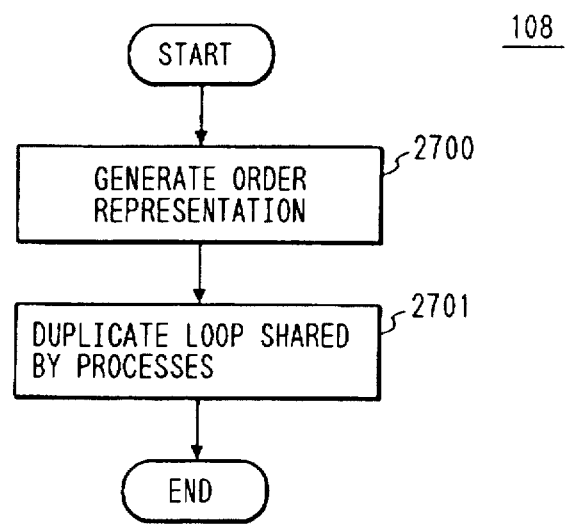
FIG. 27 is a flowchart describing the processing by the loop duplicating section of FIG. 1.

FIG. 27 shows a flowchart describing the processing by the loop duplicating section 108 in the second embodiment. The loop duplicating section 108 generates loops in the same number as the number of processes that execute a program by duplicating an original loop.

Figure 28:
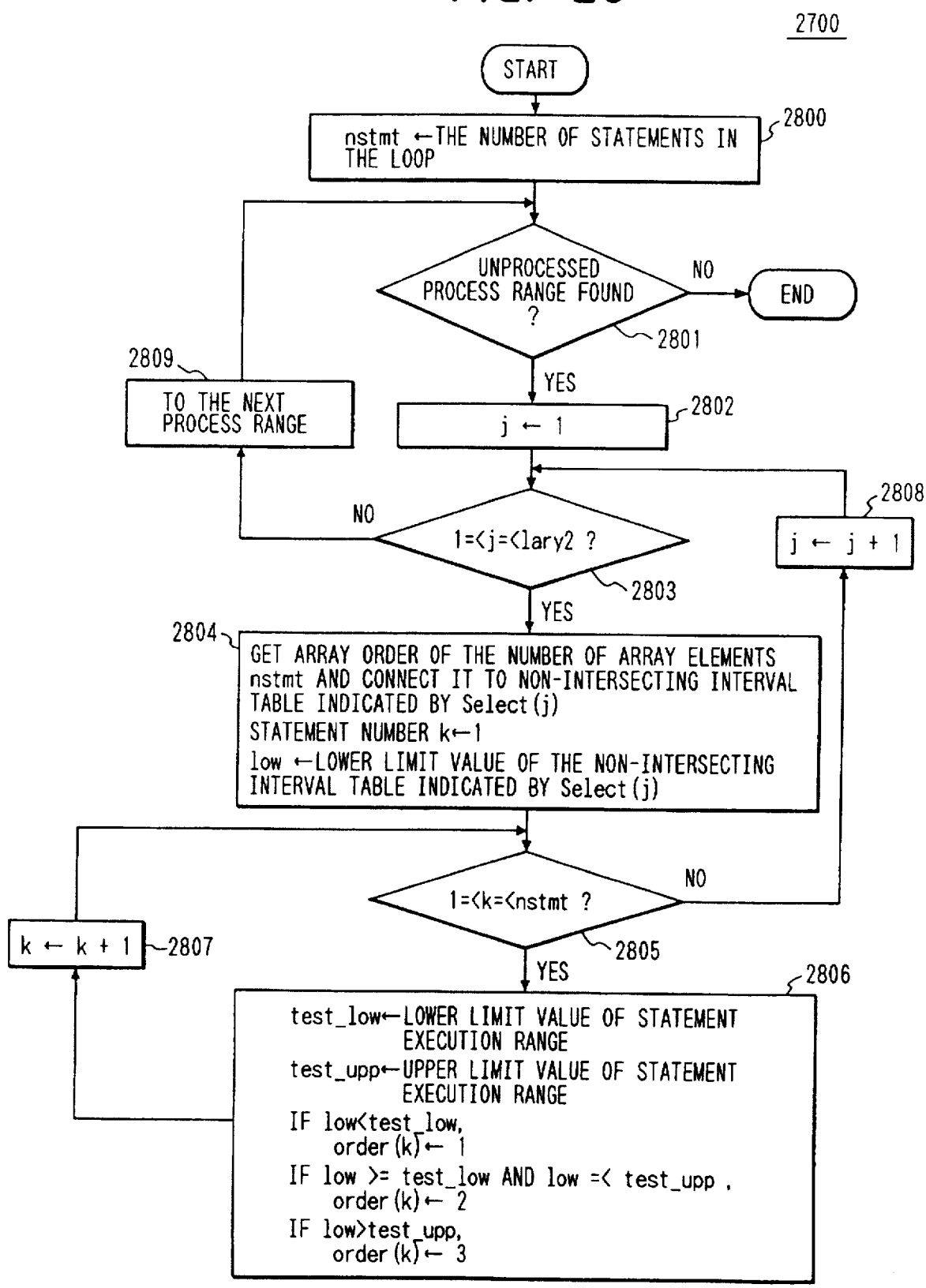
FIG. 28 is a flowchart describing the processing in the step of order representation generation of FIG. 27.

First, the processing of step 2700, generation of order representation, is performed. This processing is described in FIG. 28. In FIG. 28, an order representation is generated for determining which interval is to be selected from a non-intersecting interval sequence for each of the processes in a step of FIG. 29 in which a loop to be shared by the processes is duplicated or for determining not to make a selection from that process.

Figure 30:
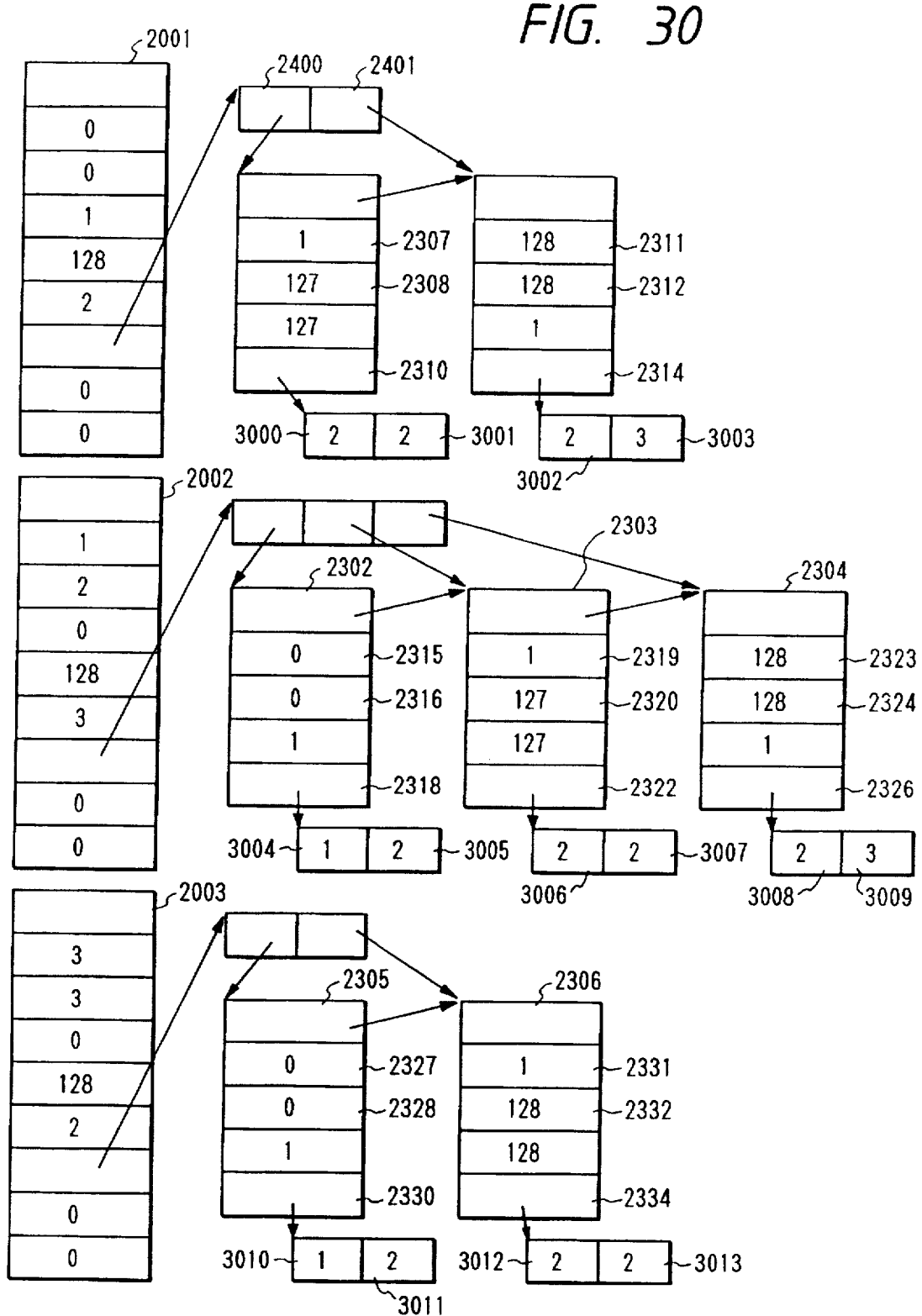
FIG. 30 is a diagram illustrating loop execution range tables and tables pointed thereby obtained as a result of the processing in the step of order representation generation of FIG. 27.

FIG. 30 shows the states of the loop execution range tables obtained as a result of performing the processing of FIG. 28 and the states of the tables pointed by these loop execution range tables.

In what follows, the step of generating an order representation of FIG. 28 will be described with reference to FIG. 30. In step 2800, the number of execution statements in loop is entered in the nstmt of FIG. 17. In this second embodiment, an intermediate language connected to a loop 1602 indicates the loop and intermediate languages connected to ASGN 1609 and ASGN 1615 indicate statements in FIG. 16, so that the number of statements in the loop is 2. Therefore, 2 is substituted in the nstmt in step 2800.

In step 2801, it is determined whether there is a process range to be processed. In the present example, the decision is YES because there are three process ranges 0, 1 to 2, and 3 as shown in FIG. 20. In what follows, the processing is performed on the process ranges 0, 1 to 2, and 3 in this order.

In step 2802, j is initialized to 1. In step 2803, it is determined whether $1 \leq j \leq lary2$ or not. In the present example, lary2 is equal to the number of array elements of array Select, so that lary2 is 2 as seen from FIG. 25. Consequently, the conditional expression of step 2803 becomes $1 \leq j \leq 2$. Since j is initialized to 1, the decision in step 2803 is YES.

In step 2804, the array "order" having nstmt array elements is allocated to be connected to a non-intersecting interval table pointed by Select(j), 1 is entered in statement number k, and the lower bound value of the non-intersecting interval table pointed by the Select (j) is substituted in low.

In the present example, the array "order" having two array elements is allocated to be connected to a non-intersecting interval table 2300 pointed by Select(1) 4000. The array "order" is represented by reference numerals 3000 and 3001. This array "order" is pointed by reference numeral 2310 (orderp) in the non-intersecting interval table 2300. Further, in step 2804, 1 is substituted in the statement number k and the lower bound value 1 stored in the location indicated by reference numeral 2307 of the non-intersecting interval table 2300 pointed by the Select(1) 2400 is substituted in low.

In the next step 2805, it is determined whether $1 \leq k \leq nstmt$. In the present example, the decision is YES because the statement number k is 1 and the nstmt is 2. In step 2806, the lower bound value of the statement execution range is entered in test_low and the upper bound value thereof in test_upp and, at the same time, if $low \leq test\_low$ and $low \leq test\_upp$, 2 is entered in order(K), if $low > test\_low$, 3 is entered in order(K). In this case, since the process range is process number 0 and the first statement is under consideration, test_low and test_upp become 1 and 128 as seen from reference numerals 1805 and 1806 of FIG. 18 respectively. Since k and low are both 1, $low \geq test\_low$ and $low \geq test\_upp$ are established, 2 being entered in order(1). This is shown in reference numeral 3000 of FIG. 30. In step 2807, k is updated by 1 and the processing goes back to step 2805. In this case, the value of k is updated to 2.

In step 2805, the statement number k is 2 and the nstmt is 2 this time, so that the decision is YES. In step 2806, since the process range is process number 0 and the second statement is under consideration, so that test_low and test_upp become 1 and 127 respectively as seen from reference numerals 1905 and 1906 of FIG. 19. k is 2 and low is 1, so that $low \geq test\_low$ and $low \leq test\_upp$ are established, 2 being entered in order(2). This is shown in reference numeral 3001 of FIG. 30.

In the next step 2807, k is updated to 3. In step 2805, the statement number k is 3 and the nstmt is 2, so that the decision is NO. In step 2808, the value of j is updated by 1 and the processing goes back to step 2803. In this case, j is updated to 2.

In step 2803, j is 2 and lary2 is 2, so that the decision is YES. In step 2804, an array "order" having two array elements is allocated to be connected to a non-intersecting interval table 2301 pointed by a Select(2) 2401. The array "order" is indicated by reference numerals 3002 and 3003 of FIG. 30, which are pointed by reference numeral 2314 in the non-intersecting interval table 2301 as shown in FIG. 30. Further, in step 2804, 1 is entered in the statement number k and the lower bound value 128 stored in the location indicated by reference numeral 2311 of the non-intersecting interval table 2301 pointed by the Select(2) 2401 is entered in low. In step 2805, the statement number k is 1 and the nstmt is 2, so that the decision is YES. In step 2806, the process range is process number 0 and the first statement is under consideration in this case, so that test_low and test_upp become 1 and 128 as seen from reference numerals 1805 and 1806 of FIG. 18 respectively. Since k is 1 and low is 128, $low \geq test\_low$ and $low \leq test\_upp$ are established, 2 being entered in order(1). This is indicated by reference numeral 3002 of FIG. 30. In step 2807, the value of k is updated to 2 and the processing goes back to step 2805.

In step 2805, the statement number k is 2 and the nstmt is 2, the decision is YES. In step 2806, the process range is process number 0 and the second statement is under consideration in this case, test_low and test_upp become 1 and 127 respectively as seen from reference numerals 1905 and 1906 of FIG. 19. The statement number k is 2 and low is 128, so that $low > test\_upp$ is established, 3 being entered in order(2). This is indicated by reference numeral 3003 of FIG. 30. In step 2807, the value of k is updated to 3. In step 2805, the statement number k is 3 and the nstmt is 2, so that the decision is NO. In step 2808, the value of j is updated to 3. In step 2803, j is 3 and lary2 is 2, so that the decision is NO. In step 2809, the processing is performed on the next process range and then the processing goes back to step 2801.

In step 2801, there is the process range 1 to 2, so that the decision is YES. In step 2802, j is initialized to 1. Since lary2 in step 2803 is equal to the number of array elements of array Select, lary2 is 3 from FIG. 25. Therefore, the conditional expression of step 2803 is $1 \leq j \leq 3$. In the present example, the value of j is initialized to 1, so that the decision in step 2803 is YES. In step 2804, array "order" having two array elements is allocated to be connected to the non-intersecting interval table 2302 indicated by the Select(1) 2402. The array "order" is indicated by reference numerals 3004 and 3005 of FIG. 30, which are pointed by reference numeral 2318 of the non-intersecting interval table 2302 of FIG. 30. Further, in step 2804, 1 is entered in the statement number k and lower bound value 0 stored in the location indicated by reference numeral 2315 of the non-intersecting interval table 2302 pointed by the Select(2) 2402 is entered in low. In step 2805, the statement number k is 1 and the nstmt is 2, so that the decision is YES. In step 2806, the process range is process number 1 to 2 and the first statement is under consideration now, so that test_low and test_upp become 1 and 128 as seen from reference numerals 1809 and 1810 of FIG. 18. Since k is 1 and low is 0, low<test_low is established, 1 being substituted into the order(1). This is indicated by reference numeral 3004 of FIG. 30. In step 2807, the value of k is updated to 2 and the processing goes back to step 2805.

In step 2805, the statement number k is 2 and the nstmt is 2, so that the decision is YES. In step 2806, the process range is process number 1 to 2 and the second statement is under consideration now, so that test_low and test_upp become 0 and 127 respectively as seen from reference numerals 1909 and 1910 of FIG. 19. Since k is 2 and low is 0, low≧test_low and low≦test_upp are established, 2 being substituted into the order(2). This is indicated by reference numeral 3005 of FIG. 30. In step 2807, the value of k is updated to 3 and the processing goes back to step 2805. In step 2805, the statement number k is 3 and the nstmt is 2, so that the decision is NO. In step 2808, the value of j is updated to 2 and the processing goes back to step 2803.

In step 2803, j is 2 and lary2 is 3, so that the decision is YES. In step 2804, an array "order" having two array elements is allocated to be connected to the non-intersecting interval table 2303 pointed by the Select(2) 2403. The array "order" is indicated by reference numerals 3006 and 3007 of FIG. 30, which are pointed by reference numerals 2303 and 2322 in the non-intersecting interval table 2303 as shown in FIG. 30. Further, in step 2804, 1 is entered in the statement number k and the lower bound value 1 stored in the location indicated by reference numeral 2391 of the non-intersecting interval table 2303 pointed by the Select(2) 2403 is entered in low. In step 2805, the statement number k is 1 and the nstmt is 2, so that the decision is YES. In step 2806, the process range is process number 1 to 2 and the first statement is under consideration now, so that test_low and test_upp become 1 and 128 respectively as seen from reference numerals 1813 and 1814 of FIG. 18. Since k is 1 and low is 1, low≧test_low and low≦test_upp are established, 2 being substituted in the order(1). This is indicated by reference numeral 3006 of FIG. 30. In step 2807, the value of k is updated to 2 and the processing goes back to step 2805.

In step 2805, the statement number k is 2 and the nstmt is 2, so that the decision is YES. In step 2806, the process range is process number 1 to 2 and the second statement is under consideration, so that test_low and test_upp become 0 and 128 respectively as seen from reference numerals 1913 and 1914 of FIG. 19. Since k is 2 and low is 1, low≧test_low and low≦test_upp are established, 2 being substituted in the order(2). This is indicated by reference numeral 3007 of FIG. 30. In step 2807, the value of k is updated to 3 and the processing goes back to step 2805. In step 2805, the statement number k is 3 and the nstmt is 2, so that the decision is NO. In step 2808, the value of j is updated to 3 and the processing goes back to step 2803.

In step 2803, j is 3 and lary2 is 3, so that the decision is YES. In step 2804, an array "order" having two array elements is allocated to be connected to the non-intersecting interval table 2304 pointed to the Select(3) 2404. The array "order" is indicated by reference numerals 3008 and 3009 of FIG. 30, which are pointed by reference numeral 2326 in the non-intersecting interval table 2304 as shown in FIG. 30. Further, in step 2804, 1 is substituted in the statement number k and the lower bound value 128 stored in the location indicated by reference numeral 2323 of the non-intersecting interval table 2304 pointed by the Select(1) 2404 is substituted in low. In step 2805, the statement number k is 1 and the nstmt is 2, so that the decision is YES. In step 2806, the process range is process number 1 to 2 and the first statement is under consideration now, so that test_low and test_upp become 1 and 128 respectively as seen from reference numerals 1809 and 1810 of FIG. 18. Since k is 1 and low is 128, low≧test_low and low≦test_upp are established, 2 being substituted in the order(1). This is indicated by reference numeral 3008 of FIG. 30. In step 2807, the value of k is updated to 2 and the processing goes back to step 2805. In step 2805, the statement number k is 3 and the nstmt is 2, so that the decision is NO. In step 2808, the value of j is updated to 4 and the processing goes back to 2803. In step 2803, j is 4 and lary2 is 3, so that the decision is NO. In step 2809, the processing on the next process range is taken up and the processing goes back to step 2801.

In step 2801, there is the process range 3, so that the decision is YES. In step 2802, j is initialized to 1. Since lary2 in step 2803 is equal to the number of array elements of array Select, lary2 is 2 from FIG. 25. Therefore, the conditional expression of step 2803 is 1≦j≦2. In the present example, the value of j is initialized to 1, so that the decision in step 2803 is YES. In step 2804, array "order" having two array elements is allocated to be connected to the non-intersecting interval table 2305 indicated by the Select(1) 2405. The array "order" is indicated by reference numerals 3010 and 3011 of FIG. 30, which are pointed by reference numeral 2330 of the non-intersecting interval table 2305 of FIG. 30. Further, in step 2804, 1 is entered in the statement number k and lower bound value 0 stored in the location indicated by reference numeral 2327 of the non-intersecting interval table 2305 pointed by the Select(1) 2405 is entered in low. In step 2805, the statement number k is 1 and the nstmt is 2, so that the decision is YES. In step 2806, the process range is process number 3 and the first statement is under consideration now, so that test_low and test_upp become 1 and 128 as seen from reference numerals 1813 and 1814 of FIG. 18. Since k is 1 and low is 0, low<test_low is established, 1 being substituted into the order(1). This is indicated by reference numeral 3010 of FIG. 30. In step 2807, the of k is updated to 2 and the processing goes back to step 2805.

In step 2805, the statement number k is 2 and the nstmt is 2, so that the decision is YES. In step 2806, the process range is process number 3 and the second statement is under consideration now, so that test_low and test_upp become 0 and 128 respectively as seen from reference numerals 1913 and 1914 of FIG. 19. Since k is 2 and low is 0, low≧test_low and low≦test_upp are established, 2 being substituted into the order(2). This is indicated by reference numeral 3011 of FIG. 30. In step 2807, the value of k is updated to 3 and the processing goes back to step 2805. In step 2805, the statement number k is 3 and the nstmt is 2, so that the decision is NO. In step 2808, the value of j is updated to 2 and the processing goes back to step 2803.

In step 2803, j is 2 and lary2 is 2, so that the decision is YES. In step 2804, an array "order" having two array elements is allocated to be connected to the non-intersecting interval table 2306 pointed by the Select(2) 2404. The array "order" is indicated by reference numerals 3012 and 3013 of FIG. 30, which are pointed by reference numerals 2334 in the non-intersecting interval table 2306 as shown in FIG. 30. Further, in step 2804, 1 is entered in the statement number k and the lower bound value 1 stored in the location indicated by reference numeral 2331 of the non-intersecting interval table 2306 pointed by the Select(2) 2406 is entered in low. In step 2805, the statement number k is 1 and the nstmt is 2, so that the decision is YES. In step 2806, the process range is process number 3 and the first statement is under consideration now, so that test_low and test_upp become 1 and 128 respectively as seen from reference numerals 1813 and 1814 of FIG. 18. Since k is 1 and low is 1, low≧test_low and low≦test_upp are established, 2 being substituted in the order(1). This is indicated by reference numeral 3012 of FIG. 30. In step 2807, the value of k is updated to 2 and the processing goes back to step 2805.

In step 2805, the statement number k is 2 and the nstmt is 2, so that the decision is YES. In step 2806, the process range is process number 3 and the second statement is under consideration, so that test_low and test_upp become 0 and 128 respectively as seen from reference numerals 1913 and 1914 of FIG. 19. Since k is 2 and low is 1, low≧test_low and low≦test_upp are established, 2 being substituted in the order(2). This is indicated by reference numeral 3013 of FIG. 30. In step 2807, the value of k is updated to 3 and the processing goes back to step 2805. In step 2805, the statement number k is 3 and the nstmt is 2, so that the decision is NO. In step 2808, the value of j is updated to 3 and the processing goes back to step 2803.

In step 2803, j is 3 and lary2 is 3, so that the decision is YES. In step 2809, the processing on the next process range is taken up and the processing goes back to step 2801. In step 2801, there is no more process range to be processed, the decision is NO. Thus, all the processing in step 2700, the generation of order representation, has come to an end.

The following describes the step 2701 of duplicating a loop to be shared between processes with reference to FIG. 17 and FIGS. 29 through 38. In step 2701, it is determined which interval is to be selected from a non-intersecting interval sequence for each of the processes or it is determined not to select any interval for that process, by use of the result of the processing performed in step 2700, the generation of order representation, with reference to FIG. 28. In step 2701, a loop of which upper and lower bound values which are the upper and lower bound values of generally a plurality of selected intervals is created by duplicating the original loop. Further, in this step, one loop is created for the plurality of intervals, so that the loop is immediately preceded by both a guard for determining the process number for executing the program and an assignment statement for using the upper and lower bound values of the selected intervals of each of the processes as the upper and lower bound values of the loop for each of the processes.

Figure 29:
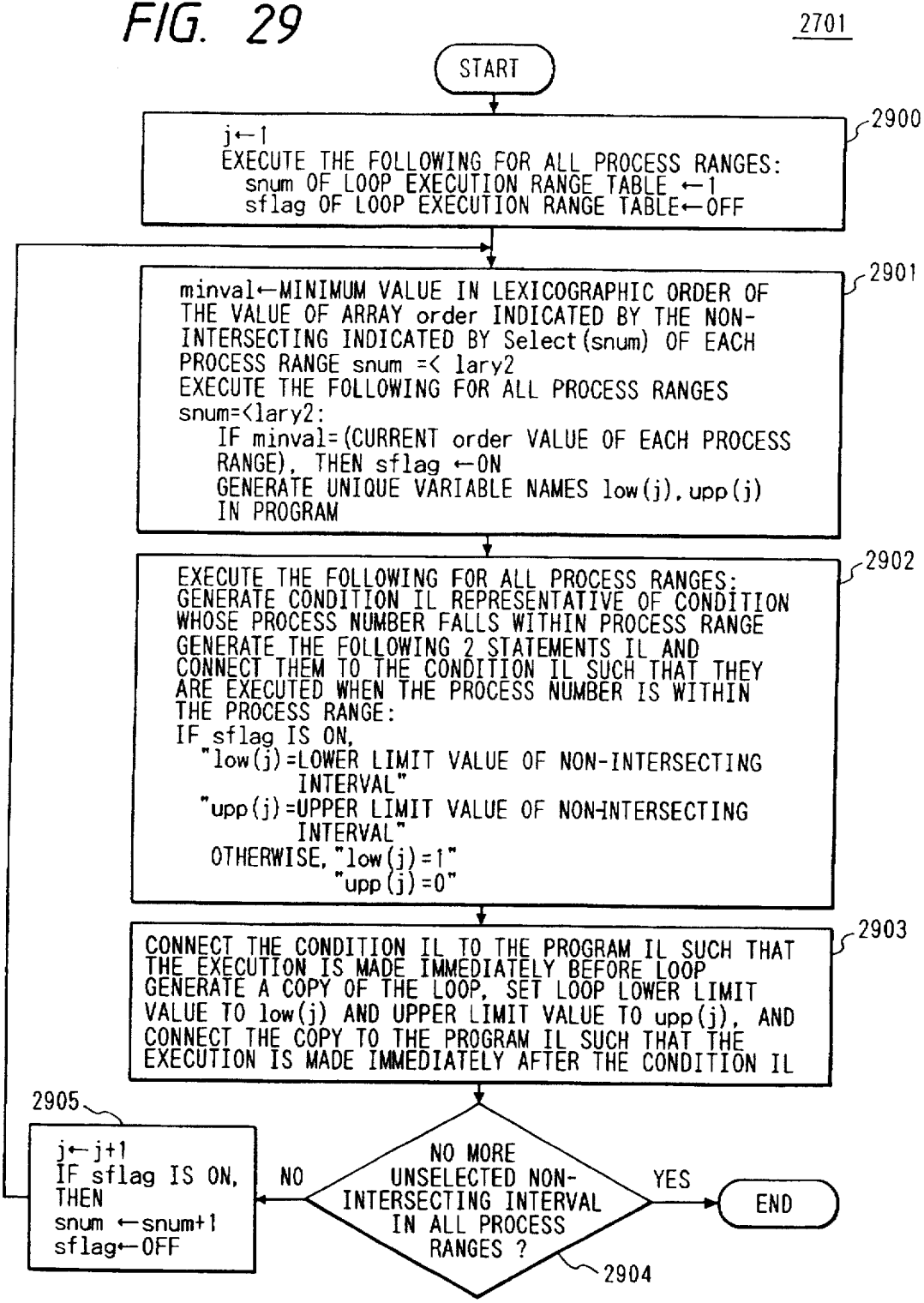
FIG. 29 is a flowchart describing the processing in the step of duplicating a loop to be shared between processes of FIG. 27.
Figure 31:
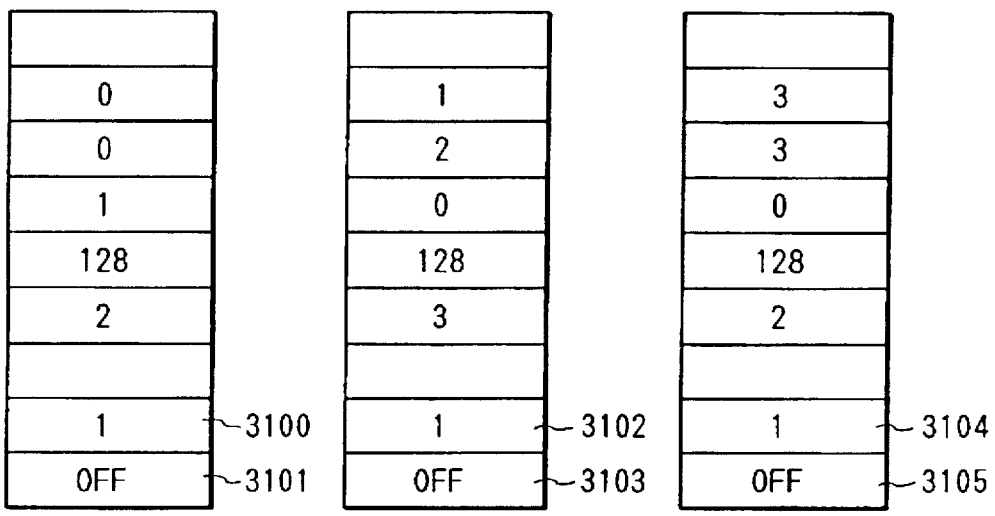
FIG. 31 shows a result of applying the processing of step 2900 of FIG. 29 to the loop execution tables.
Figure 32:
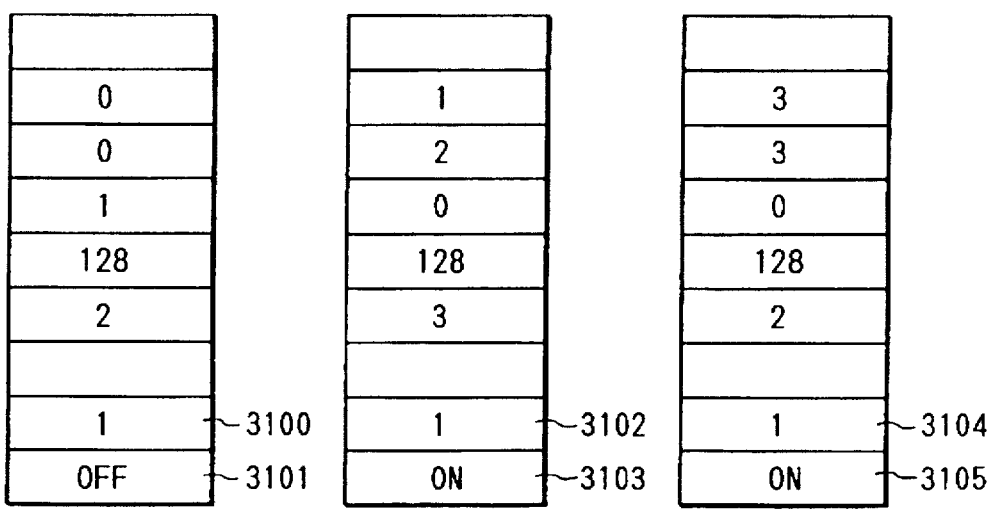
FIG. 32 shows a result of applying the processing of step 2901 to the loop execution tables for the first time.
Figure 33:
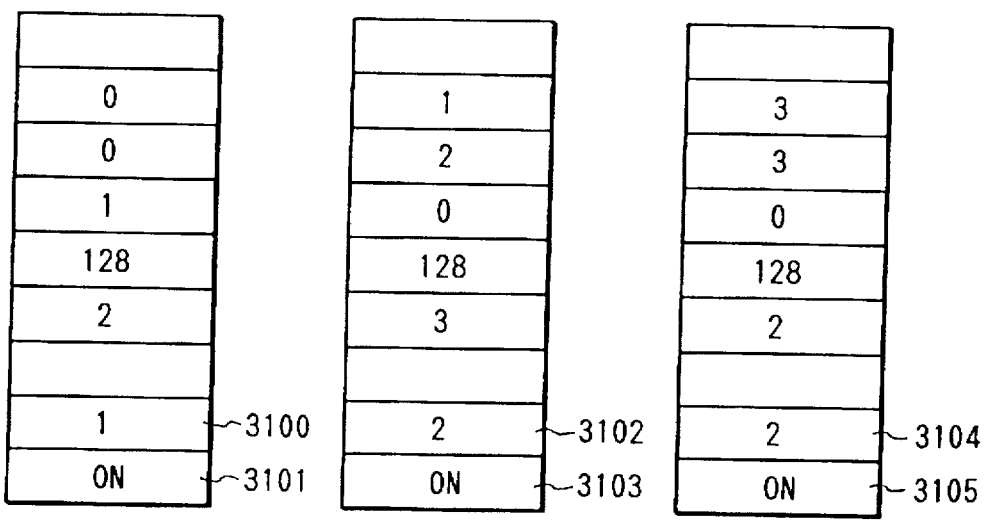
FIG. 33 shows a result of applying the processing of step 2901 to the loop execution tables for the second time.
Figure 34:
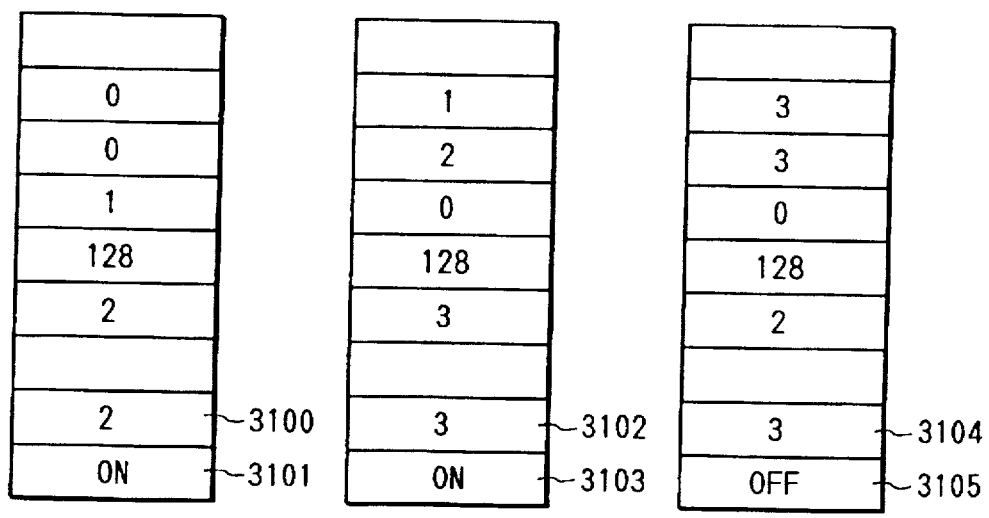
FIG. 34 shows a result of applying the processing of step 2901 to the loop execution tables for the third time.

FIG. 29 is a flowchart describing the processing of step 2701, duplicating a loop to be shared between processes. FIG. 31 shows a result of applying the processing of step 2900 to a loop execution table. FIG. 32 shows a result of applying the processing of step 2901 to a loop execution table for the first time. FIG. 33 shows a result of applying the processing of step 2901 to the loop execution table for the second time. FIG. 34 shows a result of applying the processing of step 2901 to the loop execution table for the third time. FIG. 35 shows, in the form of source program, an intermediate language IL as a result of applying the processing of step 2701, duplicating a loop to be shared between processes. FIG. 36 shows value setting code 3500 of LOWLIM1, UPPLIM1 of FIG. 35. FIG. 37 shows value setting code 3503 of LOWLIM2, UPPLIM2 of FIG. 35. FIG. 38 shows value setting code 3507 of LOWLIM3, UPPLIM3 of FIG. 35. It should be noted that snum 1720 of FIG. 17 is an array subscript of the array Select for indicating a candidate non-intersecting interval and sflag 1721 is a flag for indicating whether the candidate non-intersecting interval is to be actually selected or not.

In step 2900, 1 is substituted in j and, for all process ranges, 1 is substituted in the snum of the loop execution table and OFF is substituted in the sflag. The result obtained by substituting 1 into the snum is indicated by reference numerals 3100, 3102, and 3104 of FIG. 31. The result obtained by substituting OFF into the sflag is indicated by reference numerals 3101, 3103, and 3105 of FIG. 31.

When the process ranges are process number 0, process number 1 to 2, and process number 3, the lary2 is 2, 3, and 2 respectively.

In step 2901, the minimum value in lexicographical order of the values of the array "order" pointed by the non-intersecting interval table pointed by the Select(snum) in each process range of snum≦lary2 is substituted in minval. At the same time, for all process ranges of snum≦lary2, the sflag is turned ON if the minval=(the value of the current "order" of each process range) to create variable names low (j) and upp(j) which are unique in the program.

In the present example, the snum is 1 for all process ranges to satisfy snum≦lary2, so that the minimum value in lexicographical order of the values of the array "order" pointed by the non-intersecting interval table pointed by the Select(1) is obtained and the obtained value is substituted in the minval. In FIG. 30, the values of the array "order" pointed by the non-intersecting interval table pointed by the Select(1) are "2;2" as indicated by reference numerals 3000 and 3001 when the process range is process number 0; "1;2" as indicated by reference numerals 3004 and 3005 when the process range is process number 1 to 2; and "1;2" as indicated by reference numerals 3010 and 3011 when the process range is process number 3, so that the minimum value is "1;2", which is substituted in the minval.

Because the value of the minval obtained above becomes equal to the value of the current array "order" of each process range when the process range is process number 1 to 2 and process number 3, the sflag is turned ON for both process ranges. This is indicated by reference numerals 3103 and 3105 of FIG. 32.

In step 2902, variable names low(1)=LOWLIM1 and upp(1)=UPPLIM1 unique in the program are created. In this step, a conditional IL indicating a condition that process number is within process range for all process ranges is created and, at the same time, the following ILs of two statements are created to be connected to the above-mentioned conditional IL so that they are executed when the process number is within the process range.

When the sflag is ON, low(j)=the lower bound value of the non-intersecting interval and upp (j)=the upper bound value of the non-intersecting interval; in other cases, low(j) =1 and upp(j)=0.

In step 2902, the processing is performed on the process range of process number 0, the process range of process number 1 to 2, and the process range of process number 3 in this order.

First, when the process range is process number 0, an IL indicating the condition that the process number is within the process range is created. The result is indicated by reference numeral 3600 of FIG. 36.

When the process range is process number 0, the sflag is OFF as indicated by reference numeral 3101 of FIG. 32, so that low(j)=1 and upp(j)=0. Using the above-mentioned LOWLIM1 and UPPLIM1, the IL of LOWLIM1 =1 and UPPLIM1=0 is created to be connected to the conditional IL corresponding to reference numeral 3600. The result of this is indicated by reference numerals 3601 and 6302 of FIG. 36.

Next, when the process range is process number 1 to 2, an IL indicating the condition that the process number is within the process range is created. The result is indicated by reference numerals 3601 and 3603 of FIG. 36.

When the process range is process number 1 to 2, the sflag is ON as indicated by reference numeral 3103 of FIG. 32. Since the snum is 1 as indicated by reference numeral 3102 of FIG. 32, the non-intersecting interval table 2302 pointed by the Select(1) of FIG. 30 is referenced. Because the lower bound value 2315 and the upper bound value 2316 are 0 and 0 respectively (low(j)=0 and upp(j)=0), an IL of LOWLIM1=0 and UPPLIM1=0 is created by using the above-mentioned LOWLIM1 and UPPLIM1 to be connected to the conditional IL corresponding to the above-mentioned reference numeral 3603. The result is indicated by reference numerals 3604 and 3605 of FIG. 36.

Then, when the process range is process number 3, an IL indicating the condition that the process number is within the process range is created. The result is indicated by reference numeral 3606 of FIG. 36.

When the process range is process number 3, the sflag is ON as indicated by reference numeral 3105 of FIG. 32. Since the snum is 1 as indicated by reference numeral 3104 of FIG. 32, the non-intersecting interval table 2305 pointed by the Select(1) of FIG. 30 is referenced. Because the lower bound value 2327 and the upper bound value 2328 are 0 and 0 respectively, an IL of LOWLIM1=0 and UPPLIM1=0 is created by using the above-mentioned LOWLIM1 and UPPLIM1 to be connected to the conditional IL corresponding to the above-mentioned reference numeral 3606. The result is indicated by reference numerals 3607 and 3608 of FIG. 36.

In the next step 2903, to execute the conditional IL immediately before the loop, a copy of the connection loop is made in the program IL, the lower bound value of the loop being low(j) and the upper bound value being upp(j). The copy is connected to the program IL so that it is executed immediately after the conditional IL. In the present example, the IL created with reference to FIG. 36 is connected to FIG. 35 as indicated by reference numeral 3500 of FIG. 35 to duplicate the loop, which is connected to the location immediately after the above-mentioned IL 3500, the loop's lower bound value being LOWLIM1 and upper bound value being UPPLIM1. This is represented in a DO loop 3501.

In step 2904, it is determined whether there is any non-intersecting interval not yet selected by any process range. If there is no such non-intersecting interval, namely if the decision is NO, the processing of step 2701, the duplication of a loop to be shared between processes, all comes to an end. If such an intersecting interval has been found, the processing goes to step 2905.

In the present example, there is an unselected non-intersecting table in the process range 0, so that the decision is YES and the processing goes to step 2905.

In step 2905, the value of j is updated by 1 and, if the sflag is ON, the snum is updated by 1 to initialize the sflag to OFF, upon which the processing goes back to step 2901.

In the present example, the value of j is updated by 1 to 2 and the sflag is ON when the process range is process number 1 to 2 and the process range is process number 3 as shown in FIG. 32, so that the value of snum is increased by 1. This is indicated by reference numerals 3102 and 3104 of FIG. 33. At the same time, all sflags are initialized to OFF.

When the process ranges are process number 0, process number 1 to 2, and process number 3, the lary2 is 2, 3, and 2 respectively.

In step 2901, when the process range is process number 0, the snum is 1, and when the process range is process number 1 to 2 and the process range is process number 3, the snum is 2, so that snum≦lary2 is satisfied. When the process range is process number 0, the value of the array "order" pointed by the non-intersecting interval table pointed by the Select(1) is referenced and, when the process range is process number 1 to 2 and the process range is process number 3, the value of the array "order" pointed by the nonintersecting interval table pointed by the Select(2) is referenced to obtain the minimum value in the lexicographical order of each of the above-mentioned values to be substituted in the minval.

In FIG. 30, the values of the array "order" pointed by the non-intersecting interval table pointed by the Select(1) are "2;2" as indicated by reference numerals 3000 and 3001 when the process range is process number 0; "2;2" as indicated by reference numerals 3006 and 3007 when the process range is process number 1 to 2; and "2;2" as indicated by reference numerals 3012 and 3013 when the process range is process number 3, so that the values in the lexicographical order are all equal, the minimum value being "2;2", which is substituted in the minval.

Because the value of the minval obtained above becomes equal to the value of the current array "order" of each process for all process ranges, the sflag is turned ON for all process ranges. This is indicated by reference numerals 3101, 3103, and 3105 of FIG. 33.

Then the variable names low(2)=LOWLIM2 and upp(2) =UPPLIM2 unique in the program are created.

In step 2902, the processing is performed on the process range of process number 0, the process range of process number 1 to 2, and the process range of process number 3 in this order.

When the process range is process number 0, a conditional IL indicating a condition that process number is within a process range is created. The result of this processing is found in a guard 3700 of FIG. 37.

When the process range is process number 0, the sflag is ON as indicated by reference numeral 3101 of FIG. 33. Since the snum is 1 as indicated by reference numeral 3100 of FIG. 33, the non-intersecting interval table 2300 pointed by the Select(1) of FIG. 30 is referenced. Since the lower bound value 2307 and the upper bound value 2308 are 1 and 127 respectively, an IL of LOWLIM2=1 and UPPLIM2=127 is created by using the above-mentioned LOWLIM2 and UPPLIM2 to be connected to the conditional IL corresponding to the above-mentioned reference numeral 3700. The result is indicated by reference numerals 3701 and 3702 of FIG. 37.

Next, when the process range is process number 1 to 2, an IL indicating the condition that the process number is within the process range is created. The result is indicated in a conditional statement 3703 of FIG. 37.

When the process range is process number 1 to 2, the sflag is ON as indicated by reference numeral 3103 of FIG. 33.

Since the snum is 2 as indicated by reference numeral 3102 of FIG. 33, the non-intersecting interval table 2303 pointed by the Select(2) of FIG. 30 is referenced. Because the lower bound value 2319 and the upper bound value 2320 are 1 and 127 respectively, an IL of LOWLIM2=1 and UPPLIM2=127 is created by using the above-mentioned LOWLIM2 and UPPLIM2 to be connected to the conditional IL corresponding to the above-mentioned reference numeral 3703. The result is indicated in statements 3704 and 3705 of FIG. 37.

Then, when the process range is process number 3, an IL indicating the condition that the process number is within the process range is created. The result is indicated in a conditional statement 3706 of FIG. 37.

When the process range is process number 3, the sflag is ON as indicated by reference numeral 3105 of FIG. 33. Since the snum is 2 as indicated by reference numeral 3104 of FIG. 33, the non-intersecting interval table 2306 pointed by the Select(2) of FIG. 30 is referenced. Since the lower bound value 2331 and the upper bound value 2332 are 1 and 128 respectively, an IL of LOWLIM2=1 and UPPLIM2=128 is created by using the above-mentioned LOWLIM2 and UPPLIM2 to be connected to the conditional IL corresponding to the above-mentioned reference numeral 3706. The result is indicated in statements 3707 and 3708 of FIG. 37.

In the step 2903, the IL created with reference to FIG. 37 is connected to FIG. 35 as indicated by reference numeral 3503 to duplicate the loop, which is connected to the location immediately after the abovementioned IL 3503, the loop's lower bound value being LOWLIM2 and upper bound value being UPPLIM2. This is represented in a DO loop 3504.

In step 2904, there is an unselected non-intersecting interval table in the process range 0, so that the decision is YES.

In step 2905, the value of j is updated to 3 and, if the sflag is ON, the snum is incremented by 1 for all process ranges in the present example. This is indicated by reference numerals 3102 and 3104 of FIG. 34. At the same time, all sflags are initialized to OFF.

When the process range is process number 0, the process range is process number 1 to 2, and process range is process number 3, and the lary2 is 2, 3, and 2 respectively. Then, the processing goes back to step 2901.

In the next step 2901, when the process range is process number 0, the snum is 2, and when the process range is process number 1 to 2 and the process range is process number 3, the snum is 3, so that, when the process range is process number 0, the value of the array "order" pointed by the non-intersecting interval table pointed by the Select(2) is referenced and, when the process range is process number 1 to 2, the value of the array "order" pointed by the non-intersecting interval table pointed by the Select(3) is referenced to obtain the minimum value in the lexicographical order of each of the above-mentioned values to be substituted in the minval. When the process range is process number 3, the value of snum is greater than the lary2, so that the processing is not performed.

In FIG. 30, the values of the array "order" pointed by the non-intersecting interval table pointed by the Select(2) are "2;3" as indicated by reference numerals 3002 and 3003 when the process range is process number 0; "2;3" as indicated by reference numerals 3008 and 3009 when the process range is process number 1 to 2; and, when the process range is process number 3, the processing is not performed, so the minimum value in lexicographical order is "2;3", which is substituted in the minval.

Because the value of the minval obtained above becomes equal to the value of the current array "order" of each process when the process range is process number 0 and the process range is process number 1 to 2, the sflag is turned ON for both ranges. This is indicated by reference numerals 3101, and 3103 of FIG. 34.

Then the variable names low(3)=LOWLIM3 and upp(3) =UPPLIM3 unique in the program are created.

In step 2902, the processing is performed on the process range of process number 0, the process range of process number 1 to 2, and the process range of process number 3 in this order.

When the process range is process number 0, an IL indicating a condition that process number is within process range is created. The result of this processing is found in a guard 3800 of FIG. 38.

When the process range is process number 0, the sflag is ON as indicated by reference numeral 3101 of FIG. 34. Since the snum is 2 as indicated by reference numeral 3100 of FIG. 34, the non-intersecting interval table 2301 pointed by the Select(2) of FIG. 30 is referenced. Since the lower bound value 2311 and the upper bound value 2312 are 128 and 128 respectively, an IL of LOWLIM3=128 and UPPLIM3=128 is created by using the above-mentioned LOWLIM3 and UPPLIM3 to be connected to the conditional IL corresponding to the above-mentioned reference numeral 3800. The result is indicated by reference numerals 3801 and 3802 of FIG. 38.

Next, when the process range is process number 1 to 2, an IL indicating the condition that the process number is within the process range is created. The result is indicated in a conditional statement 3803 of FIG. 38.

When the process range is process number 1 to 2, the sflag is ON as indicated by reference numeral 3103 of FIG. 34. Since the snum is 3 as indicated by reference numeral 3102 of FIG. 34, the non-intersecting interval table 2304 pointed by the Select(3) of FIG. 30 is referenced. Because the lower bound value 2323 and the upper bound value 2324 are 128 and 128 respectively, an IL of LOWLIM3=128 and UPPLIM3=128 is created by using the above-mentioned LOWLIM3 and UPPLIM3 to be connected to the conditional IL corresponding to the above-mentioned reference numeral 3803. The result is indicated in statements 3804 and 3805 of FIG. 38.

Then, when the process range is process number 3, an IL indicating the condition that the process number is within the process range is created. The result is indicated in a conditional statement 3806 of FIG. 38.

When the process range is process number 3, the sflag is OFF as indicated by reference numeral 3105 of FIG. 34. An IL of LOWLIM3=1 and UPPLIM3=0 is created by using the above-mentioned LOWLIM3 and UPPLIM3 to be connected to the conditional IL corresponding to the above-mentioned reference numeral 3806. The result is indicated in statements 3807 and 3808 of FIG. 38.

In the step 2903, the IL created with reference to FIG. 38 is connected as a statement 3507 to FIG. 35 to duplicate the loop, which is connected to the location immediately after the above-mentioned IL 3507, the loop's lower bound value being LOWLIM3 and upper bound value being UPPLIM3. This is represented in a DO loop 3508 of FIG. 35.

In step 2904, there is no unselected non-intersecting interval table this time, so that the decision is NO and the processing comes to an end.

Thus, all processing in step 2701, the duplication of a loop to be shared between processes, has come to an end. Also, the processing by the loop duplicating section 108 has come to an end.

The following describes the processing by the code transforming section 109 with reference to FIGS. 15, 18, 19, and 35 through 38.

In step 1500 of FIG. 15, there are three loops as shown in statements 3501, 3504, and 3508 created by the loop duplicating section 108, so that the decision is YES. The processing is performed on each of these loops in the above-mentioned order.

In step 1501, each loop contains two statements, one starting with ASGN 1609 and the other starting with ASGN 1615, so that the decision is YES. Subsequently, the processing is performed on each statement in this order. Further, the first statement is processed by referencing a statement execution range table pointed by the ASGN 1609 and an immediately preceding SINFO 1608. Likewise, the second statement is processed by referencing a statement execution range table pointed by the ASGN 1615 and an immediately preceding SINFO 1614.

The loop execution ranges of the loop 3501 are 1 to 0, 0 to 0, and 0 to 0 when the process range is process number 0, the process range is process number 1 to 2, and the process range is process number 3 respectively as shown in FIG. 36.

On the other hand, the execution range of the first statement is 1 to 128 for all processes as shown by reference numerals 1805 and 1806, 1809 and 1810, and 1813 and 1814 of FIG. 18.

It should be noted that for the loop execution range 1 to 0 when the process range is process number 0, the inclusion relation is not determined any further.

Consequently, the statement execution range and the loop execution range are mutually disjointed for the process ranges other than the process range 0, so that the statement IL for the first statement is deleted in step 1502. In step 1504, the processing on the next statement is taken up.

In step 1501, the decision is YES because there is the second statement. The execution ranges of the second statement are 1 to 127, 0 to 127, and 0 to 128 as indicated by reference numerals 1905 and 1906, 1909 and 1910, and 1913 and 1914 of FIG. 19 when the process range is process number 0, the process range is process number 1 to 2, and the process range is process number 3 respectively.

For the range 1 to 0, the inclusive relation is not determined as mentioned above, so that the statement execution range includes the loop execution range for the process ranges other than the process number 0. Consequently, in step 1502, the statement IL for the second statement is left unchanged. The result of this processing is shown in a statement 3502 of FIG. 35. In step 1504, the processing on the next statement is taken up.

In step 1501, no other statement is found because the two statements have been processed for the loop 3501, so that the decision is NO and the processing goes to step 1503.

In step 1503, there is one statement in the loop, so that nothing is performed and the processing goes to the next duplicating loop.

In step 1500, there is the duplicate loop 3504, so that the decision is YES.

In step 1501, each loop contains two statements, one starting with ASGN 1609 and the other starting with ASGN 1615, so that the decision is YES. Subsequently, these statements are processed in the above-mentioned order.

The loop execution ranges of the loop 3501 are 1 to 127, 1 to 127, and 1 to 128 when the process range is process number 0, the process range is process number 1 to 2, and the process range is process number 3 respectively as shown in FIG. 37.

On the other hand, the execution range of the first statement is 1 to 128 for all processes as shown by reference numerals 1805 and 1806, 1809 and 1810, and 1813 and 1814 of FIG. 18. Consequently, the statement execution range includes the loop execution range for all processes. In step 1502, the statement IL is left unchanged. The result of this processing is shown in a statement 3505 of FIG. 35. In step 1504, the processing on the next statement is taken up.

In step 1501, the decision is YES because there is a second statement. The execution ranges of the second statement are 1 to 127, 0 to 127, and 0 to 128 as indicated by reference numerals 1905 and 1906, 1909 and 1910, and 1913 and 1914 of FIG. 19 when the process range is process number 0, the process range is process number 1 to 2, and the process range is process number 3 respectively. Consequently, the statement execution range includes the loop execution range for all processes. In step 1502, the statement IL is left unchanged. The result of this processing is shown in a statement 3506 of FIG. 35. In step 1504, the processing on the next statement is taken up.

In step 1501, no other statement is found because the two statements have been processed for the loop 3504, so that the decision is NO and the processing goes to step 1503.

In step 1503, there are two statements in the loop, so that nothing is performed and the processing goes to the next duplicating loop.

In step 1500, there is the duplicate loop 3508, so that the decision is YES.

In step 1501, each loop contains two statements, one starting with ASGN 1609 and the other starting with ASGN 1615, so that the decision is YES. Subsequently, these statements are processed in the above-mentioned order.

The loop execution ranges of the loop 3508 are 128 to 128, 128 to 128, and 1 to 0 when the process range is process number 0, the process range is process number 1 to 2, and the process range is process number 3 respectively as shown in FIG. 38.

On the other hand, the execution range of the first statement is 1 to 128 for all processes as shown by reference numerals 1805 and 1806, 1809 and 1810, and 1813 and 1814 of FIG. 18.

Consequently, the statement execution range includes the loop execution range for the processes other than process number 3. In step 1502, the statement IL is left unchanged. The result of this processing is shown in a statement 3509 of FIG. 35. In step 1504, the processing on the next statement is taken up.

In step 1501, the decision is YES because there is a second statement. The execution ranges of the second statement are 1 to 127, 0 to 127, and 0 to 128 as indicated by reference numerals 1905 and 1906, 1909 and 1910, and 1913 and 1914 of FIG. 19 when the process range is process number 0, the process range is process number 1 to 2, and the process range is process number 3 respectively.

Consequently, the statement execution range and the loop execution range are mutually disjointed for the process ranges other than process number 3. Therefore, in step 1502, the statement IL corresponding to the second statement is deleted. In step 1504, the processing on the next statement is taken up.

In step 1501, no other statement is found because the two statements have been processed for the loop 3508, so that the decision is NO and the processing goes to step 1503.

In step 1503, there is one statement in the loop, so that nothing is performed and the processing goes to the next duplicating loop.

In step 1500, there are no more duplicate loops, so that the decision is NO.

Thus, the processing by the code transforming section 109 has come to an end.

As a result of the above-mentioned processing, the source program containing data communication that has been outputted via the source code generating section 110 is as shown in FIGS. 35 through 38.

It will be apparent that the above-mentioned computation partitioning optimizing control method based on the compiler according to the present invention is implemented on an electronic computer. It will be also apparent that the optimally partitioned computations are executed on a parallel computer system.

Figure 39:
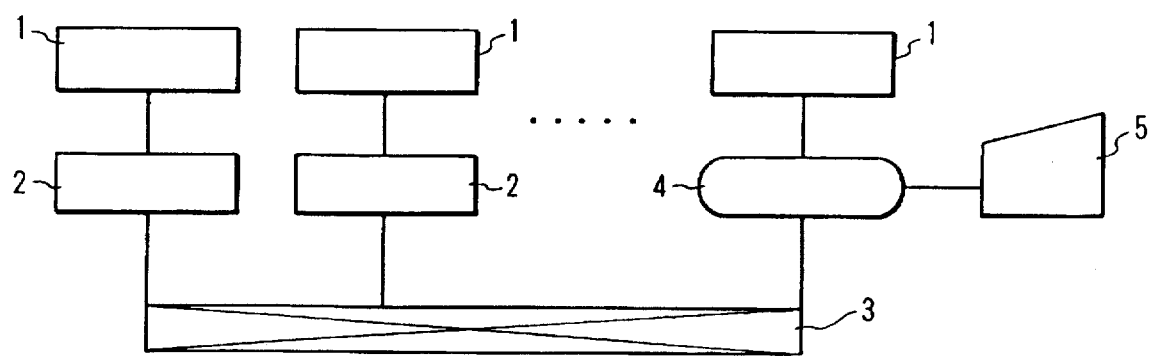
FIG. 39 is a block diagram illustrating an example of system constitution of a parallelizing machine for the compiler according to the invention.

FIG. 39 shows an example of the constitution of a parallel computer system on which the paralleling compiler associated with the present invention is run. As shown, this parallel computer system comprises a local memory 1, a processor element 2, a network 3, an input/output processor element 4, and an input/output console or a work station 5.

The parallelizing compiler according to the present invention is executed by the input/output console or work station 5 in which a source program is compiled into a source program containing communication or an object program. The source program containing communication is further compiled into an object program by a compiler oriented to each processor element 2. The object program is translated into a load module by a linker. The resultant load module is stored in the local memory 1 of each processor element 2 via the input/output processor element 4 to be executed by each processor element 2 for communication via the network 3.

Use of the computation partitioning optimization method according to the parallelizing compiler of the present invention enhances the speed of the processing by the above-mentioned parallel computer system for example, which in turn enhances the efficiency of the use of the hardware thereof.

As mentioned above and according to the present invention, each loop has no guard, so that the execution time can be saved as compared with the first conventional technique in which each loop has a guard. Actually, the execution of the programs of FIGS. 35 through 38 processed by the novel technique of FIG. 2 and the programs of FIGS. 3 and 4 complied by the first conventional technique resulted in 53 to 100 respectively in the ratio of execution time when executed on four parallel distributed memory parallel machines called the nCUBE2.

Further, according to the present invention, no loop distribution is performed, so that the number of times a loop end is determined is decreased and therefore the execution time is shortened as compared with the second conventional technique in which loop distribution is performed. Actually, the execution of the programs of FIGS. 35 through 38 compiled by the novel technique of FIG. 2 and the programs of FIGS. 6 through 8 complied by the second conventional technique of FIG. 2 resulted in 53 to 68 respectively in the ratio of execution time when executed on four parallel distributed memory machines called the nCUBE2.

Still further, according to the present invention, no loop distribution is performed, so that the novel technique can be applied to a wider area than that of the second conventional technique which is applicable only when loop distribution is allowed.

Yet further, according to the present invention, the number of loops newly created in a compiled program can be decreased, thereby preventing the compiled program from getting much larger in size.

In addition, according to the present invention, a guard is created for each statement for a loop comparatively small in the number of execution operations and, for a loop having a large number of execution operations, a compiled program can be created in which each loop has no guard. Thus, the compilation with both execution performance and program size taken into consideration can be performed.

In addition again, according to the present invention, the codes which are not executed can be deleted in generating a compiled program, so that the size of the compiled program can be decreased and the program easy to read can be generated.

While the preferred embodiments of the present invention have been described using specific terms, such description is for illustrative purposes only, and it is to be understood that changes and variations may be made without departing from the spirit or scope of the appended claims.

What is claimed is:

1. A method of optimizing computation partitioning for compiling a program having data distribution directives into a parallel program that runs on a plurality of processes by use of an electronic computer, comprising the steps of:

(a) analyzing said program having data distribution directives to determine a relationship between array elements and processes to which said array elements are assigned;

(b) based on a rule for relating an array and a statement and a relationship between an array subscript and a loop induction variable, determining for each of the processes a statement execution range which is a range of values of said loop induction variable for executing the statement in a loop in own process for each statement;

(c) performing for each of the processes non-intersecting interval sequence generation for generating a non-intersecting interval sequence composed of a plurality of intervals not overlapping each other, a union of said plurality of intervals including a union of said statement execution ranges;

(d) performing loop duplicating processing by setting each of the plurality of intervals of said non-intersecting interval sequence to a loop execution range and generating statements in the loop by duplicating an original loop; and (e) performing code transforming processing for transforming a code for each statement in the loop by use of said loop execution range and said statement execution range.

2. A method of optimizing computation partitioning according to claim 1, wherein the step (c) generates a non-intersecting interval sequence in which it is determined whether each statement is executed in each of said plurality of intervals not overlapping each other.

3. A method of optimizing computation partitioning according to claim 1, wherein the step (c) further generates, for a given non-intersecting interval sequence, as a new non-intersecting interval sequence, a union of a first non-intersecting interval sequence which is a collection of intervals selected by a specified interval selecting method from said non-intersecting interval sequence and a second non-intersecting interval sequence which is a collection of intervals obtained by uniting adjacent intervals of intervals not selected by said specified interval selecting method.

4. A method of optimizing computation partitioning according to claim 3, wherein, in said interval selecting method, said non-intersecting intervals are sorted by length to be selected starting from the longest interval until a specified number of intervals is reached.

5. A method of optimizing computation partitioning according to claim 3, wherein, in said interval selecting method, said plurality of non-intersecting intervals are sorted by length, a sum of the lengths is obtained starting from the length of the longest interval, and the intervals are kept selected until said sum reaches a specified value.

6. A method of optimizing computation partitioning according to claim 1, wherein the step (d) generates a guard for determining whether each of the processes is a process concerned and, when a condition of said guard is established, duplicates a loop by use of the non-intersecting interval sequence of said process concerned.

7. A method of optimizing computation partitioning according to claim 1, wherein the step (d) further comprising the steps of:

(d1) creating an order representation for determining a selecting ordering for selecting the non-intersecting intervals over all processes;

(d2) performing non-intersecting interval selecting processing for determining selecting processes from said all processes and a non-intersecting interval based on said order representation;

(d3) performing loop duplicating processing on the process that selected said non-intersecting interval for generating a single loop common to the processes with the selected non-intersecting interval providing the loop execution range;

(d4) generating a code that prevents the execution of the loop for the process which did not select the non-intersecting interval; and (d5) repeating the steps (d1) through (d4) until there is no more non-intersecting interval that is not selected by any process.

8. A method of optimizing computation partitioning according to claim 7, wherein the step (d1) further comprising the steps of:

(d11) for a given number and a given interval, generating the order representation of number to interval in which 1 when said given number is smaller than a lower bound value of said interval, 2 when said given number is included in said interval, and 3 when said given number is larger than an upper bound value of said interval are related to said given number;

(d12) for said given number and a plurality of ordered intervals, generating an order representation of number to intervals, order representation being composed of a number series obtained by sorting said series of order representation of number to each interval by a given ordering;

(d13) for said given number series and said given ordered intervals, generating an order representation of number series to ordered intervals, said order representation being composed of a number series obtained by sorting said order representation of number to ordered intervals in the ascending order of values of said number series;

(d14) for each of the processes and for an execution range series for all statements in a given loop and a given non-intersecting interval series, generating a number series composed of lower bound values of said non-intersecting interval series; and (d15) obtaining an order representation of said generated number series to the following ordered intervals by giving a specified ordering to said execution range series.

9. A method of optimizing computation partitioning according to claim 7, wherein the step (d2) selects, for each of the processes, minimum values in a number series included in the obtained order representation but not yet selected, and further selects a non-intersecting interval corresponding to a minimum value of the selected minimum values over all processes, and processes corresponding to the selected non-intersecting interval.

10. A method of optimizing computation partitioning according to claim 1, wherein the step (e) performs at least one of runtime resolution elimination processing, when the execution range of statements in the loop includes the loop execution range, for performing code transformation such that the statement concerned in the loop concerned is executed without runtime resolution, and statement delete processing, when the execution range of statements in the loop does not overlap the loop execution range, for deleting the statement concerned in the loop concerned and, in other cases, performs code transformation such that the statement concerned in the loop concerned is executed only when the loop induction variable is included in the execution range of the statement concerned.

11. A method of optimizing computation partitioning according to claim 10, wherein the step (e), when all statements in the loop are deleted by said statement delete processing, performs, for each of the processes, code transformation such that each statement in the duplicated loop is not executed.

* * * * *